US009016003B2

(12) United States Patent
Thuma et al.

(10) Patent No.: US 9,016,003 B2
(45) Date of Patent: *Apr. 28, 2015

(54) MODULAR BLOW MOLDED SHED WITH CONNECTORS

(71) Applicant: Suncast Technologies, LLC, Palm Beach Gardens, FL (US)

(72) Inventors: Michael Thuma, La Grange, IL (US); Torrence Anderson, Overland Park, KS (US); Michael R. Vogler, Oswego, IL (US)

(73) Assignee: Suncast Technologies, LLC, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,030

(22) Filed: Feb. 17, 2014

(65) Prior Publication Data

US 2014/0182219 A1    Jul. 3, 2014

Related U.S. Application Data

(63) Continuation of application No. 13/171,778, filed on Jun. 29, 2011, now Pat. No. 8,650,807.

(60) Provisional application No. 61/360,146, filed on Jun. 30, 2010.

(51) Int. Cl.
| | |
|---|---|
| *E04H 1/00* | (2006.01) |
| *E04H 1/12* | (2006.01) |
| *E04B 1/343* | (2006.01) |
| *E04B 1/38* | (2006.01) |

(52) U.S. Cl.
CPC .............. *E04H 1/12* (2013.01); *E04B 1/34321* (2013.01); *E04H 1/1205* (2013.01); *E04B 2001/405* (2013.01)

(58) Field of Classification Search
CPC ... E04B 1/344; E04B 1/3445; E04B 1/34321; E04B 1/3483; A63H 33/08; A63H 33/084
USPC .............................. 52/79.9; 446/108; 403/315
See application file for complete search history.

(56) References Cited

U.S. PATENT DOCUMENTS

| | | | | | |
|---|---|---|---|---|---|
| 2,331,754 | A | * | 10/1943 | Wohlers | 229/148 |
| 3,591,212 | A | * | 7/1971 | Rhyne | 217/65 |
| 3,664,011 | A | * | 5/1972 | Labastrou | 144/347 |
| 3,866,381 | A |   | 2/1975 | Eschbach et al. | |
| 4,454,678 | A | * | 6/1984 | Duvivier | 446/112 |
| 4,557,091 | A |   | 12/1985 | Auer | |
| 4,815,242 | A | * | 3/1989 | Gilliland | 52/93.1 |
| 5,036,634 | A |   | 8/1991 | Lessard et al. | |
| 5,281,185 | A | * | 1/1994 | Lee | 446/488 |
| 5,351,453 | A | * | 10/1994 | Leslie | 52/270 |
| D371,208 | S |   | 6/1996 | De Zen | |

(Continued)

*Primary Examiner* — Brian Glessner
*Assistant Examiner* — Paola Agudelo
(74) *Attorney, Agent, or Firm* — McHale & Slavin P.A.

(57) ABSTRACT

The present invention provides a system, or kit, of blow molded panels having integrally formed connectors which combine to form an enclosure, commonly in the form of a utility shed. The corner sections, roof, wall and floor panels are formed of blow molded plastic with integrally formed connectors to interlock with one another. In one embodiment, the ends of the wall panels have locking plugs that are constructed and arranged to fit into corresponding sockets and slide to an engaged position for interlocking cooperative engagement rigidly connecting the components together.

18 Claims, 100 Drawing Sheets

(56) References Cited

U.S. PATENT DOCUMENTS

| | | |
|---|---|---|
| 5,823,531 A * | 10/1998 | Huber ................... 273/156 |
| 6,250,022 B1 | 6/2001 | Paz et al. |
| 6,272,796 B1 * | 8/2001 | Metzler .................... 52/93.1 |
| 6,701,678 B1 | 3/2004 | Skov et al. |
| 6,711,860 B2 * | 3/2004 | Fleishman ................ 52/81.3 |
| 7,581,357 B2 | 9/2009 | Richardson et al. |
| 7,797,885 B2 | 9/2010 | Mower et al. |
| 7,909,000 B1 | 3/2011 | O'Neill et al. |
| 7,922,556 B2 * | 4/2011 | Schreff et al. ................ 446/93 |
| 8,069,820 B2 | 12/2011 | Anderson et al. |
| 8,650,807 B2 | 2/2014 | McKinney et al. |
| 2004/0187400 A1 | 9/2004 | Anderson et al. |
| 2004/0187402 A1 | 9/2004 | Moon et al. |
| 2006/0277852 A1 | 12/2006 | Mower et al. |
| 2007/0044391 A1 | 3/2007 | Richardson et al. |

* cited by examiner

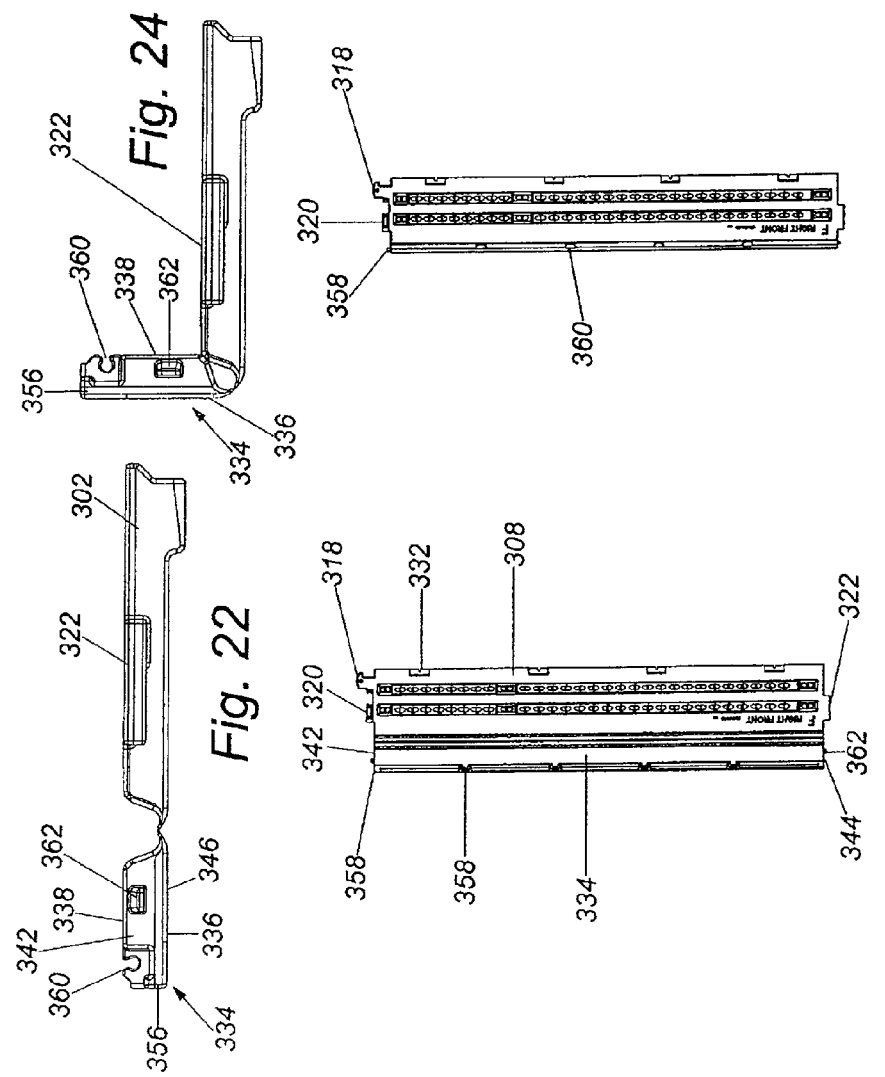

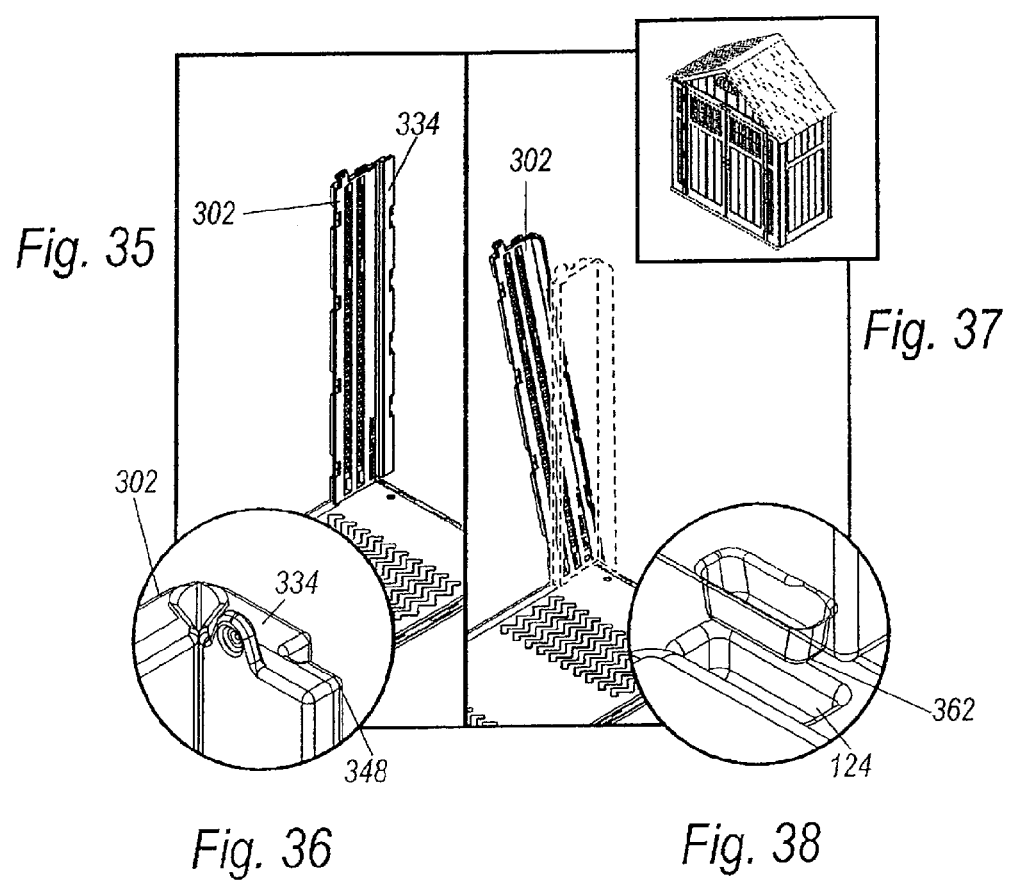

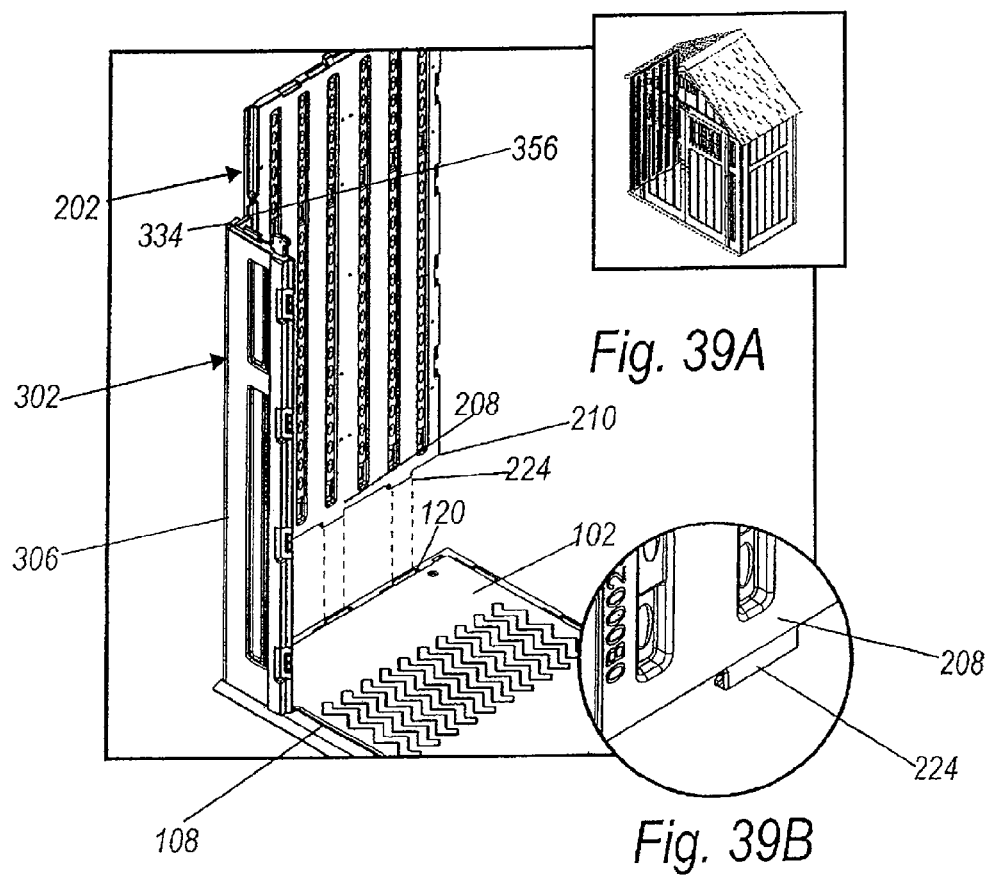

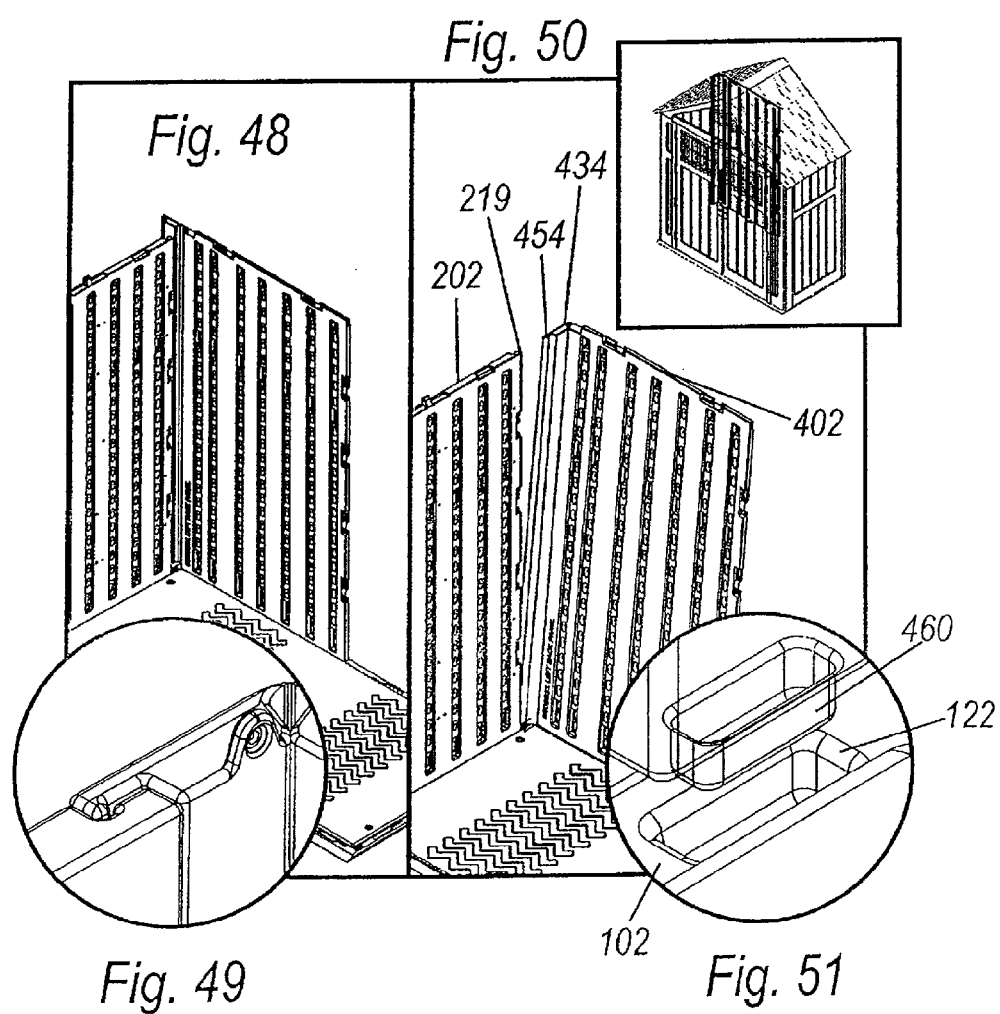

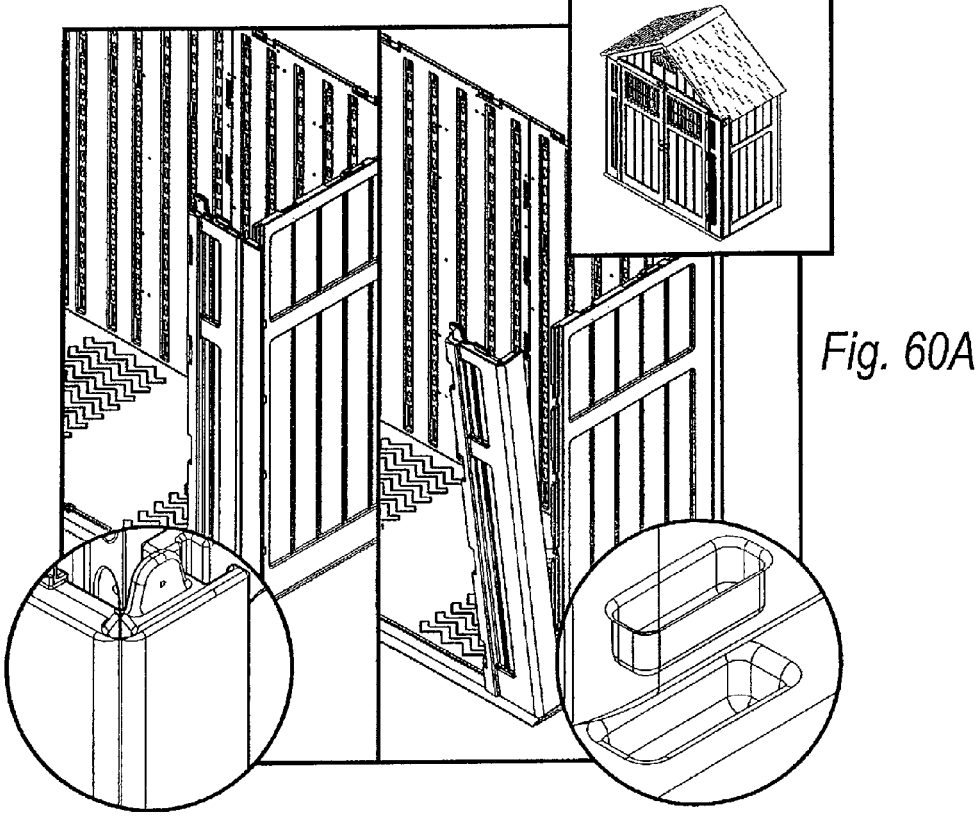

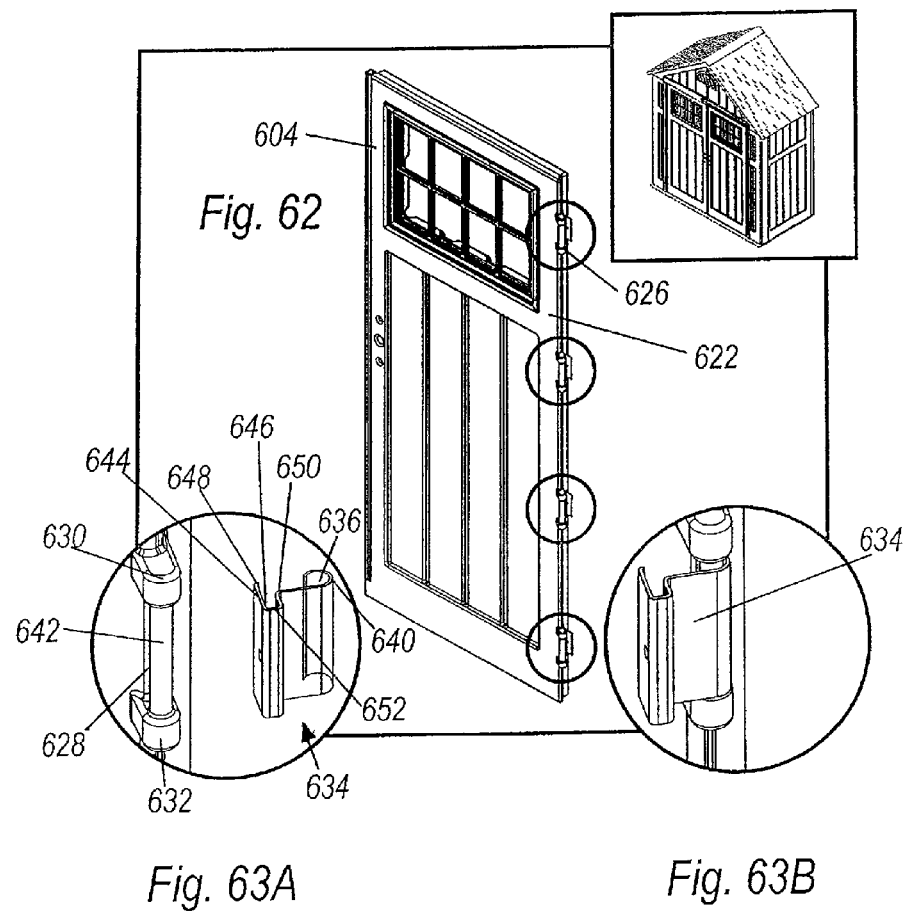

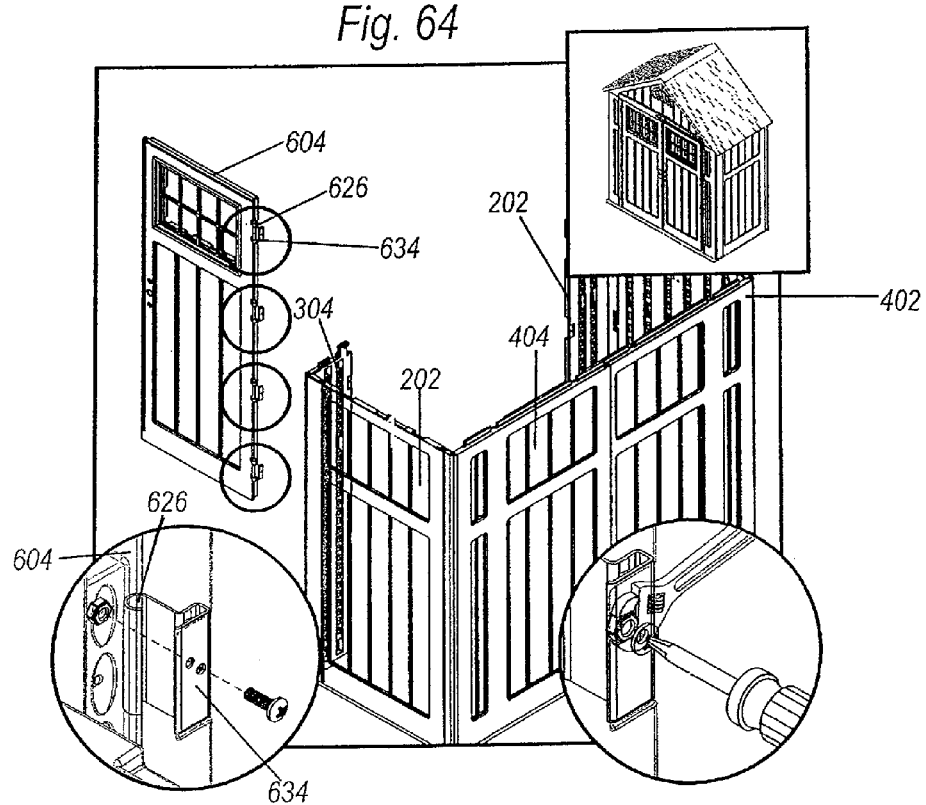

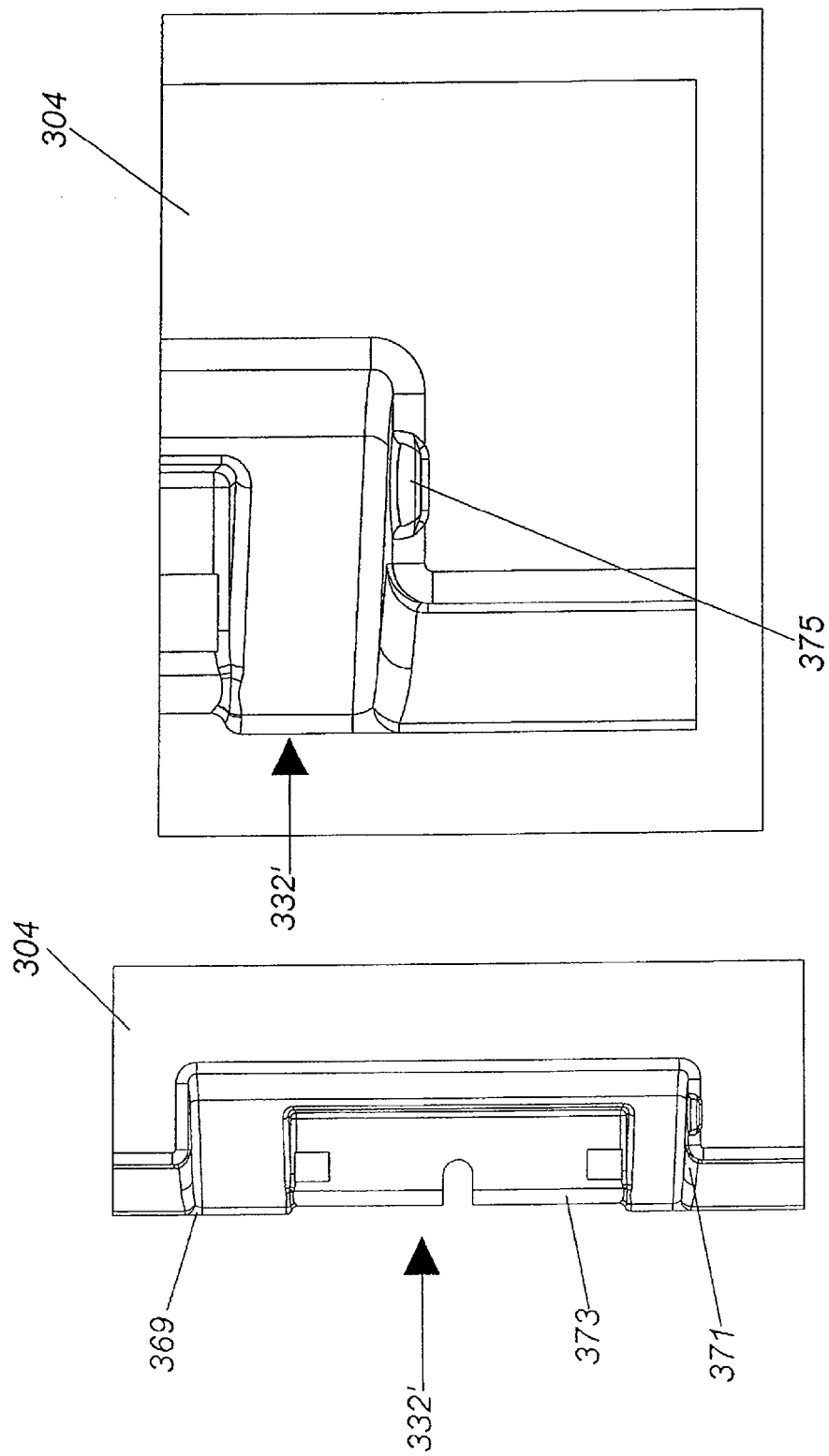

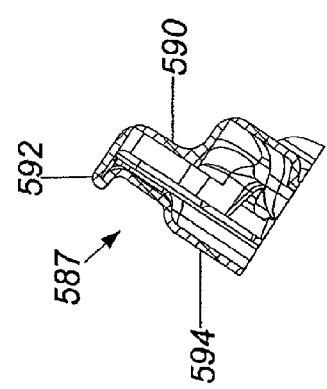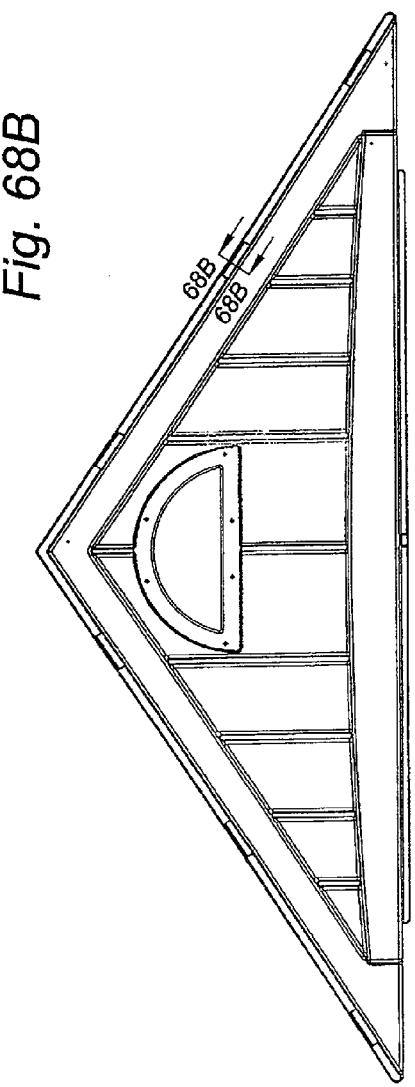

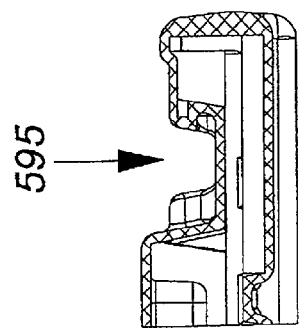
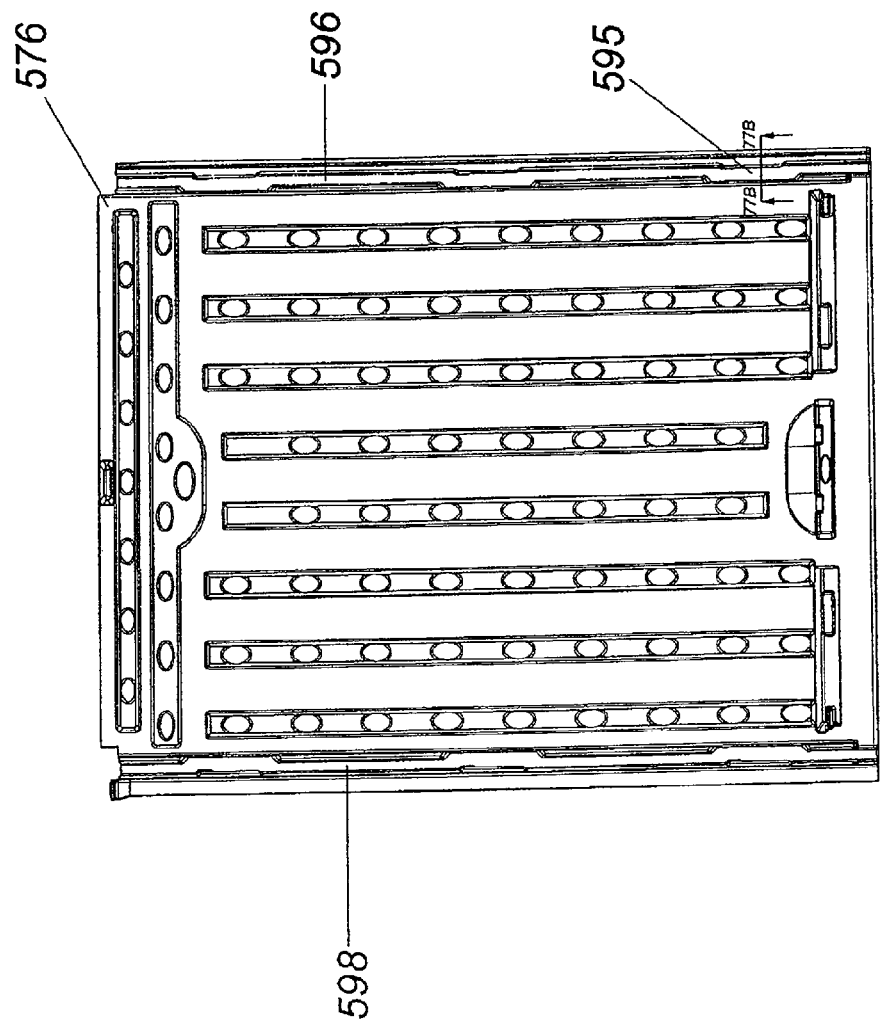

MODULAR BLOW MOLDED SHED WITH CONNECTORS

CROSS REFERENCE TO RELATED APPLICATIONS

In accordance with 37 C.F.R. 1.76, a claim of priority is included in an Application Data Sheet filed concurrently herewith. Accordingly, the present invention claims priority as a continuation of U.S. patent application Ser. No. 13/171,778, filed on Jun. 29, 2011, entitled, "Modular Blow Molded Shed With Connectors", which claims priority under 35 USC 119(e) to the U.S. Provisional Application No. 61/360,146, filed on Jun. 30, 2010, entitled, "Modular Blow Molded Shed With Connectors", the entire disclosures of which are incorporated herein by reference.

FIELD OF THE INVENTION

This invention relates generally to utility or shed type enclosures constructed of plastic structural panels. More specifically, the present invention relates to a modular construction system utilizing blow molded plastic structural panels having integrally formed blow molded connectors to construct various sized enclosures using the same components.

BACKGROUND OF THE INVENTION

Utility sheds are a necessity for lawn and garden care, as well as general all-around home storage space. Typically, items such as garden tractors, snow blowers, tillers, ATVs, motorcycles and the like consume a great deal of the garage floor space available, forcing the homeowner to park his automobile outside.

The prior art has proposed a number of different panel systems, or kits, comprising blow molded or extruded panels and connector members for forming a wide variety of smaller sized storage structures. These structures are generally suitable to store hand tools and smaller lawn equipment. Typically, such systems require extruded metal or plastic connector members having a specific cross-sectional geometry that facilitate an engagement between such members and one or more blow molded plastic panels having a complimentary edge configuration. Due to the nature of the manufacturing process, blow molded plastic components typically cannot be formed with the intricate shapes and/or sharp corners required for integrated connectors.

A particularly common structure for the connector members is the I-beam cross section. The I-beam defines free edge portions of the connector member which fit within appropriately dimensioned and located slots in the panel members. U.S. Pat. No. D-371,208 teaches a corner extrusion for a building sidewall that is representative of the state of the art I-beam connector members. The I-beam sides of the connector engage with the peripheral edge channels of a respective wall panel, and thereby serve to join such panels together at right angles. Straight or in-line versions of the connector members are also included in the kits to join panels in a coplanar relationship to create walls of varying length.

Extruded components generally require hollow longitudinal conduits for strength. Due to the nature of the manufacturing process, the conduits are difficult to extrude in long sections for structural panels. Thus, they require connectors to achieve adequate height for utility shed walls. A common structure for connecting extruded members has a center I-beam with upper and lower protrusions for engaging the conduits. However, wall panels utilizing connectors are vulnerable to buckling under loads and may have an aesthetically unpleasing appearance. Moreover, roof loads from snow and the like may cause such walls to bow outwardly due to the clearances required between the connectors and the internal bores of the conduits. U.S. Pat. No. 6,250,022 discloses an extendable shed utilizing side wall connector members representing the state of the art. The connectors have a center strip with hollow protrusions extending from its upper and lower surfaces along its length; the protrusions being situated to slidably engage the conduits located in the side panel sections to create the height needed for utility shed walls.

The aforementioned systems can also incorporate roof and floor panels to form a freestanding enclosed structure such as a small utility shed. U.S. Pat. Nos. 3,866,381; 5,036,634; and 4,557,091 disclose various systems having inter-fitting panel and connector components. Such prior art systems, while working well, have not met all of the needs of consumers to provide the structural integrity required to construct larger sized structures. Larger structures must perform differently than small structures. Larger structures require constant ventilation in order to control moisture within the building. Large structures must also withstand increased wind and snow loads when compared to smaller structures. Paramount to achieving these needs is a panel system which eliminates the need for extruded connectors to create enclosure walls which resist panel separation, buckling, racking; and a roof system which allows ventilation while preventing weather infiltration. A further problem is that the wall formed by the panels must tie into the roof and floor in such a way as to unify the entire enclosure. Also, from a structural standpoint, the enclosure should include components capable of withstanding the increased wind, snow, and storage loads required by larger structures. From a convenience standpoint, a door must be present which can be easily installed after assembly of the wall and roof components, is compatible with the sidewalls, and which provides dependable pivoting door access to the enclosure. Also from a convenience standpoint, the structure should allow natural as well as artificial lighting. The structure should be aesthetically pleasing in appearance to blend in with surrounding structures.

There are also commercial considerations that must be satisfied by any viable enclosure system or kit; considerations which are not entirely satisfied by state of the art products. The enclosure must be formed of relatively few component parts that are inexpensive to manufacture by conventional techniques facilitated by the use of integrally formed connectors. The enclosure must also be capable of being packaged and shipped in a knocked-down state. In addition, the system must be modular and facilitate the creation of a family of enclosures that vary in size but which share common, interchangeable components.

Finally, there are ergonomic needs that an enclosure system must satisfy in order to achieve acceptance by the end user. The system must be easily and quickly assembled using integrally formed connectors requiring minimal hardware and tools. Further, the system must not require excessive strength to assemble or include heavy component parts. Moreover, the system must assemble together in such a way so as not to detract from the internal storage volume of the resulting enclosure, or otherwise detract from the internal storage volume of the resulting enclosure, or otherwise negatively affect the utility of the structure. Since the system is easily and quickly assembled using integrally formed connectors requiring minimal hardware and tools, as long as the structure's components are not damaged, the enclosure system can be disassembled and reassembled repeatedly as need.

SUMMARY OF THE INVENTION

The present invention provides a system, or kit, of blow molded panels having integrally formed connectors which combine to form an enclosure, commonly in the form of a utility shed. The corner sections, roof, wall and floor panels are formed of blow molded plastic with integrally formed connectors to interlock with one another. In one embodiment, the ends of the wall panels have locking posts that are constructed and arranged to fit into corresponding sockets and slide to an engaged position for interlocking cooperative engagement rigidly connecting the components together.

The system incorporates a minimum number of components to construct a utility enclosure by integrally forming connectors into blow molded panels. This minimizes the need for separate extruded or molded connectors to assemble the enclosure. The symmetry of the corner sections, wall, roof, floor, and door components also minimizes component shapes and simplifies enclosure construction. The interlocking construction of the corner sections and the roof headers create a structural frame that allows construction of larger enclosures. Blow molding the wall panels allows them to be formed with adequate height for a large walk-in enclosure, eliminating the need for stacking panels to achieve adequate height.

Various enclosures utilize interlocking corner sections, roof headers, wall panels and floor panels to create a structural enclosure. The wall panels are constructed to cooperate, via integrally formed connectors, with various members which allow the wall panels to be utilized for door frames and side panels, as well as corner sections. The wall panels are also constructed to accept windows for natural lighting, and may include provisions for standard electrical current hookup. The internal surfaces of the wall panels include integrally formed bosses on their inner surfaces for easy assembly of added components such as shelving, baskets, slat wall storage and the like. The embodiment also incorporates a vented gabled roof assembly and steel reinforcement. The system further includes a door assembly which may be locked in an open or closed position. The floor of the system may be constructed of a single type of floor panel. Alternatively, a front and rear floor panel may be used in combination with or without center spacer panels to permit construction of sheds having various predetermined lengths and widths. The same wall, floor and roof components are used to create an entire family of utility enclosures of varying size, and the assembly of the system requires minimal hardware and a minimum number of hand tools.

In an preferred, albeit illustrative, example, the instant invention includes a modular utility shed construction system utilizing blow molded plastic structural panels having integrally formed blow molded connectors comprising a floor assembly for enclosing the bottom of the utility shed. The floor assembly includes a floor panel member having a top surface and a bottom surface. The floor panel member further contains a first edge, a second edge opposite the first edge, a third edge substantially perpendicular to and extending between the first and the second edges, a fourth edge opposite to and substantially parallel to the third edge, wherein the distance between said first edge and the second edge define a predetermined width and the distance between the third edge and the fourth edge define a predetermined length. The floor panel member has a first member of an integrally formed first floor panel to wall panel securing assembly, preferably including a plurality of mating receptacles constructed and arranged to cooperate with a second member of the first floor panel to wall panel securing assembly integrally formed on the opposing side wall assembly, front wall assembly, rear wall assembly, corner post members, or combinations thereof. The floor assembly also has a first member of an integrally formed second floor panel to wall panel securing assembly, preferably including a plurality of sockets constructed and arranged to slidably cooperate with a second member of the floor panel to wall panel securing assembly integrally formed on said pair of side wall assemblies, front wall assembly, rear wall assembly, corner post members, or combinations thereof. The formation of the first and second floor to wall panel securing assemblies provides the floor panel horizontal alignment, thereby forming a substantially perpendicular relationship with the pair of side wall assemblies, front wall assembly, rear wall assembly, and corner post members, and preventing separation in a plurality of dimensions.

The instant invention also contains a pair of side wall assemblies for enclosing the left side and right side of the utility shed. The pair of side wall assemblies includes one or more like-configured side wall panel members wherein each of the side wall panel members includes a top edge including one or more wall panel to roof assembly securing members constructed and arranged to secure the pair of side wall assemblies to a roofing assembly in such a manner as to prevent separation in a plurality of directions, and a bottom edge opposite the top edge. The bottom edge includes a second member of an integrally formed first floor panel to wall panel securing assembly, preferably including a plurality of locking plugs constructed and arranged to cooperate with the first member of the first floor panel to wall panel assembly integrally formed on the floor panel. The bottom edge may also contain a first member of an integrally formed second floor panel to wall panel securing assembly, preferably including a plurality of slide and lock locking posts constructed and arranged to slidably cooperate with the first member of the second floor panel to wall panel securing assembly integrally formed on the floor panel. The side wall panels have a left side edge substantially perpendicular to and extending between the top and the bottom edges. The left side edge includes one or more of a first or second member of an integrally formed wall panel to wall panel securing assembly. The first member preferably includes an outwardly extending keyboss sized and shaped to fit within a corresponding receptacle on an adjacent panel member. The second member preferably includes a keyboss receptacle sized and shaped to receive the outwardly extending keyboss on an adjacent panel member. The first member and the second member cooperate to form the wall panel to wall panel assembly for providing vertical alignment with a front wall assembly, rear wall assembly or a like-configured side wall assembly, and for preventing separation in a plurality of directions. The wall panels further contain a right side edge opposite to and substantially parallel to the left side edge. The right side edge preferably includes one or more of the first or second members of the integrally formed wall panel to wall panel securing assembly.

The utility shed in accordance with the instant invention includes a front wall assembly for enclosing the front of the utility shed. The front wall assembly includes one or more like-configured front wall panels, each of the front wall panels containing a top side edge including one or more wall panel to roof assembly securing members constructed and arranged to secure the front wall assembly to a roofing assembly in such a manner as to prevent separation in a plurality of directions. The front wall panel includes a bottom edge opposite the top edge, with the bottom edge including a second member of an integrally formed first floor panel to wall panel securing assembly, preferably including a plurality of locking plugs constructed and arranged to cooperate with the first member of the first floor panel to wall panel securing assembly integrally formed on the floor panel. The bottom edge may also contain a first member of an integrally formed second floor panel to wall panel securing assembly, preferably including a plurality of slide and lock locking posts constructed and arranged to slidably cooperate with the first member of the second floor panel to wall panel securing assembly integrally formed on the floor panel. The first and second assemblies provide horizontal alignment with the floor assembly, thereby forming a substantially perpendicular relationship, and for preventing separation in a plurality of directions. The front wall panel also contains a pair of opposing side edges substantially perpendicular to and extending between the top side and the bottom side, wherein at least one of the opposing side edges includes a front wall to door assembly connector assembly member constructed and arranged to receive a door hinge of a door assembly for enclosing and providing ingress into and egress from the utility shed. The opposing side edge contains a corner post member.

The utility shed in accordance with the instant invention includes a rear wall assembly for enclosing the back of the utility shed. The rear wall assembly includes one or more like-configured rear wall panels. Each of the rear wall panels contains a top side edge including one or more wall panel to roof assembly securing members constructed and arranged to secure the rear wall assembly to a roofing assembly in such a manner as to prevent separation in a plurality of directions. The rear wall panel contains a bottom edge opposite the top edge. The bottom edge includes a second member of an integrally formed first floor panel to wall panel securing assembly, preferably including a plurality of locking plugs constructed and arranged to cooperate with the first member of the first floor panel to wall panel securing assembly integrally formed on the floor panel. The bottom edge also contains a first member of an integrally formed second floor panel to wall panel securing assembly, preferably including a plurality of slide and lock locking posts constructed and arranged to slidably cooperate with the first member of the second floor panel to wall panel securing assembly integrally formed on the floor panel for providing horizontal alignment with the floor panel assembly, thereby forming a substantially perpendicular relationship and preventing separation in a plurality of directions. The rear wall panels contains a pair of opposing side edges arranged substantially perpendicular to and extending between the top side and the bottom side, wherein one of the opposing side edges includes one or more of said first or second members of the side wall to side wall assembly for connecting to an adjacent side wall assembly in a substantially perpendicular relationship or to a like-configured rear wall panel member to form a substantially juxtaposed, coplanar relationship. The wall panel to wall panel securing assembly prevents separation in a plurality of directions. One of the opposing side edges includes at least one corner post member.

The utility shed in accordance with the instant invention includes a roof assembly, wherein the roof assembly includes one or more wall panel to roof assembly securing members constructed and arranged to cooperate with the front wall assembly, the rear wall assembly, and the side wall assemblies in an interlocking relationship for enclosing the top of said utility shed.

Cooperation of the wall panels using the securing assembly members results in a utility shed, which when fully assembled, is constructed in such a manner so as to prevent separation of the interconnected panel members of each assembly in a plurality of directions and panel separation associated with buckling, racking, or bowing.

Accordingly, it is an objective of the present invention to provide a utility enclosure system which utilizes plastic structural frame and panel members having integrated connectors for creating enclosures of varying dimension using common components.

It is a further objective of the instant invention to provide a utility enclosure system wherein the structural panel members include integrated connectors which accommodate blow molding plastic formation of the panel components for increased structural integrity.

It is yet another objective of the instant invention to provide a utility enclosure system which utilizes structural corner assemblies for increased enclosure rigidity.

It is a further objective of the instant invention to provide a utility enclosure system which utilizes an integral/interchangeable steel frame truss system and horizontal beam support.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 21 is a front view of the interior surface of the right front wall panel of the front wall assembly, illustrating the corner post member in a first, non-hinged position;

FIG. 22 is a top view of the bottom surface of the right front wall panel of the front wall assembly in a non-hinged position;

FIG. 23 is a front view of the interior surface of the right front wall panel of the front wall assembly, illustrating the corner post member in a second, hinged position;

FIG. 24 is a top view of the bottom surface of the right front wall panel of the front wall assembly in a hinged position;

FIGS. 35-37 illustrate the alignment of the right front panel corner post member with the floor panel;

FIG. 38 illustrates the locking plug/mating receptacle;

FIG. 39A is a perspective view illustrating the interconnection of the left side panel with the left front panel corner post member;

FIG. 39B illustrates the slide and lock locking post;

FIGS. 48-50 illustrate further steps in the assembly of the panels;

FIG. 51 illustrates the locking plug interlocking with the receptacle;

FIGS. 52A, 52B, and 52C illustrates connection of a rear panel corner post member to a side panel with connector pins and screws;

FIGS. 58, 59, 60A and 60B illustrate the alignment of the right front wall corner post member with the right side panel;

FIG. 62 is a perspective view of the right side door of the door assembly;

FIG. 63A illustrates one embodiment of the hinge mount;

FIG. 63B illustrates further construction of the hinge assembly;

FIG. 63C illustrates assembly of the pinch bolt to a hinge body;

FIG. 63D illustrates clamping the hinge body to a corner post;

FIG. 64 illustrates the interconnection of the right door to the right front wall corner post member;

FIG. 65D is an illustration of a door hinge slot located on a front panel member;

FIG. 65E is a partial close-up view of the door hinge slot;

FIG. 68A is a front view of the exterior side of the front roof header;

FIG. 68B is a cross sectional view taken along lines 68B-68B of FIG. 68A;

FIG. 77A is a plan view of the underside of the roof panel;

FIG. 77B is a cross sectional view taken along lines 77B-77B of FIG. 77A;

DETAILED DESCRIPTION OF THE INVENTION

Figure 1:
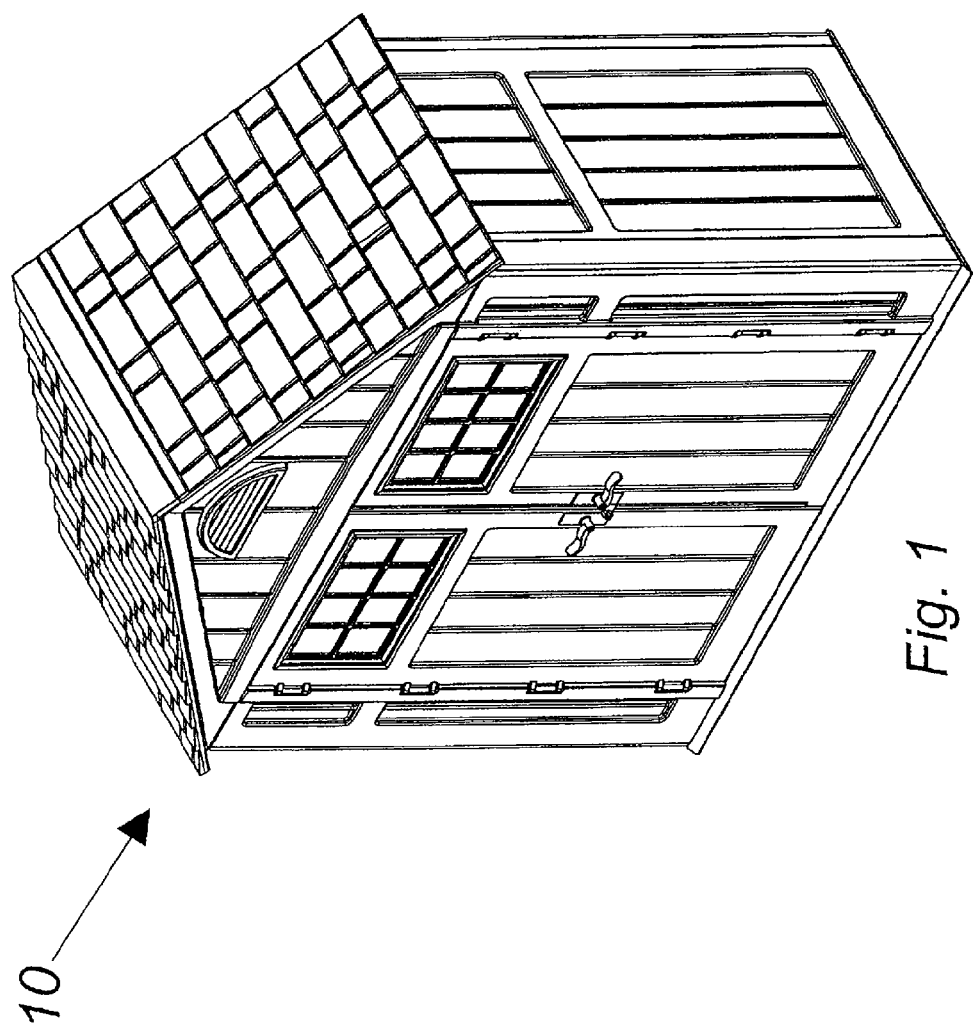
FIG. 1 is a perspective view of one embodiment of the utility enclosure of the instant invention.
Figure 2:
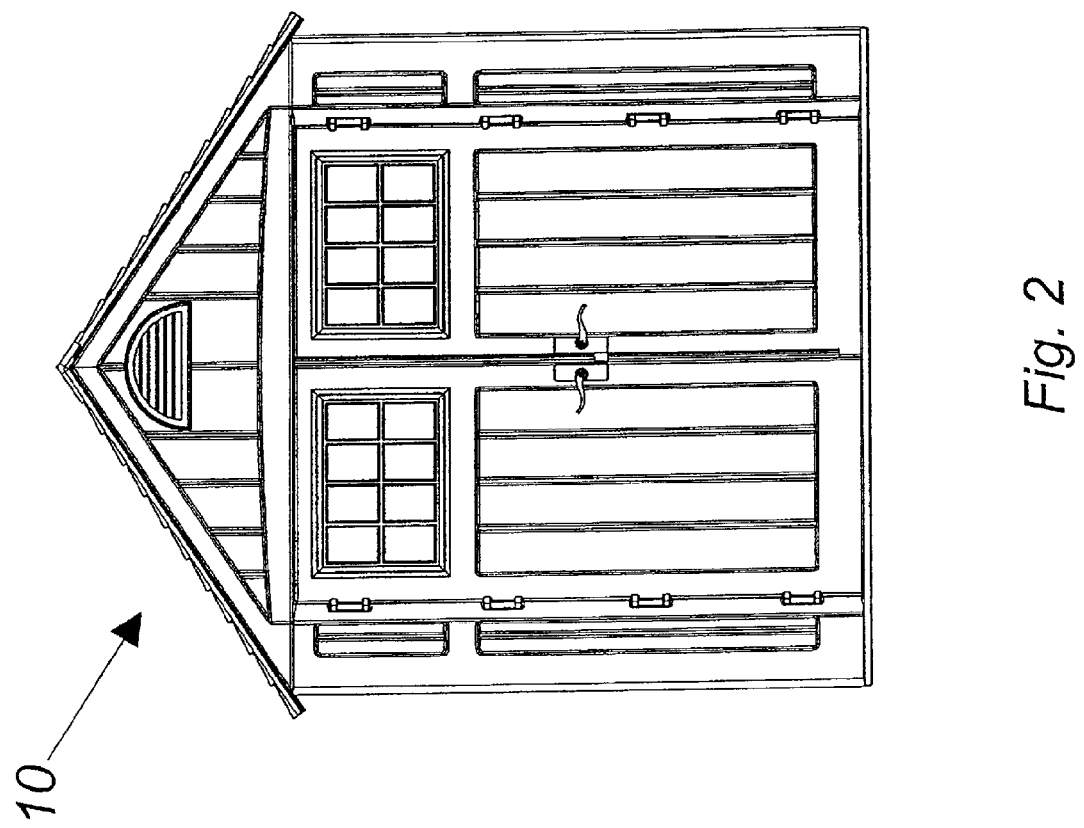
FIG. 2 is a front view of an illustrative embodiment of the utility enclosure of the instant invention.
Figure 3:
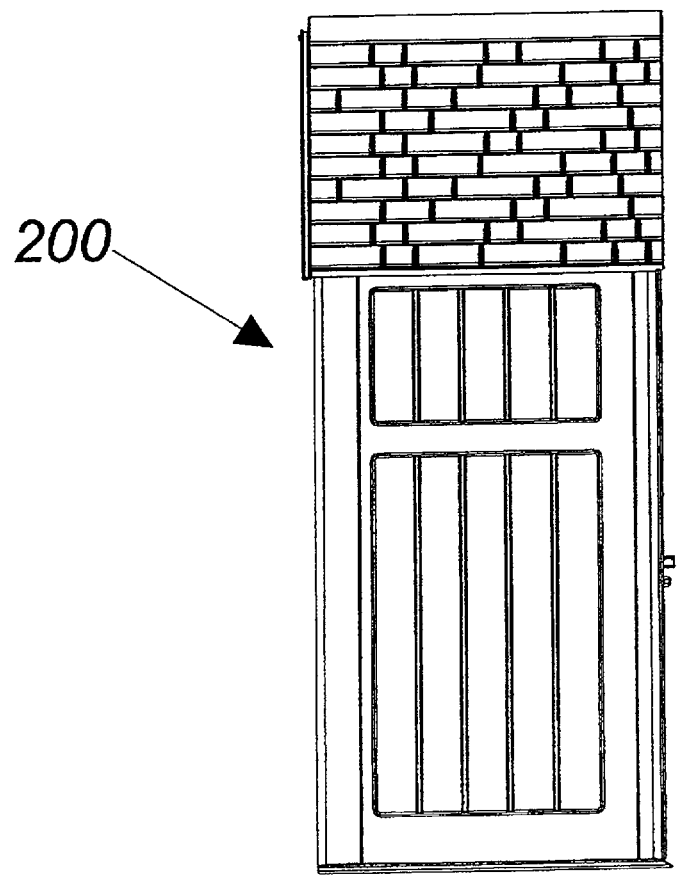
FIG. 3 is a left side view of the embodiment illustrated in FIG. 1.
Figure 4:
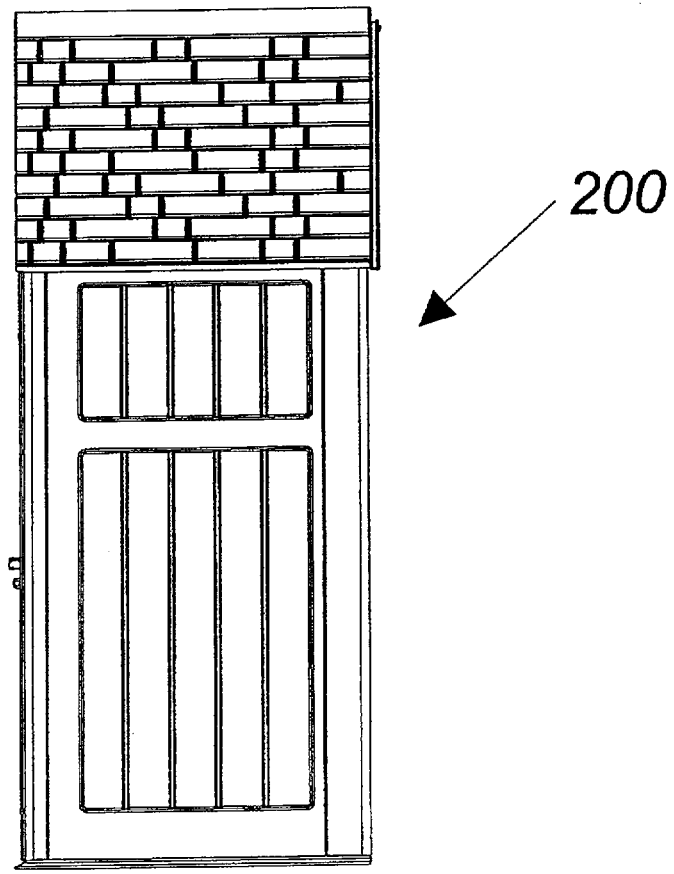
FIG. 4 is a right side view of the embodiment illustrated in FIG. 1.
Figure 5:
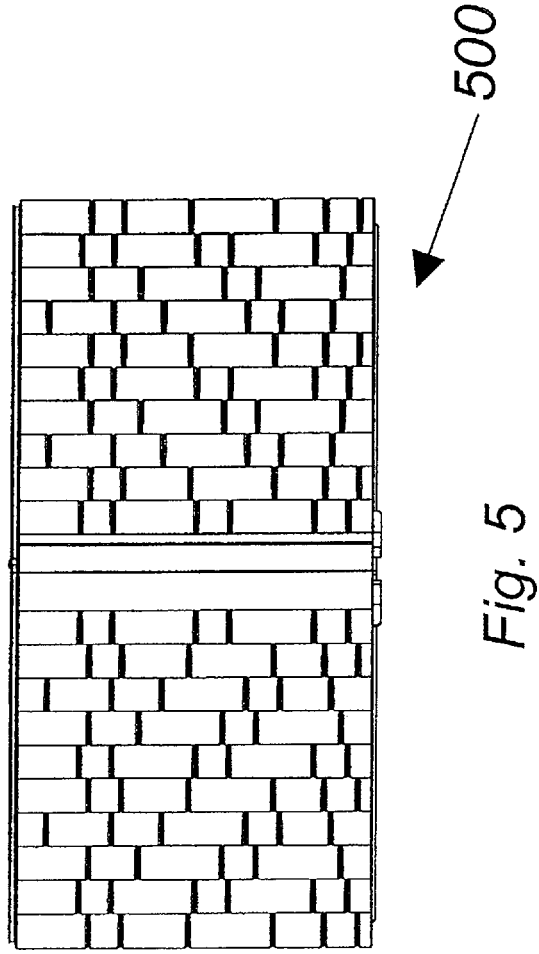
FIG. 5 is a top view of the embodiment illustrated in FIG. 1.
Figure 6:
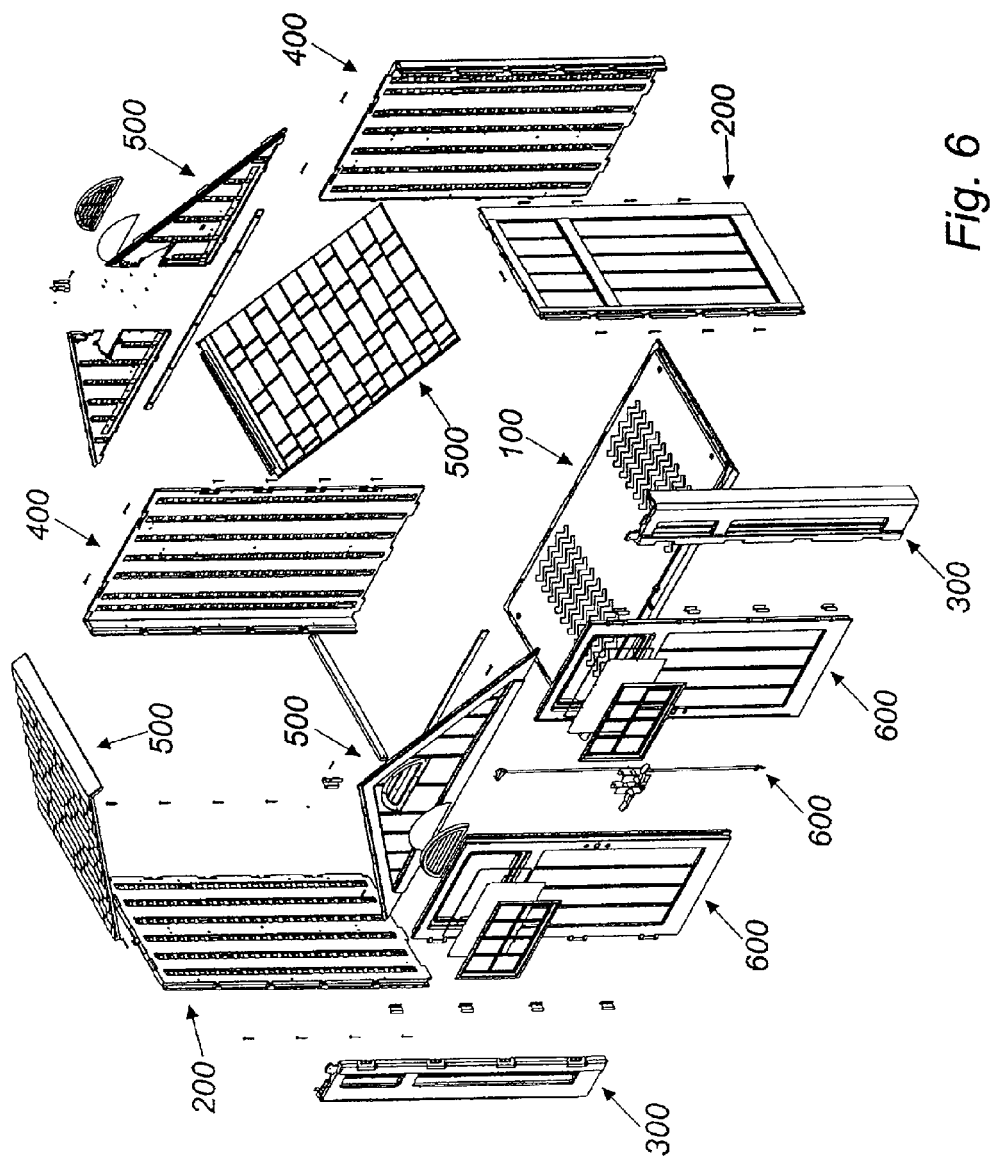
FIG. 6 is an exploded view of the instant invention illustrated in FIGS. 1-5.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

FIGS. 1-9 which are now referenced show isometric and exploded views of a utility enclosure, generally referenced as 10, constructed according to a preferred embodiment of the present invention. The enclosure is made up of a floor assembly 100, left and right side wall assemblies 200, a front wall assembly 300, a rear wall assembly 400, a roof assembly 500, and a door assembly 600. In the preferred embodiment, the panels comprising the assemblies are formed of, but not limited to, a suitable plastic such as polystyrene, polypropylene or polyethylene, through the process of blow molding. The result is that the panels comprising floor assembly 100, left and right side wall assemblies 200, front wall assembly 300, rear wall assembly 400, and roof assembly 500 of the enclosure 10 are formed as unitary panels with integral connectors and cross bracing. The panels comprising the assemblies are tied together through various connectors, which are formed of, but not limited to, a suitable plastic such as polystyrene, polypropylene or polyethylene, through the process of injection molding. The steel roof support assembly is made of steel components.

Figure 9:
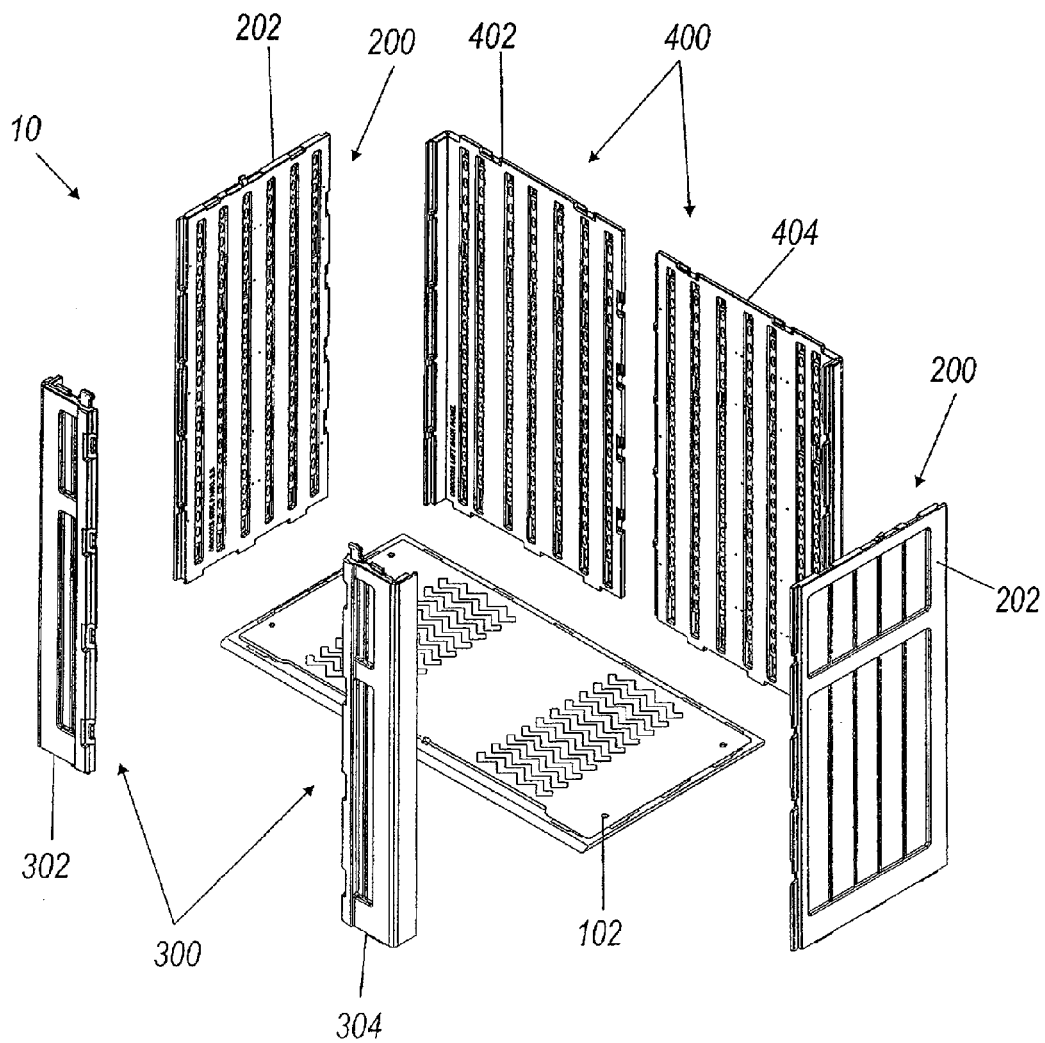
FIG. 9 is a partial exploded view of the illustrative embodiment of the utility enclosure of the instant invention.
Figure 10:
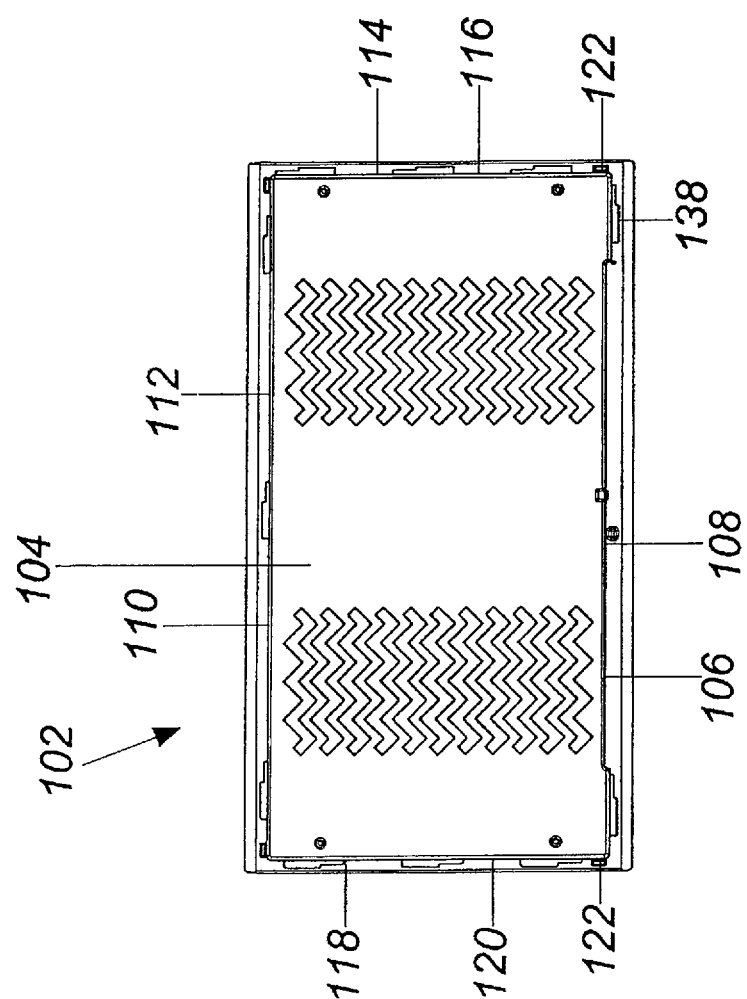
FIG. 10 illustrates one embodiment of the floor panel assembly of the utility enclosure of the instant invention.

Referring to FIGS. 9-10, the enclosure 10 includes one or more like-constructed floor panels 102. Each of the floor panels 102 contains an interior surface 104 and an exterior surface, not illustrated. Each of the floor panels further contains a plurality of sides, including a front side 106 having a front side edge 108, a rear side 110 positioned opposite to and being substantially parallel to the front side 106 and having a rear side edge 112, a right side 114 being substantially perpendicular to and extending between the front side 106 and rear side 110 and having a right side edge 116, and a left side 118 positioned opposite the right side and being substantially perpendicular to and extending between the front side 106 and rear side 110 and having a left side edge 120. The edges 108, 112, 116 and 120 define the perimeter of the floor panel.

The floor panel 102 contains a plurality of first members of a first floor panel to wall panel securing assembly, illustrated herein as mating receptacles 122. The mating receptacles 122 are attached to or positioned within the perimeter and are constructed and arranged to receive the second member of a first floor panel to wall panel securing assembly, such as locking plugs, that are molded into the side wall, the front wall, the rear wall panels as well as the corner post members associated with the front, rear or side walls. The first floor panel to wall panel securing assembly provides horizontal alignment and secures the side wall assemblies, the front and rear assemblies, and/or the corner post members connected to the front and rear assemblies to the floor assembly. The first floor panel to wall panel securing assembly further prevents the floor assembly from side to side separation from the side wall assembly and the rear wall assembly.

Figure 11:
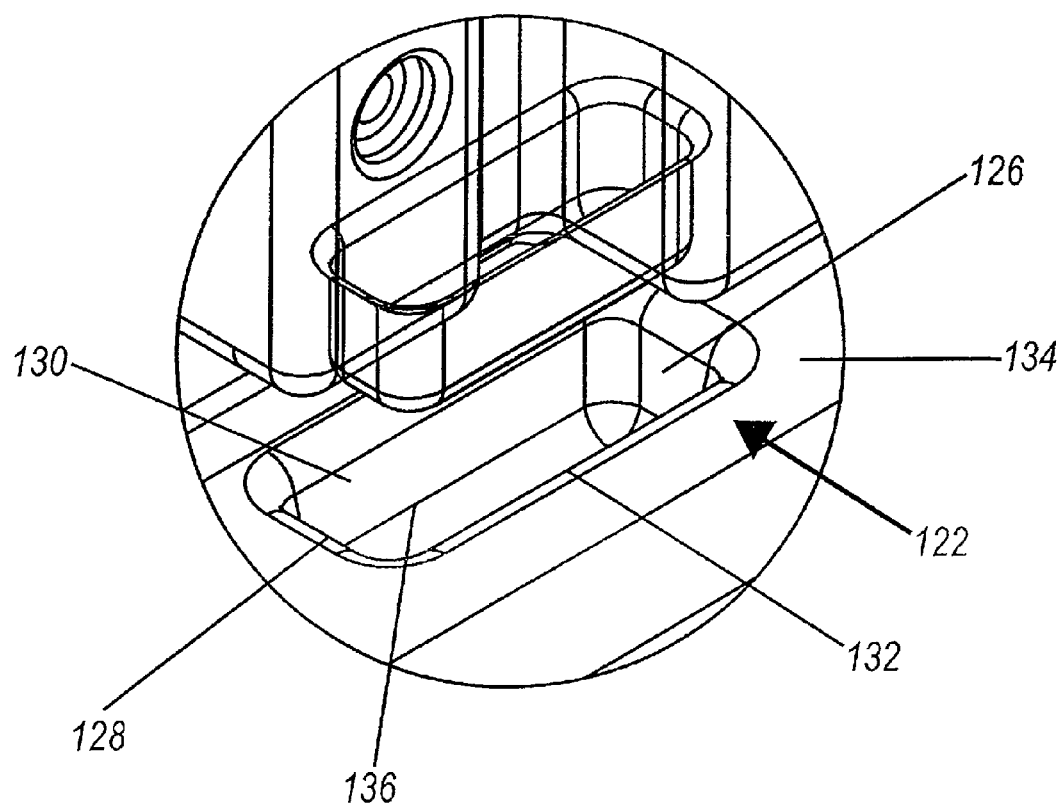
FIG. 11 is an illustrative embodiment of the locking plug/locking plug receptacle securing assembly.
Figure 12:
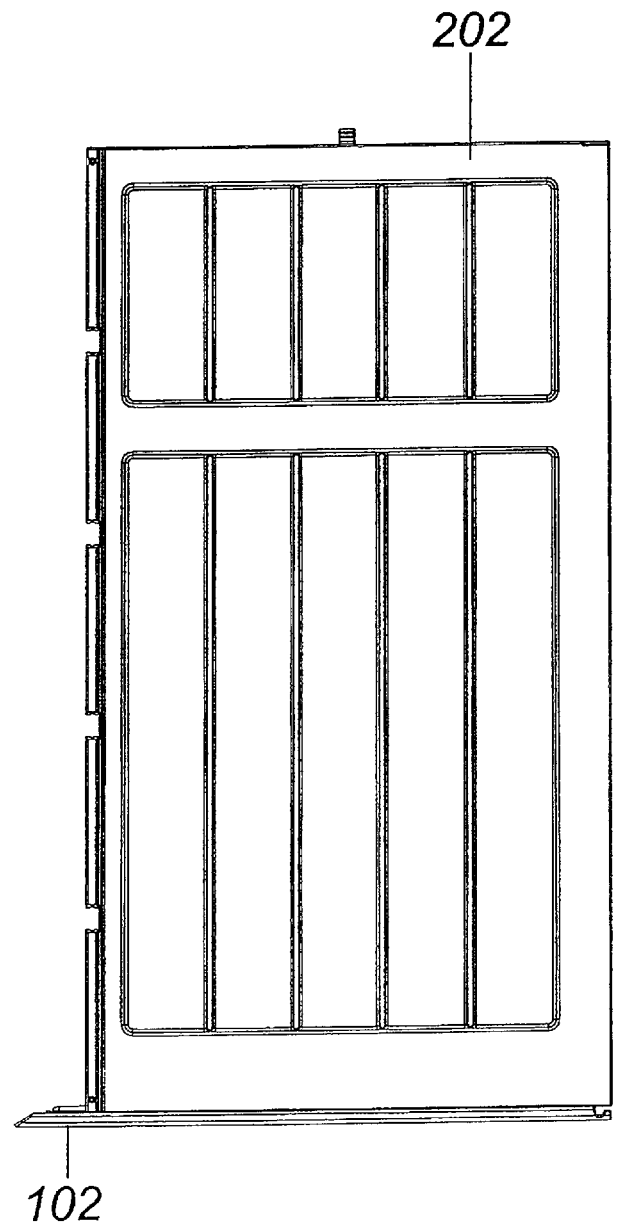
FIG. 12 is an illustrative embodiment of a panel attachment to the floor panel.

FIG. 11 illustrates a particular embodiment of the first member of an integrally formed first floor panel to wall panel securing assembly, illustrated as a mating receptacle 122, containing a plurality of side walls 126, 128, 130 and 132 extending downward from the top surface 134 and optionally terminating at a bottom wall, not illustrated. The recessed cavity 136 formed by side walls 126, 128, 130 and 132 receives a second member of the first member of an integrally formed first floor panel to wall panel securing assembly, such as locking plugs. While the walls of the mating receptacle 122 form a generally rectangle shape with rounded edges, the mating receptacle can be constructed in various sizes and shapes, preferably substantially conjugate in shape with the locking posts. The perimeter of the floor panel 102 may also contain one or more first members of a second floor panel to wall panel securing assembly for attaching the side assemblies, the front and rear assembly, or the door assembly to the floor panel.

FIGS. 12-15 illustrate the first and second members of the integrally formed second floor panel to wall panel securing assembly. The first member of the second floor panel to wall panel securing assembly is illustrated as a plurality of slide and lock locking post sockets 138 constructed and arranged to cooperate with a plurality of second members of the integrally formed second floor panel to wall panel securing assembly, illustrated herein as slide and lock locking posts 234 located on each of the side wall assemblies, front wall assembly, rear wall assembly, corner post members, or combinations thereof. The slide and lock locking post sockets 138, as illustrated in FIG. 15A, contain a main body portion 140 having side walls 142, 144, and 146 extending inward from the top surface 148 toward a bottom wall (not illustrated), and forming a first slotted cavity 150. Extending from the main body portion 140 is a finger-like extension 143 having side walls 151, 152, and 154. The side walls extend inward from the top surface 148 toward a bottom wall (not illustrated), forming a second slotted cavity 156 which is continuous with the first slotted cavity 150.

Alternatively, the first cavity 150 and the second cavity 156 may not be defined by side walls. The overall shape of the slide and lock locking post sockets 138 is conjugate to the shape of the slide and lock locking post 224. The slide and lock locking post sockets 138 engages the slide and lock locking post 224 through simply slipping the slide and lock locking post 224 into the slide and lock socket or through an interference fit, and may optionally contain a catch member (not shown) for providing tactile click engagement. The second floor panel to wall panel securing assembly also provides the floor panels horizontal alignment with the wall panels to form a substantially perpendicular relationship with each of the pair of side wall assemblies, the front wall assembly, and the rear wall assembly, and for preventing connected adjacent panels from side to side separation relative to each other and separation in which one panels moves in an upward or downward direction relative to the other panel.

Figure 7:
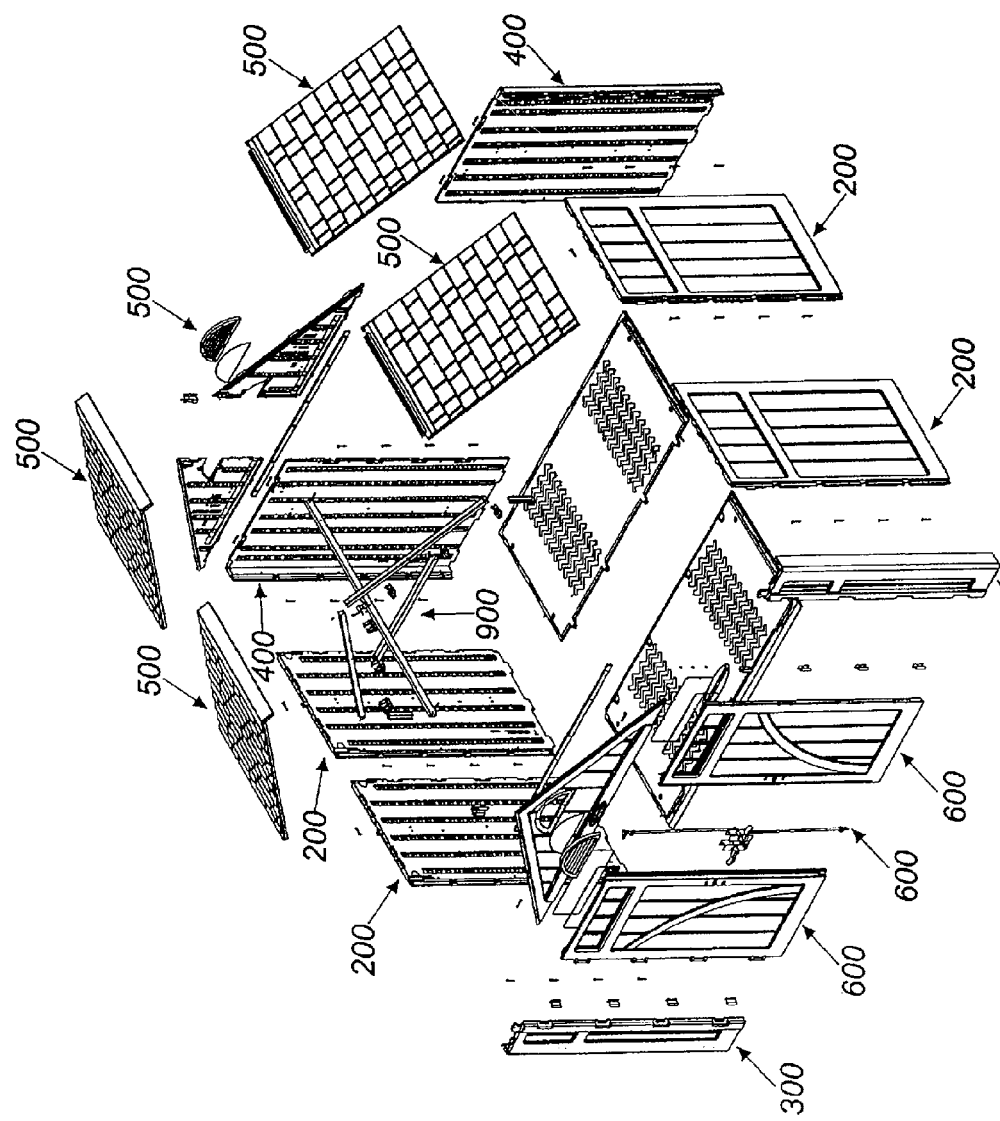
FIG. 7 is an exploded view of an alternative embodiment of the utility enclosure of the instant invention, having a two panel side wall assembly.
Figure 8:
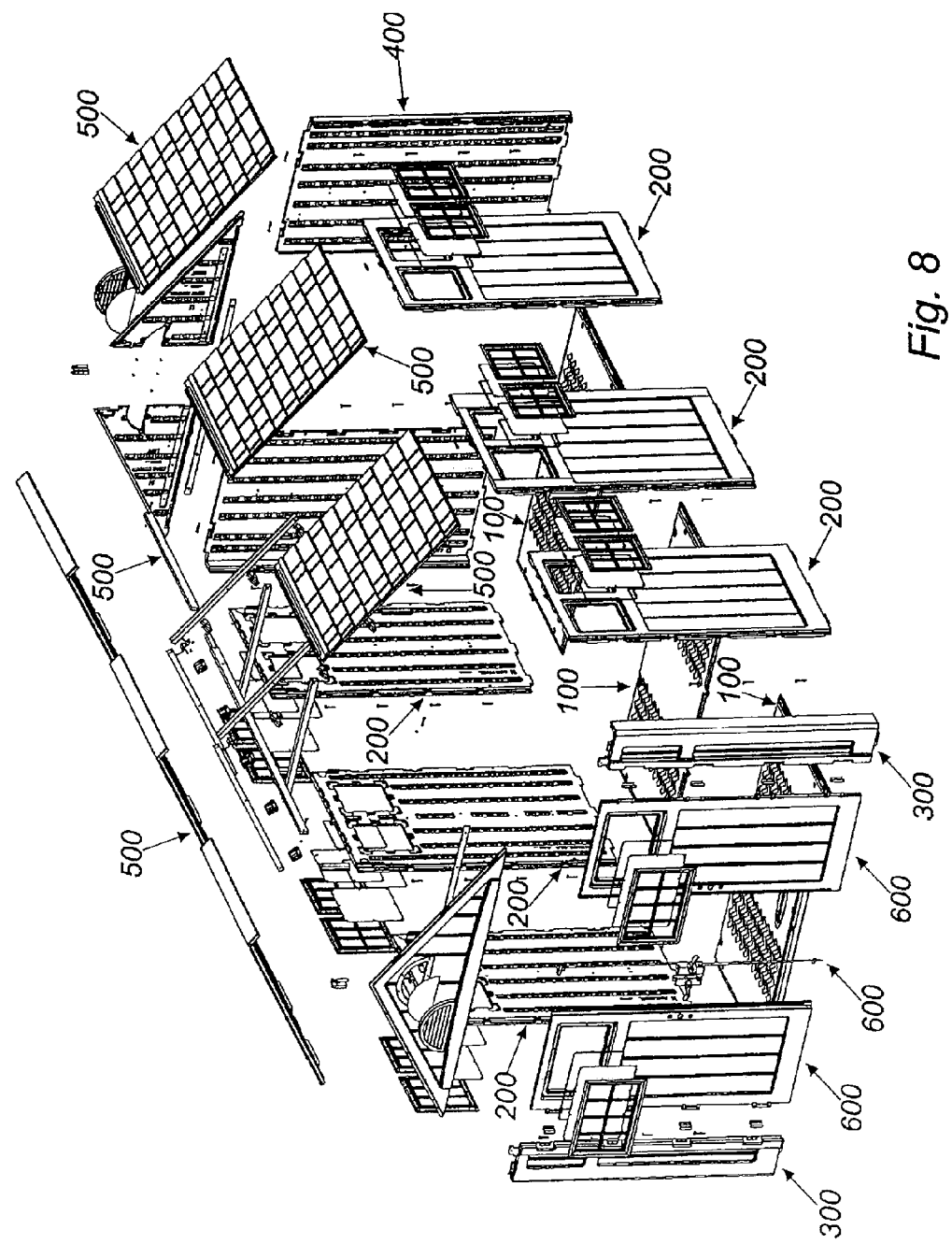
FIG. 8 is an exploded view of an alternative embodiment of the utility enclosure of the instant invention, having a three panel side wall assembly.
Figure 16:
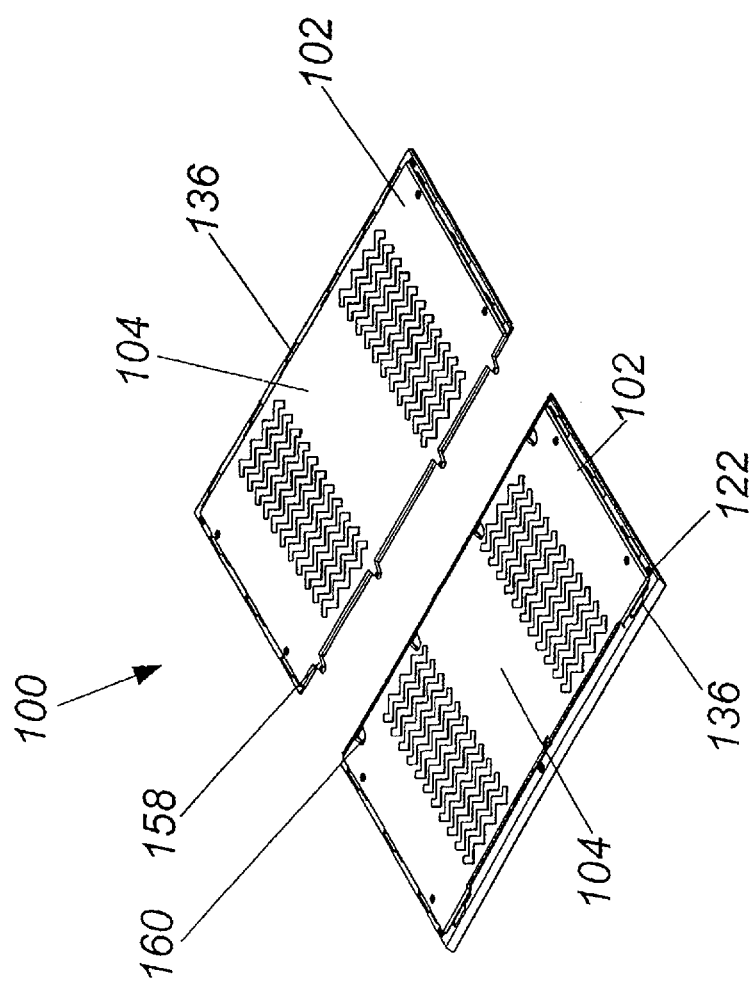
FIG. 16 is an alternative embodiment of the floor panel, illustrating multiple panel connection capability.

While FIG. 9 illustrates enclosure 10 containing a single floor panel 102, an alternative embodiment of the instant invention includes an enclosure 10 having multiple panels, including two panels, see FIG. 7, three panels, see FIG. 8, secured together in a substantially juxtaposed, coplanar relationship. In this manner, the enclosure 10 can be constructed to various sizes, be capable of accepting additional panels without the need of purchasing an entire new assembly, and can be shipped using minimal spacing and packaging. To this effect, floor panel 102 may contain one or more members of a floor panel to floor panel securing assembly illustrated as finger-like extensions 158 constructed and arranged to mateably engage socket 160, see FIG. 16.

The multiple floor panels 102 are assembled by juxtapositioning the edges of each of the respective floor panels and sliding the finger-like extensions 158 of one panel (first member of a floor panel to floor panel securing assembly) into the sockets 160 (second member of a floor panel to floor panel securing assembly) of the adjacent panel such that their respective interior surfaces 104 align in a coplanar arrangement. The result is a positive mechanical connection between each of the individual floor panels, thus creating floor assembly 100. The engagement between the finger-like extensions 158 and the sockets 160 can be secured through securing hardware, such as screws. The floor panels 102 therefore, are interconnected to each other to form a utility shed floor assembly 100 having a width determined by the width of the panels and a length determined by the number of panels assembled. In this manner the length of the shed may be increased or decreased to suit the user's needs by adding or subtracting the number of panels assembled.

Referring to FIGS. 9, 10, 14, 15A/B, 17 and 18, the structural side wall assemblies are illustrated. The side wall panel 202 constitutes one of a plurality of like-configured panels in the system used to construct the left and right side wall assemblies 200. As referred to in this document, the side walls, as well as all other panels, are referenced to by the their position, left and right, as determined by the reader's frame of reference. The structural side wall panel is configured to have a top end 204 having a top end edge 206. Arranged substantially parallel to and opposite of the top side end is a bottom end 208 having a bottom side edge 210. The side wall panel contains a left side end 212 having a left side end edge 214 and a right side end 216 having a right side end edge 218. Each of the side edges 214 and 218 are arranged substantially perpendicular to and extending between the top end 204 and the bottom end 208. Attached to both the left side end 212 and the right side end 216 is a side wall panel flange 219. The top end 204 contains one or more wall panel to roof assembly securing members constructed and arranged to secure the pair of side wall assemblies to a roofing assembly in such a manner as to prevent separation in a plurality of directions, illustrated herein as one or more protruding roof panel sockets 220. In addition to the one or more protruding roof panel sockets 220, the top end 204 also contains wall panel to roof assembly securing member 222, illustrated herein as a clasp.

The bottom end 208 includes a second member of an integrally formed first floor panel to wall panel securing assembly including a plurality of locking plugs constructed and arranged to cooperate with the first member of the first floor panel to wall panel assembly integrally formed on the floor panel. The bottom end 208 may also include one or more of a second member of an integrally formed second floor panel to wall panel securing assembly illustrated herein as a slide and lock locking post 224. The slide and lock locking post 224 is constructed and arranged to slidably cooperate with the slide and lock locking socket 138 of the floor panel 102, and includes a top end 226, a bottom end 228, a left end 230 and a right end 232, and an internal cavity defined by a partially curved edge 234 and a ramping surface 236, see FIG. 14. The left end 232 may be open, exposing the internal cavity.

The side wall panel flange 219 of the left side end 212 and the right side end 216 is constructed and arrange to allow for engagement of additional side wall panels (or intermediate side wall panels), the front or rear assemblies, the front wall corner post members, or the rear wall corner post members in such a manner as to provide water resistant overlap, acting to impede rain driven water and other foreign debris from entering the interior of the enclosure 10. In addition to limiting water from entering the interior of the enclosure, the flanges 219 contain one or more first or second members of integrally formed wall panel to wall panel securing assemblies, illustrated herein as a plurality of key bosses 238 and/or key boss slotted receptacles 240. The key bosses 238 are constructed and arranged to cooperate with the key boss slotted receptacles 240 to provide vertical, coplanar attachment to additional side wall panels (intermediate side wall panels, the front or rear assemblies, or the corner post member attached to either the front or rear wall assemblies, and to prevent larger separation in a plurality of directions, such as preventing one panel from moving laterally relative to another panel, preventing one panel from moving in an upward or downward position relative to the other panels, or movement associated with buckling, racking, and bowing.

Figure 19:
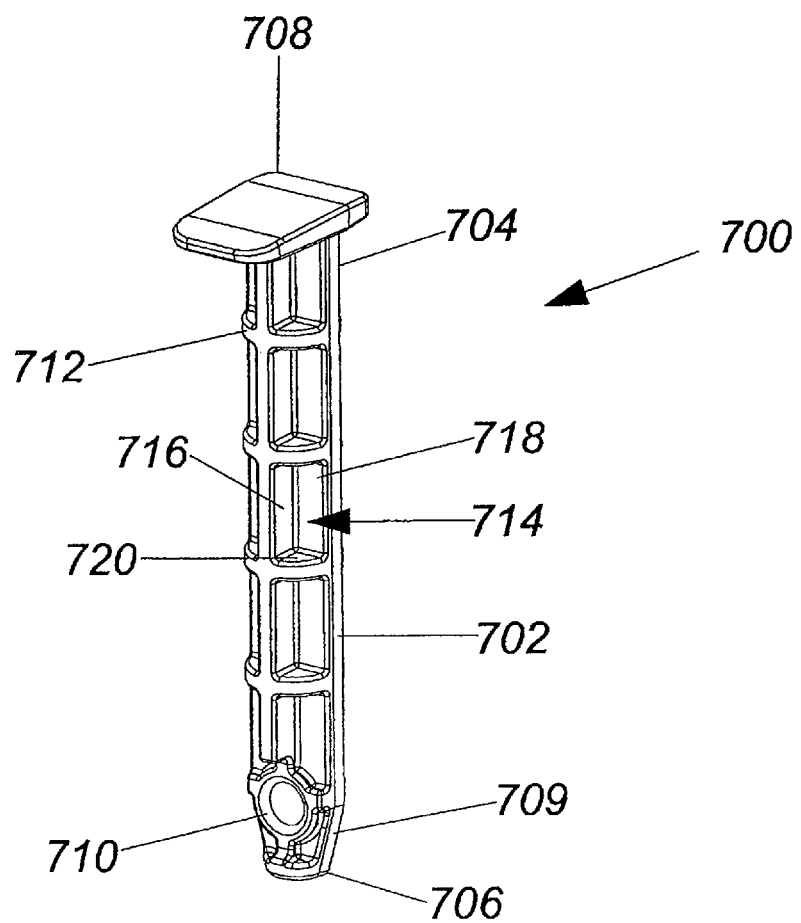
FIG. 19 is a perspective view of one embodiment of a connector pin.
Figure 20A:
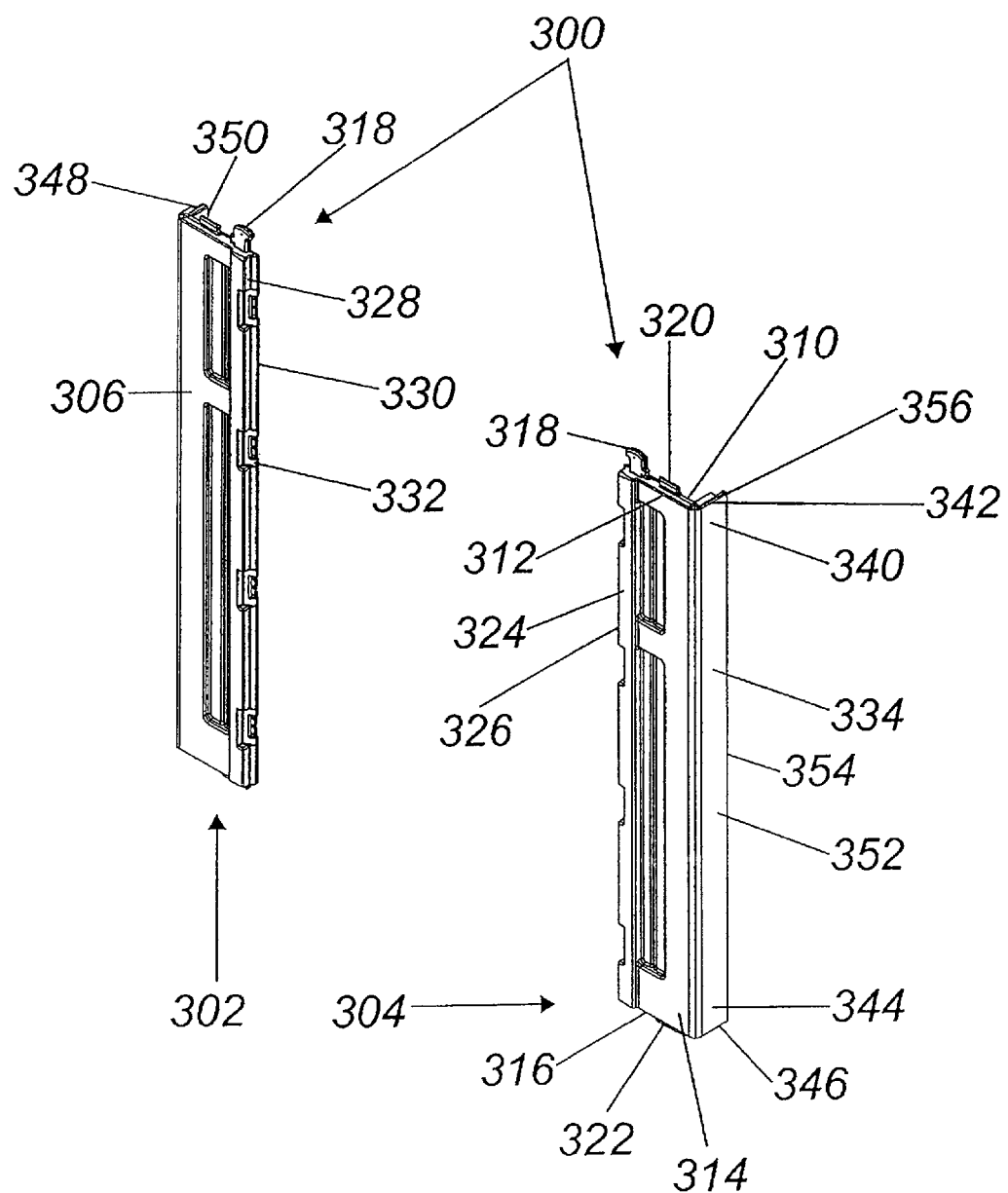
FIG. 20A is a perspective view of one embodiment of the left and right front wall panels of the front wall assembly.
Figure 20B:
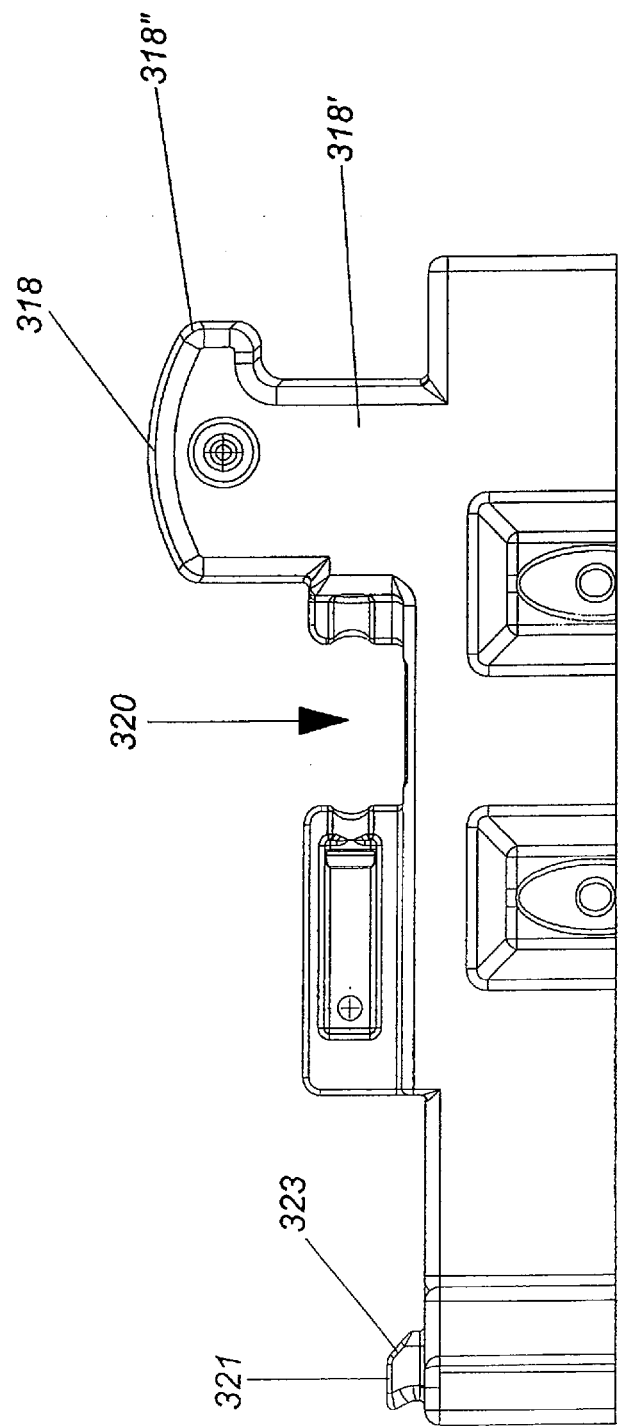
FIG. 20B is a partial view of a front wall panel, illustrating several members of the integrally formed front wall panel connectors used to attach to one or more of the roof panel connectors.

The mating panels are interconnected through overlapping and engagement of the key bosses 238 and key boss slotted receptacles 240, and are secured in place through insertion of an injection molded securing member, illustrated herein as a panel connector pin 700. As illustrated in FIG. 19, the connector pin 700 includes a generally cylindrically shaped main body 702, top portion 704, and a bottom portion 706. The top portion 704 includes a flattened or widened head 708 which provides a greater surface area for insertion and also ensures that when inserted, the connector pin 700 is inserted in the proper orientation. At the bottom portion 706, the connector pin 700 includes a tapered end 709. Additionally, at or near the bottom portion 706 is a round screw boss opening 710. The round screw boss opening 710 can be constructed and arranged to receive an additional fastener element to eliminate the possibility of the connector pin 700 becoming dislodged when inserted within a key boss. Positioned along the generally cylindrically shaped main body 702 are ribs 712 for added structural support. The cylindrically shaped main body 702 may be constructed of a solid body or, as illustrated, contain openings 714 between each of the ribs 712 defined by diverging side walls 716 and 718 and bottom wall 720.

Figure 17:
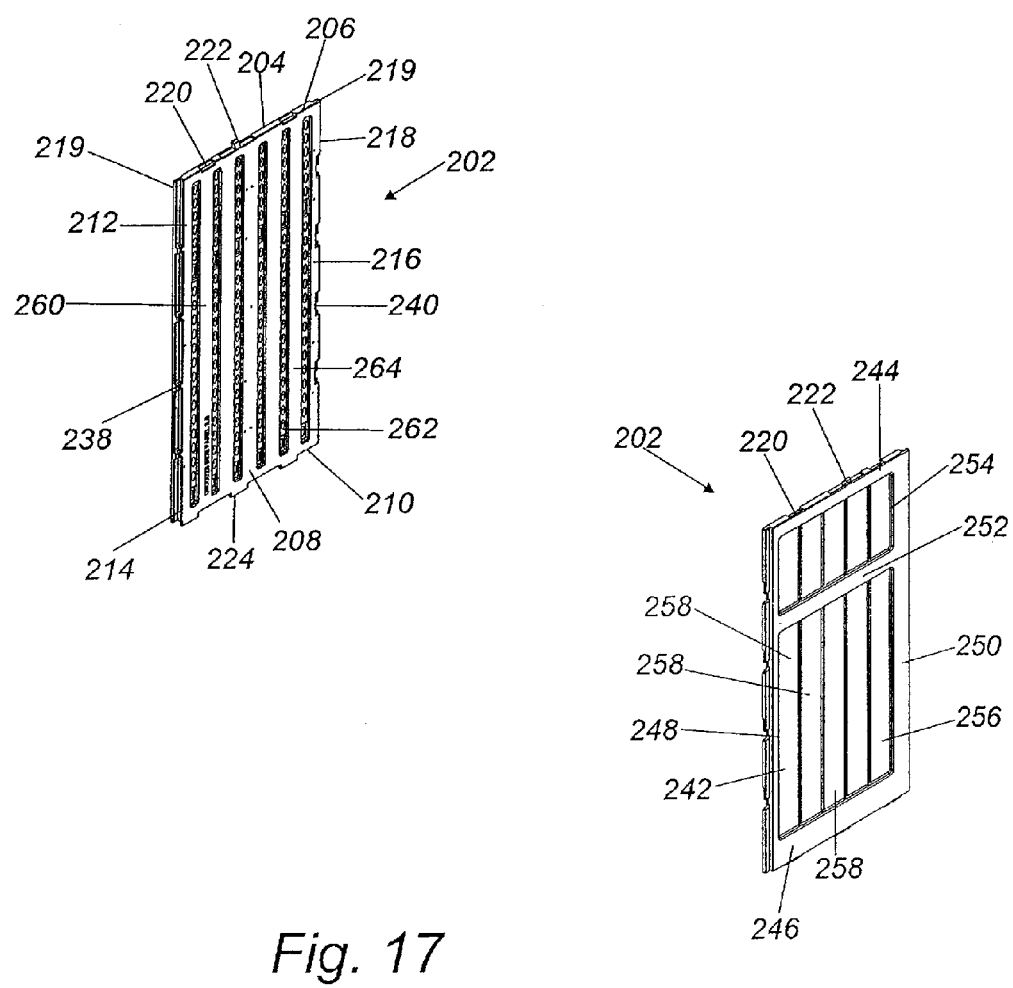
FIG. 17 are perspective views of one embodiment of the side panel of the utility enclosure of the instant invention.

The exterior surface 242 of the side wall panels 202 may be constructed of a smooth surface. Alternatively, as illustrated in FIG. 17, the exterior surface 242 of the side wall panels 202 may contain frame edges including a top horizontal frame 244 substantially parallel and opposite a bottom horizontal frame 246. A first vertical frame 248, perpendicular to and extending between the top horizontal frame 244 and the bottom frame 246 is positioned opposite a second vertical frame 250. The second vertical frame is also aligned perpendicular to and extending between the top horizontal frame 244 and the bottom horizontal frame 246. An intermediate horizontal frame 252 is positioned between the top horizontal frame 244 and the bottom horizontal frame 246, thereby separating the side panel 202 into a top section 254 and a bottom section 256. As illustrated, both the top section 254 and the bottom section 256 include a plurality of juxtaposed horizontal panel 258.

Figure 18:
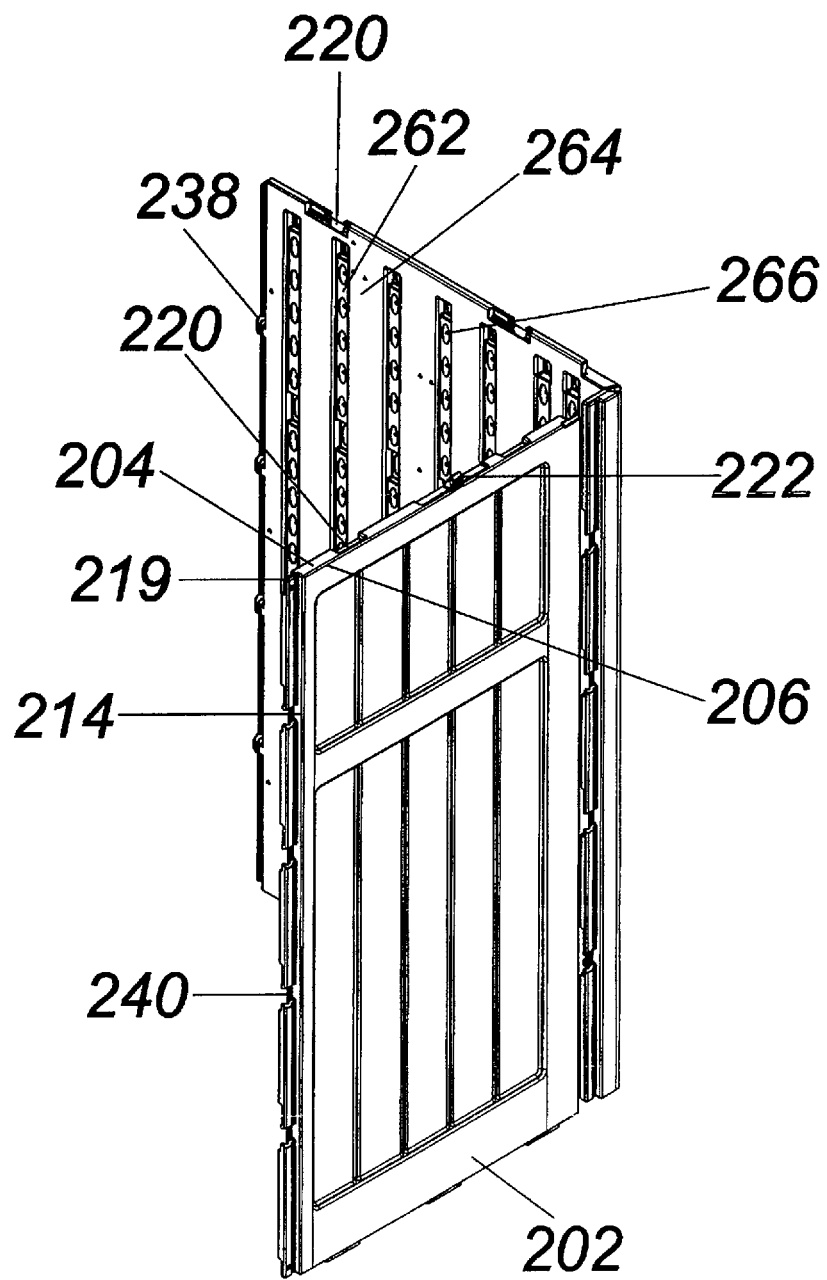
FIG. 18 is a perspective view of the side panel attached to a rear wall panel of the rear wall assembly.
Figure 28:
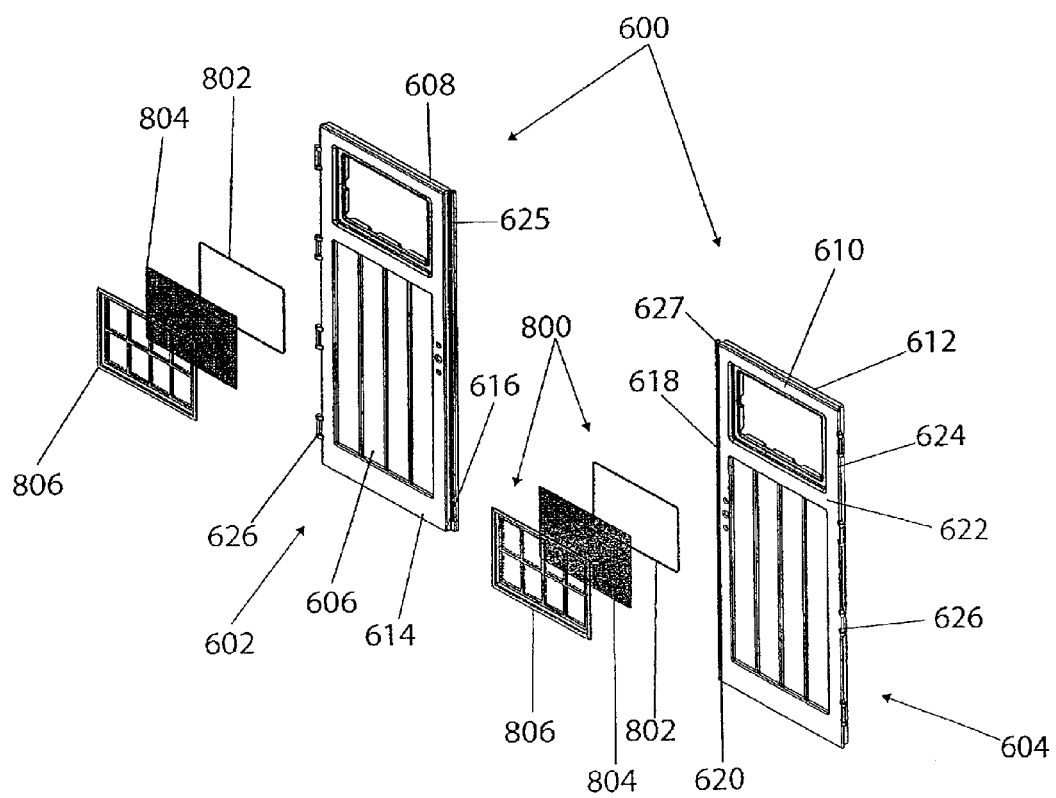
FIG. 28 is a perspective view of the right door and the left door of the door assembly.

In an alternative embodiment, the side walls 202 may contain one or more window assembly units, 800. The window assembly unit 800, see FIG. 28, is inserted within an open area defined by the top section 254 and includes a window gasket 802, a window 804, made of for example glass or plastic, and window framing 806. The interior surface 260 of the side panel 202 can be constructed of a generally smooth surface. Alternatively, the interior surface 260 of side panel 202 may contain alternating recessed channels 262 and flat surface panels 264. The recessed channels 262 may contain integrally formed members 266, see for example FIG. 18, for easy assembly of added components such as shelving, baskets, slat wall storage and the like.

Referring to FIGS. 9, 20A, 20B, and 21-24, a front wall assembly 300 is illustrated. The front wall assembly includes like-constructed left front wall panel 302 and right front wall panel 304. Each of the front wall panels 302 and 304 contain an exterior surface 306 and an interior surface 308. Both the exterior surface 306 and the interior surface 308 may contain similar features described previously for the exterior/interior of the side panels 202. Each of the front wall panels 302 and 304 further contain a plurality of sides, including a top side 310 having a top side edge 312 and a bottom side 314 having a bottom side edge 316. The top side 310 is substantially parallel to and positioned opposite the bottom side 314 and contains integrally formed wall panel to roof assembly securing assembly members, illustrated herein as one or more front panel protruding support legs 318 constructed and arranged to cooperate with the protruding support leg receptacle positioned on the header 502 of the roof assembly 500. The protruding support legs 318 have a body 318' and a foot 318" (see FIG. 20B). In addition to the front panel protruding support legs 318, the top side 310 also contains additional integrally formed wall panel to roof assembly securing members, illustrated herein as a key boss receptacle 320 and button 321 (see FIG. 20B). The button 321, which may be rounded or contain angled surfaces 323 is sized and shaped to interact with a button receiving area (not illustrated) positioned on the roof header as an additional integrally formed connector. The key boss receptacle is constructed in the same manner as described previously, differing in orientation, i.e. but rotated in position.

The bottom side 314 includes a plurality of floor panel to wall panel securing members. For example, the bottom side may include a second member of an integrally formed first floor panel to wall panel securing assembly, such as a plurality of locking plugs constructed and arranged to cooperate with the first member of the first floor panel to wall panel securing assembly integrally formed on the floor assembly. Additionally, the bottom side may include a first member of an integrally formed second floor panel to wall panel securing assembly, illustrated herein as a slide and lock locking post 322. The front wall panels 302 and 304 contain a left side end 324 having a left side edge 326 and a right side end 328 having a right side edge 330. Each of the sides ends 324 and 328 are arranged substantially perpendicular to and extending between the top side 310 and the bottom side 314. Formed integrally to one of either the left or right side edges is a front wall to door assembly securing assembly member constructed and arranged to receive a door assembly for enclosing and providing ingress into and egress from said utility shed, illustrated herein as door hinge receiving slots 332 constructed and arranged for receiving a door hinge and/or hinge plates.

Attached to the opposite left or right side end is a corner post member 334, having exterior surface 336 and an interior surface 338. The corner post member 334 includes a top end 340 having a top edge 342 and a bottom end 344 having a bottom edge 346 substantially parallel to and positioned opposite the corner post member 334 top end 340. The corner post member 334 contains a left side end 348 having a left side end edge 350 and a right side end 352 having a right side end edge 354, each being perpendicular to and extending between the top and bottom ends 340 and 344, respectively. The corner post member is hingedly attached to the right front panel end or the left front panel end, depending on which panel the doors are being attached. To provide a smooth connection to the side door assemblies 200, the corner post member 334 side ends 348 and 352 contain flanges 356. Flange 356 is constructed and arranged in a similar manner as side panel flange 219, thus providing a co-planer interconnection which prevents water and debris from entering the enclosure 10. Flange 356 contains one or more integrally formed first or second members of the wall panel to wall panel assembly for connecting to adjacent assemblies in a juxtaposed, coplanar relationship. The first and second members are illustrated herein as key boss 358 or key boss slotted receptacle 360. The corner post member 334 may also contain a second member of an integrally formed first floor panel to wall panel securing assembly constructed and arranged to cooperate with the first member of the first floor panel to wall panel securing assembly integrally formed on the floor panel, and is illustrated herein as locking plug 362.

Figure 25:
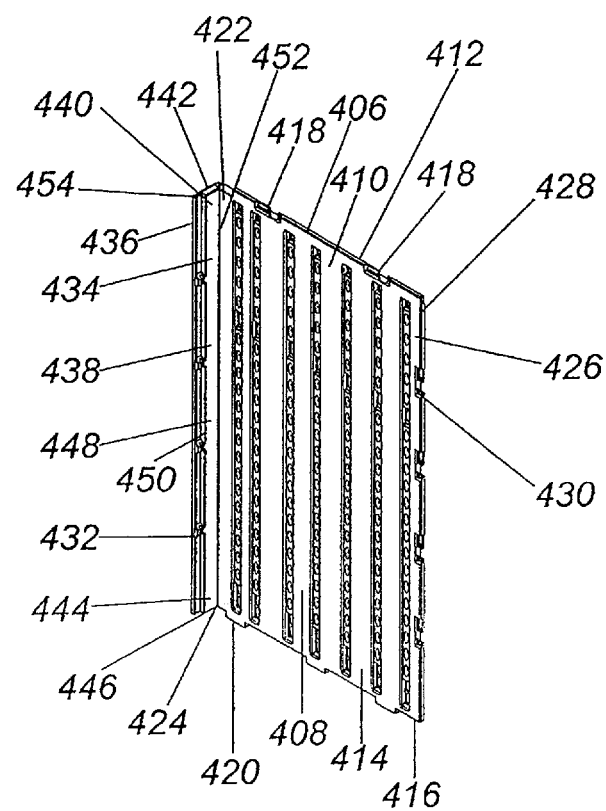
FIG. 25 is a perspective view of a rear wall panel of the rear wall assembly, illustrating the interior side.

Referring to FIGS. 9 and 25, the rear wall assembly 400 is illustrated. The rear wall assembly includes like-constructed left rear wall panel 402 and right rear wall panel 404. Each of the rear wall panels 402 and 404 contain an exterior surface 406 and an interior surface 408. Both the exterior surface 406 and the interior surface 408 may contain similar features described previously for the exterior/interior of the side panels 202. Each of the rear wall panels 402 and 404 further contain a plurality of sides, including a top side 410 having a top side edge 412, and a bottom side 414 having a bottom side edge 416. The top side 410 is substantially parallel to and positioned opposite the bottom side 414. The top side 410 contains a plurality of wall panel to roof assembly securing members, such as one or more header boss receiving receptacles 418. The bottom side 414 includes one or more members of the floor panel to wall panel securing assembly, such as a plurality of slide and lock locking posts 420, as described previously. The rear wall panels 402 and 404 contain a left side end 422 having a left side edge 424 and a right side end 426 having a right side edge 428. Each of the side ends 422 and 426 are arranged substantially perpendicular to and extend between the top side edge 412 and the bottom side edge 416. Formed integrally to one of either the left or right side ends 422 and 426 is a rear wall flange 428 which contains one more of the first and/or second members of the wall panel to wall panels securing assembly, illustrated herein as a key boss receiving receptacle 430 or a key boss 432.

Attached to the opposite side, either the left or right side edge surface, depending on whether the panel is connecting to the side walls on the left or right side, is a rear wall corner post member 434. The rear wall corner post member 434 has an exterior surface 436 and an interior surface 438. The rear wall corner post member 434 includes a top end 440 having a top end edge 442 and a bottom end 444 having a bottom end edge 446 substantially parallel to and positioned opposite the rear wall corner post member top end edge 442. The rear wall corner post member 434 contains a left side end 448 having a left side end edge 450 and a right side end 452 having a right side end edge 454, each being perpendicular to and extending between the top and bottom edges. The rear wall corner post member 434 hingedly attaches to the right side panel or the left side panel, 202. To provide a smooth connection to the side panel assemblies 200, the left and right side ends 448 or 452 of the rear wall corner post member 434 contain a rear wall corner post member flange 454 which contains integrally formed first and/or second members of the wall panel to wall panel securing assembly, illustrated herein as one or more key bosses, 432 or key boss receiving receptacles 430. Molded into the bottom edge surface 444 of the rear wall corner post member 434 is one or more members of the first or second floor panel to wall panel securing assembly, such as a locking plug.

Figure 26:
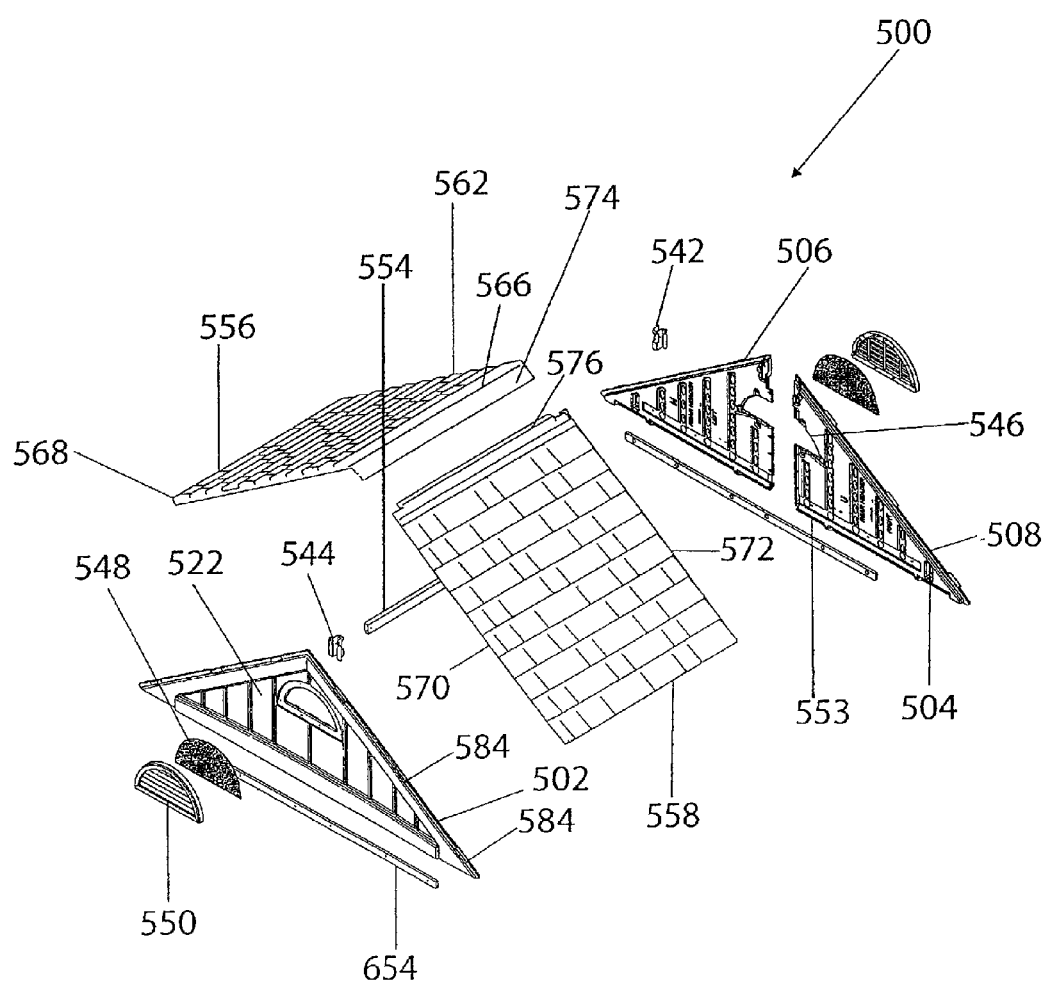
FIG. 26 illustrates the components of one embodiment of the roof assembly.
Figure 27:
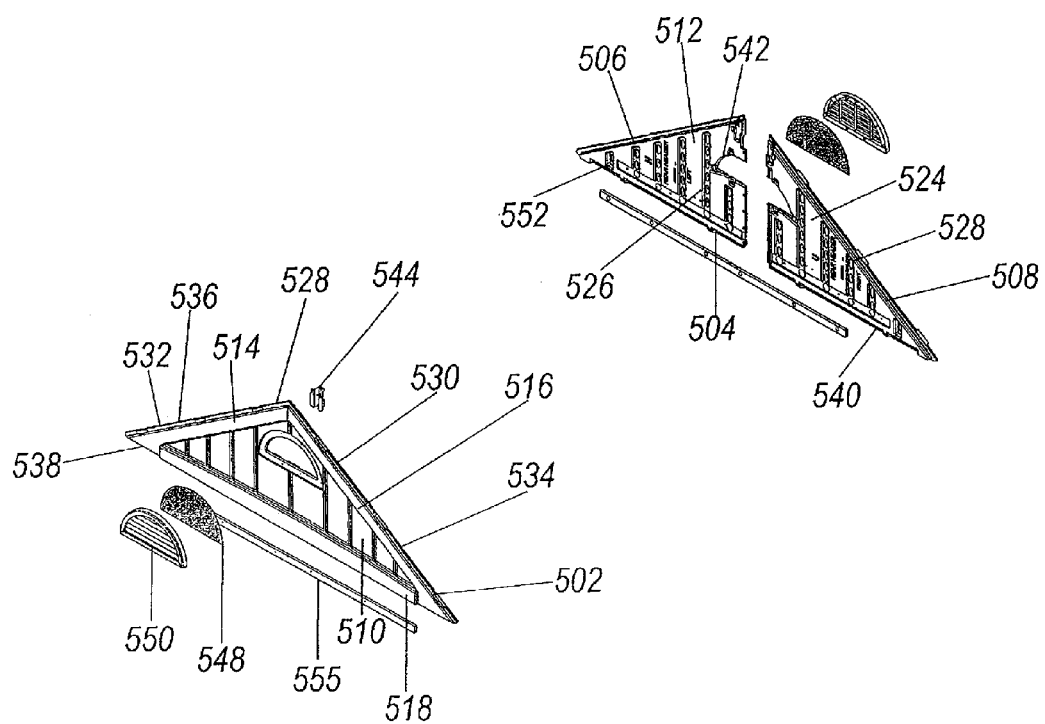
FIG. 27 is a perspective view of the front roof header and the rear roof header of the roof assembly.

Referring to FIGS. 26-27, the roof assembly 500 is illustrated. The roof assembly includes a front header 502 and a rear header 504. The rear header 504 is preferably constructed of two halves, 506 and 508 which provides for space saving in packaging. Both the front header and the rear header contain like structures and therefore will be referred to collectively as header where structures are the same. The two halves 506 and 508 are secured together generally though the use of hardware fasteners, molded connectors, injection molded components, and a metal bracket. The header includes an exterior surface 510 and an interior surface 512 and may contain similar features as described for the exterior/interior surfaces of the side wall assembly 200, including decorative framing 514, 516, 518, paneling 522, or alternating smooth panels 524 and recessed channels 526. The top end 528 of the header further includes two diverging surfaces 530 and 532, each having an edge 534 and 536 respectively. The bottom end 538, having an edge 540, connects the diverging surfaces 530 and 532, thus forming a generally triangular shape. While the header is preferably triangular in shape to provide extended roof space and prevent debris, rainwater, and snow from accumulating, or provide storage space in conjunction with the back wall assembly and truss system, the shape is illustrative only.

Positioned on the interior surface 512 is a slide roof beam bracket receiving area 542 constructed and arranged for attachment and securing of a slide roof beam bracket 544. The header contains a vent opening 546 constructed and arranged to receive a vent screen 548 and a header vent 550. The bottom edge of the header contains one or more members of an integrally formed wall panel to roof assembly securing assembly, illustrated herein as support leg receiving pockets 552 constructed and arranged to receive and secure the support legs 318 of the front panels 302, 304. Additional members of an integrally formed wall panel to roof assembly securing assembly, illustrated herein as a plurality of header bosses 553 provide securing assembly to the front walls and/or doors.

Figure 77C:
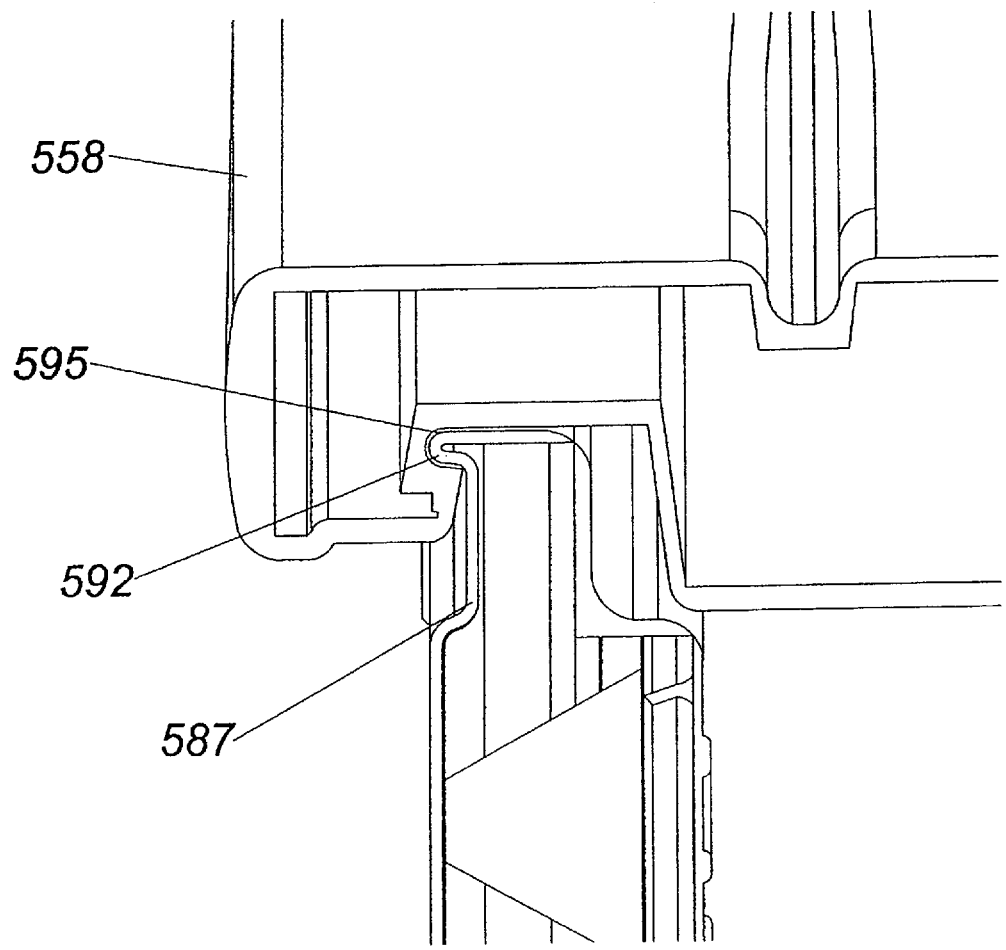
FIG. 77C illustrates the coupling of a portion of the roof panel to a portion of the roof header.
Figures 78A, 78B:
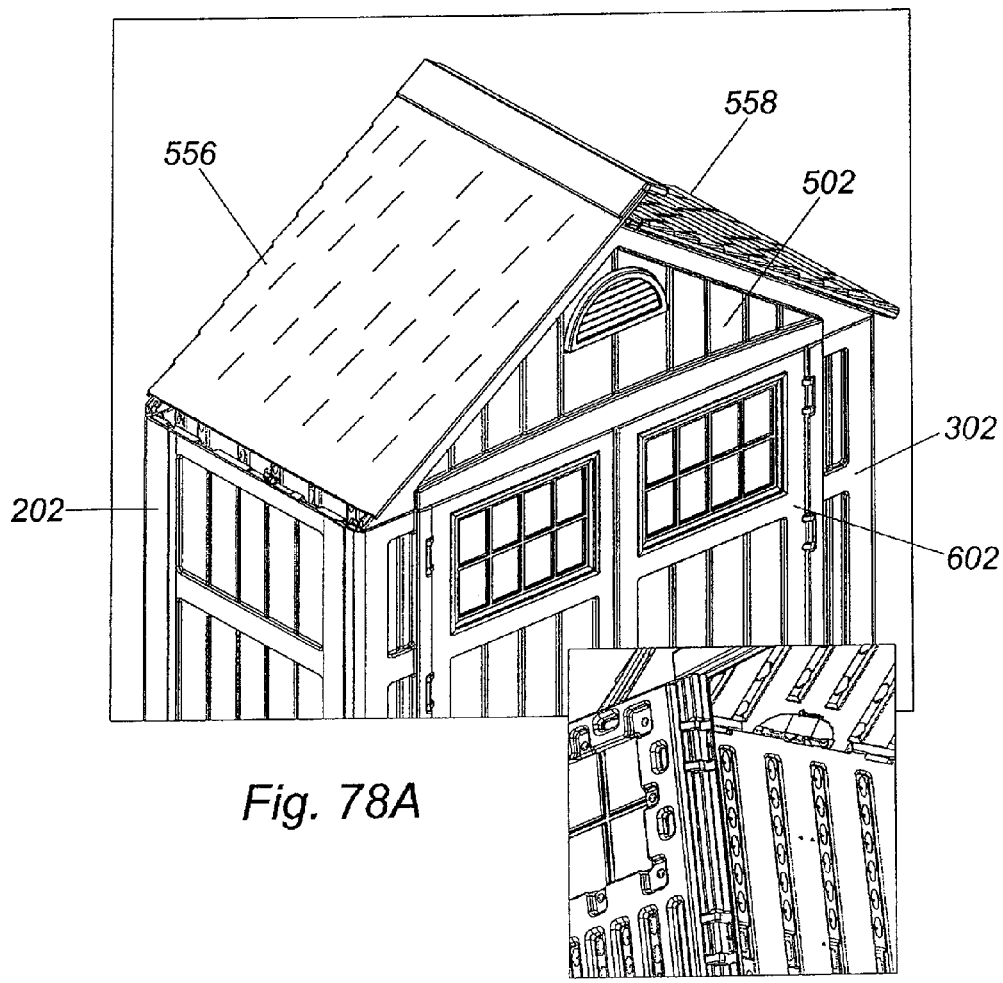
FIGS. 78A and 78B illustrate insertion of the roof panel onto the roof headers.
Figure 79:
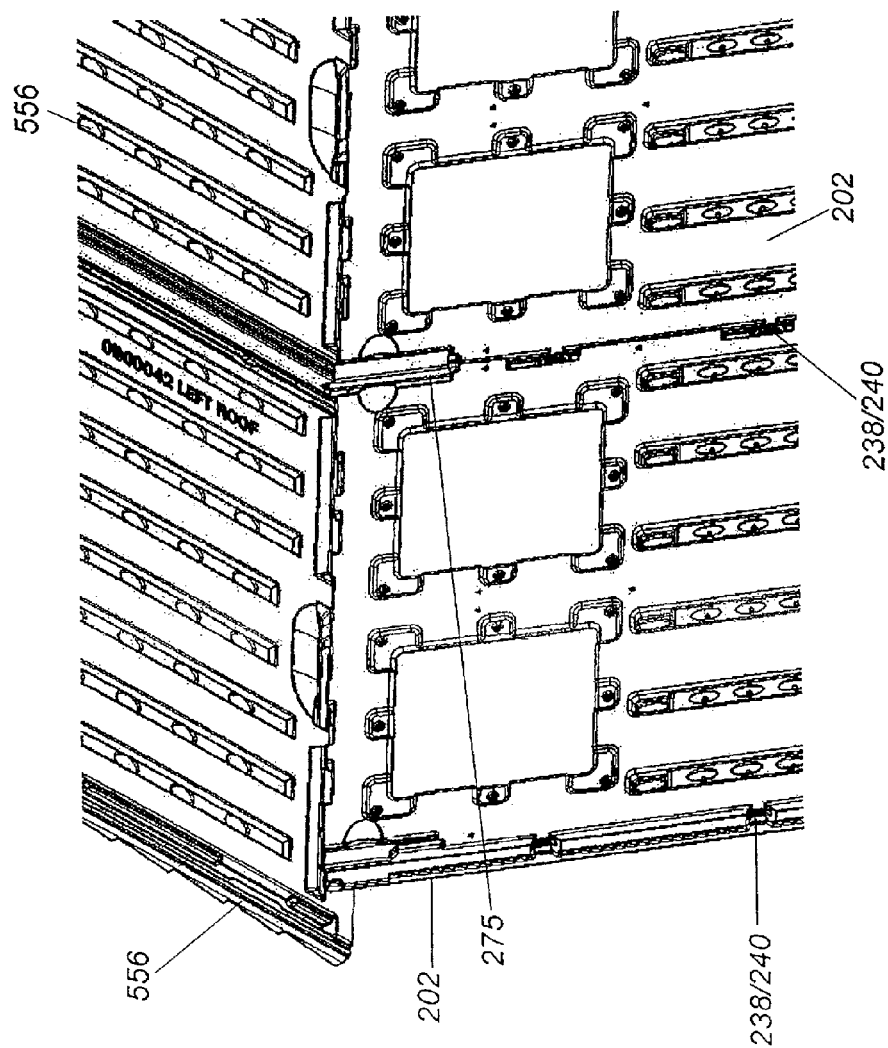
FIG. 79 is a view of the underside of the connected roof panel.
Figures 80A, 80B:
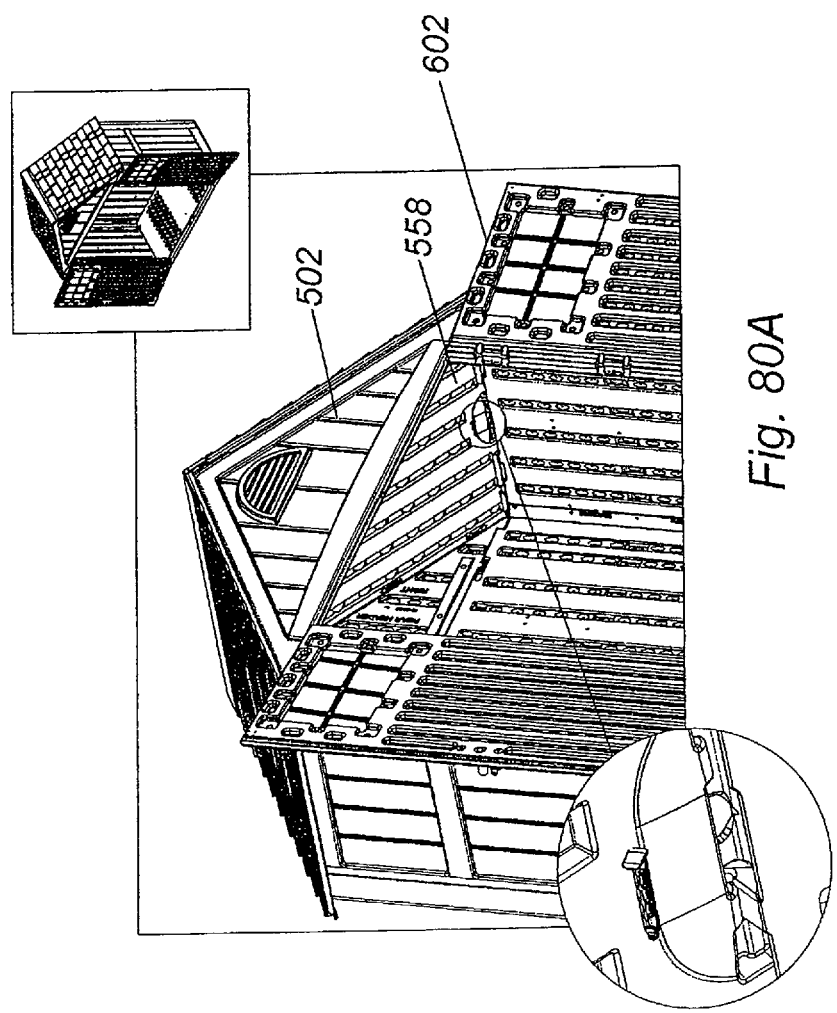
FIGS. 80A and 80B are illustrations of the securement of the roof panel to the side panels through use of connector pins.

Connecting the front header 502 with the rear header 504 is a roof ridge beam 554 which is secured to the roof ridge beam brackets 544. Securing to the roof ridge beam 554 is a plurality of like constructed roof panels 556 and 558. The roof panels 556 and 558 include an exterior surface 562 and an interior surface 564 (see FIG. 77A), a top end 566 substantially parallel to and opposite a bottom end 568, and two side ends 570 and 572 substantially perpendicular to and extending in between the top end 566 and bottom end 568. Extending from the top end 566 are roof flanges 574 and 576 constructed and arranged to interconnect, thereby providing a barrier for preventing water to enter within the structure. The interior side of the roof panel 558 contains an interior channel 596 and 598, see FIG. 77A, with a plurality of protruding appendage receiving areas 595 positioned within. The plurality of protruding appendage receiving areas 595 are constructed and arranged to cooperate with the front and rear header appendages 584.

Figure 29A:
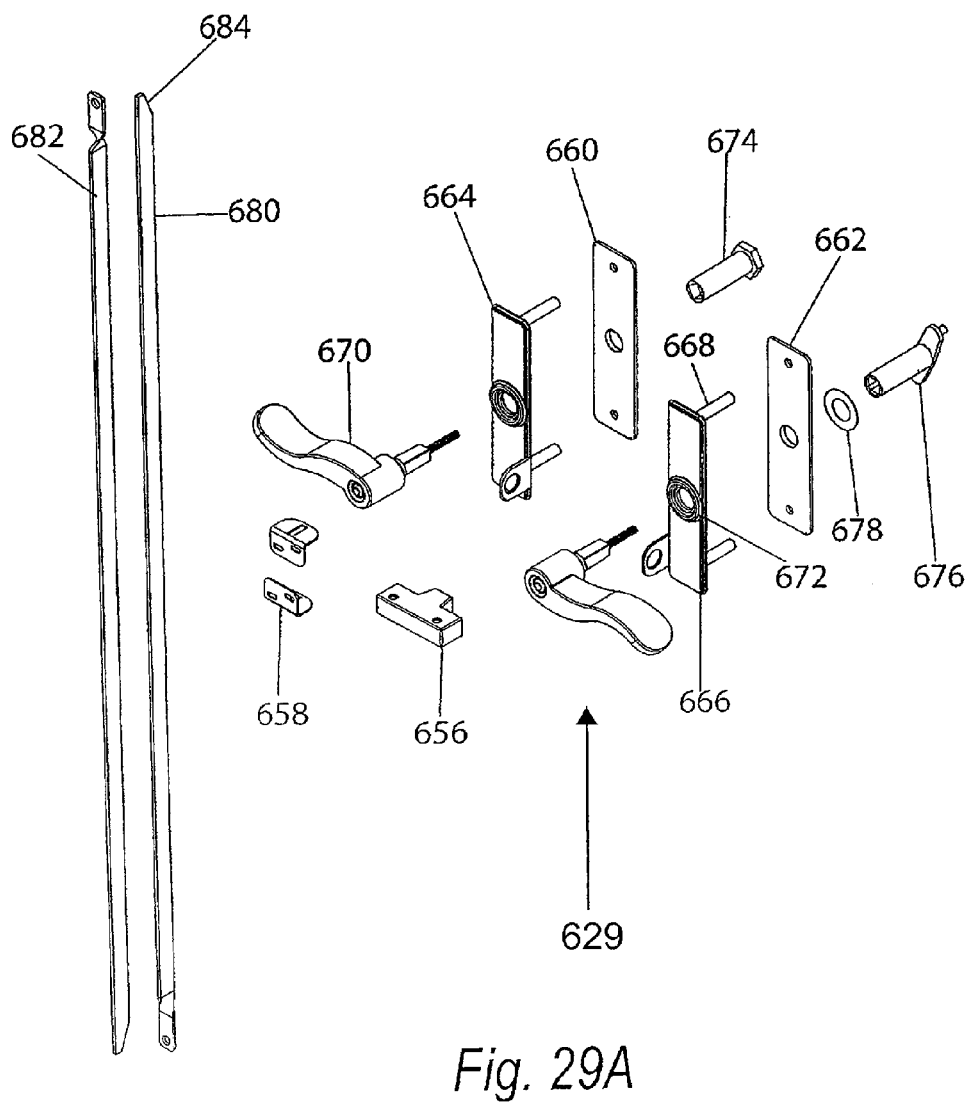
FIG. 29A is an illustration of the components of the door handle of the door assembly.
Figure 29B:
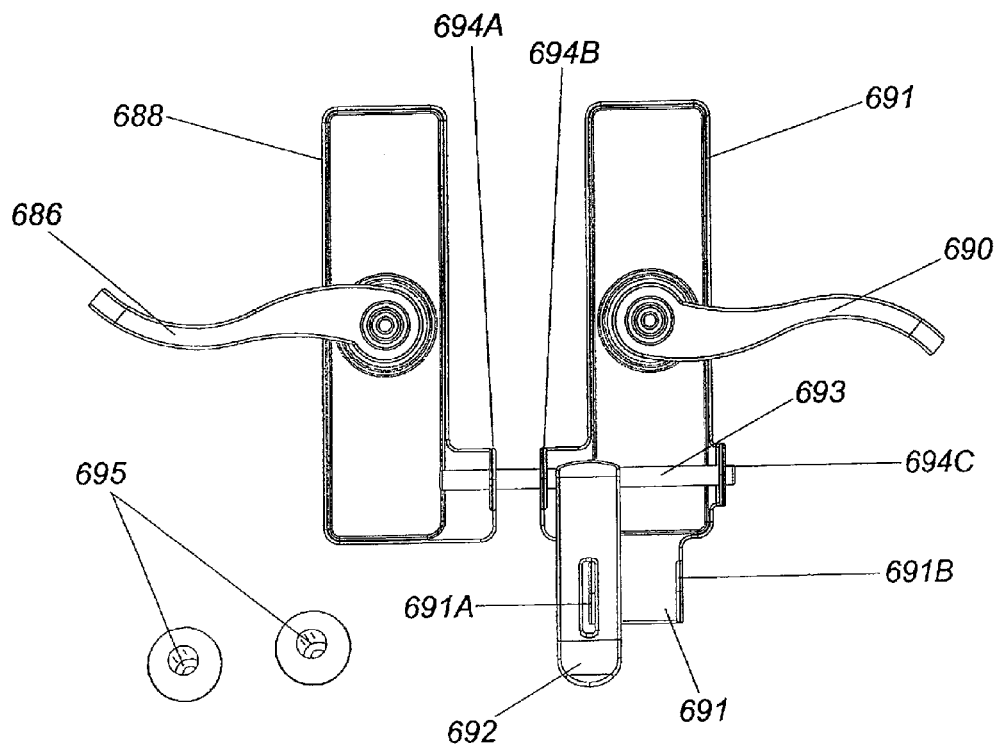
FIG. 29B is an illustration of the components of an alternative embodiment of a door handle assembly.
Figure 29C:
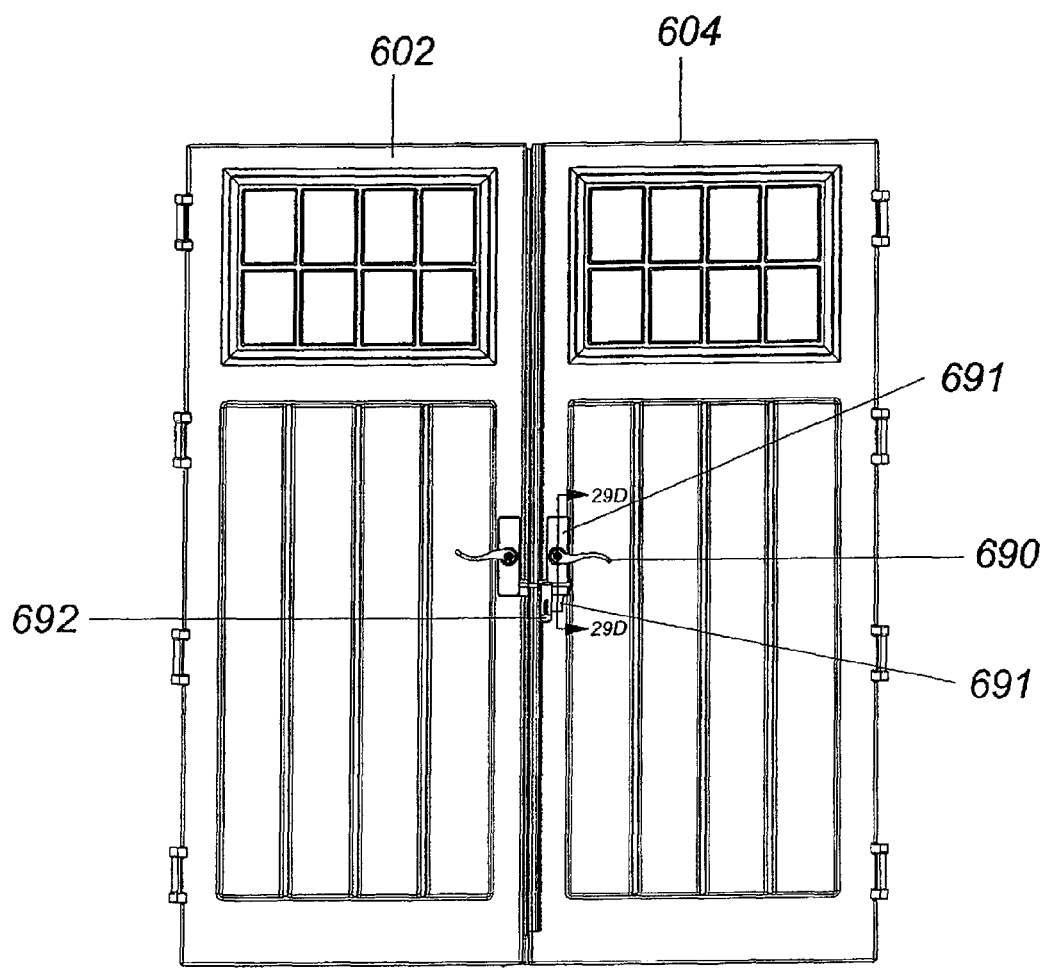
FIG. 29C is an illustration of the door handle system attached to the front door panels.
Figure 29D:
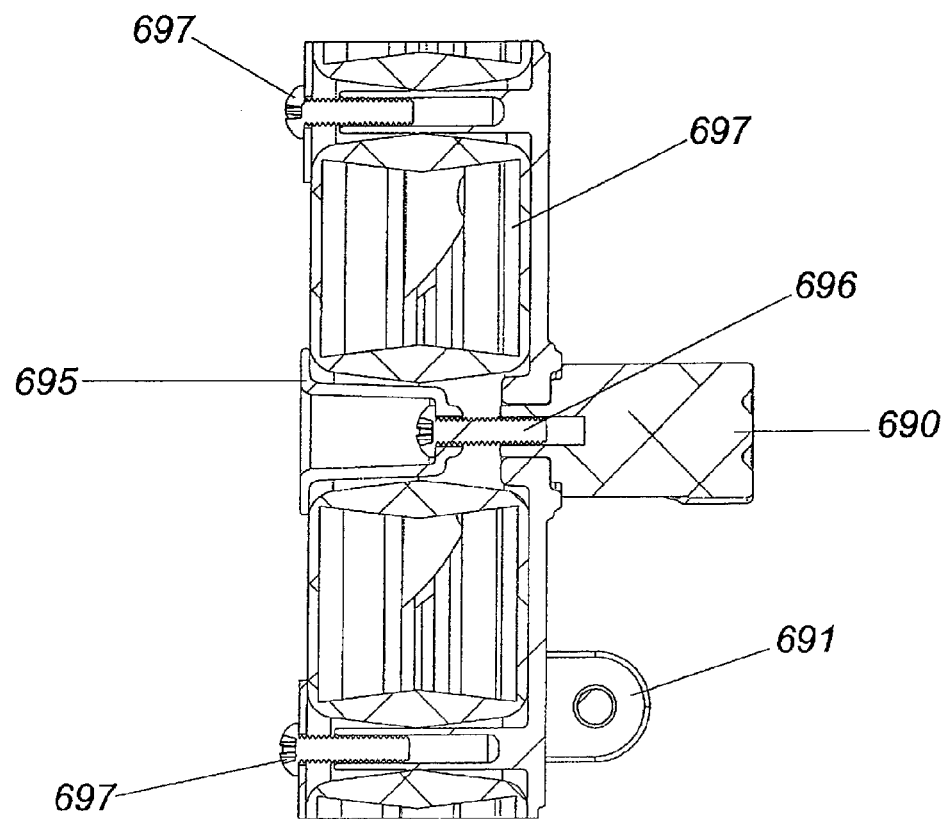
FIG. 29D is a cross sectional view taken along lines 29D-29D of FIG. 29C.
Figure 29E:
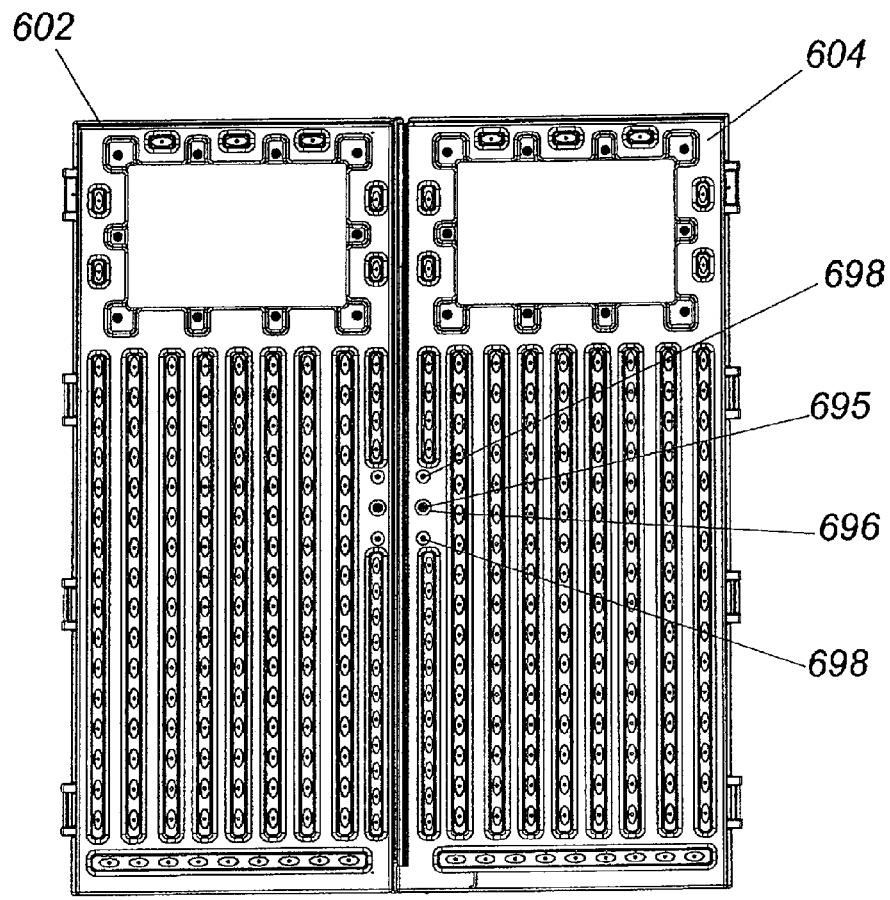
FIG. 29E is a back view of the door panels, illustrating the connection of the door handle assembly shown in FIG. 29B.

Referring to FIGS. 28-29E, the door assembly 600 is illustrated. The door assembly includes like-constructed left door panel 602 and right door panel 604. Each of the door panels 602 and 604 contain an exterior surface 606 and the interior surface 608. Both the exterior surface 606 and an interior surface 608 may contain similar features described previously for the exterior/interior of the side panels 202. Each of the door panels 602 and 604 further contain a plurality of sides, including a top end 610 having a top end edge 612 and a bottom end 614 having a bottom end edge 616. The top end 610 is substantially parallel to and positioned opposite the bottom side end 614. The door wall panels 602 and 604 contain a left side end 618 having a left side end edge 620, and a right side end 622 having a right side end edge 624. Each of the sides ends 618 and 622 are arranged substantially perpendicular to and extend between the top end 610 and the bottom end 614. Formed integrally to one of either the left or right side ends, are one or more wall panel to door securing assembly, illustrated herein as a plurality of hinge assemblies 626. Doors 602 and 604 contain door flanges 625 and 627 which interact such that when the doors are closed, water or other debris is prevented from entering the enclosure. Attached to the door is a door handle assembly 629, described later but including generally a plurality of rods, door handles, handle plates, inside handle plates, a handle stop, actuator washer, actuator, a header latch plate, and a plurality of clips.

Figure 30:
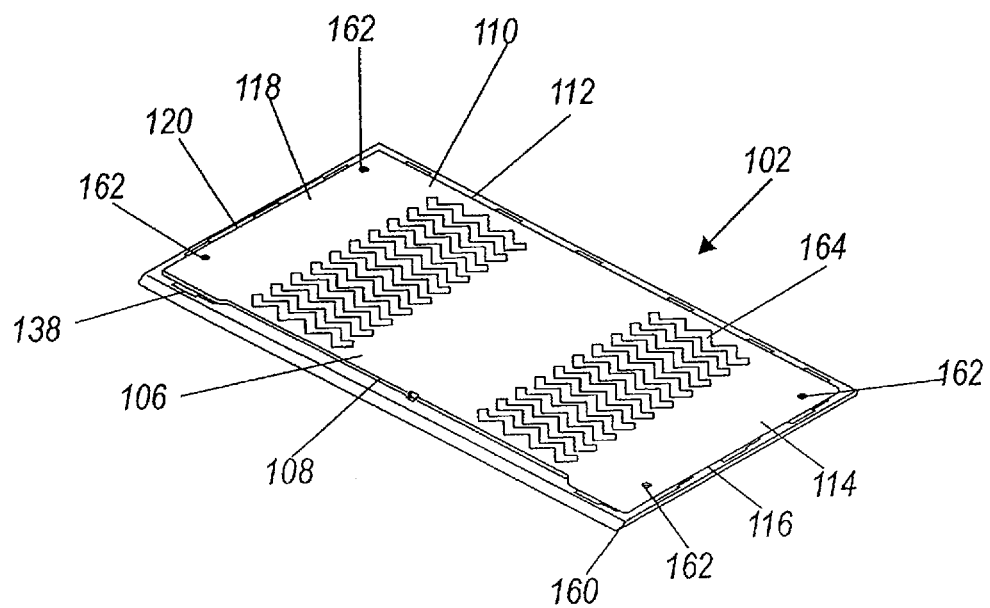
FIG. 30 is a perspective view of one embodiment of the floor panel secured to a stable platform.
Figure 31:
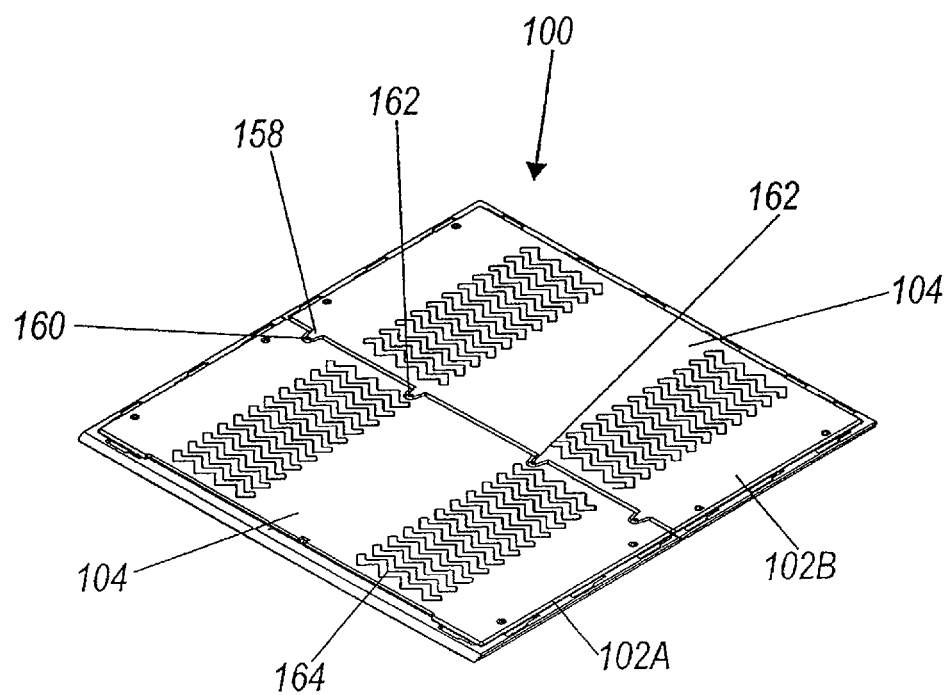
FIG. 31 is a perspective view of a multiple panel floor assembly secured to a stable platform.
Figures 32, 33:
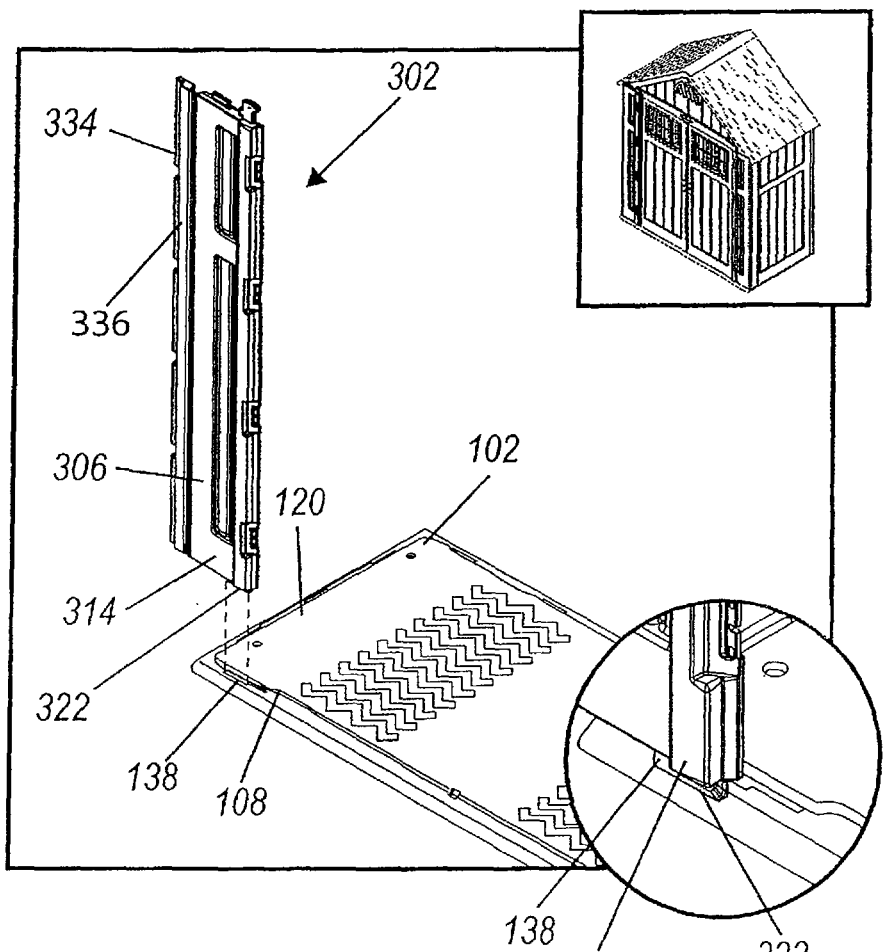
FIG. 32 is a perspective view illustrating the insertion of the left front panel into the floor panel.
FIG. 33 is a perspective view illustrating the slide and lock locking member integrally formed within the left front panel of the front wall assembly.
Figure 34:
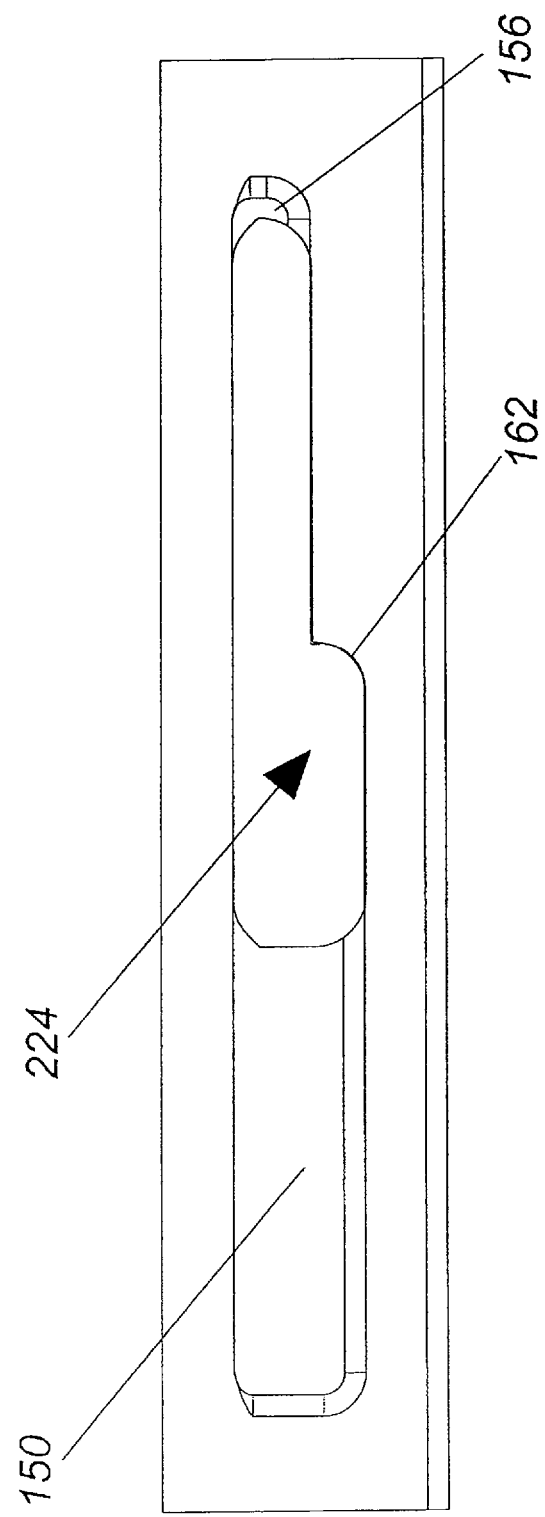
FIG. 34 is a top view partially in section illustrating the connection of the slide and lock locking post with the slide and lock socket.
Figures 87A, 87B:
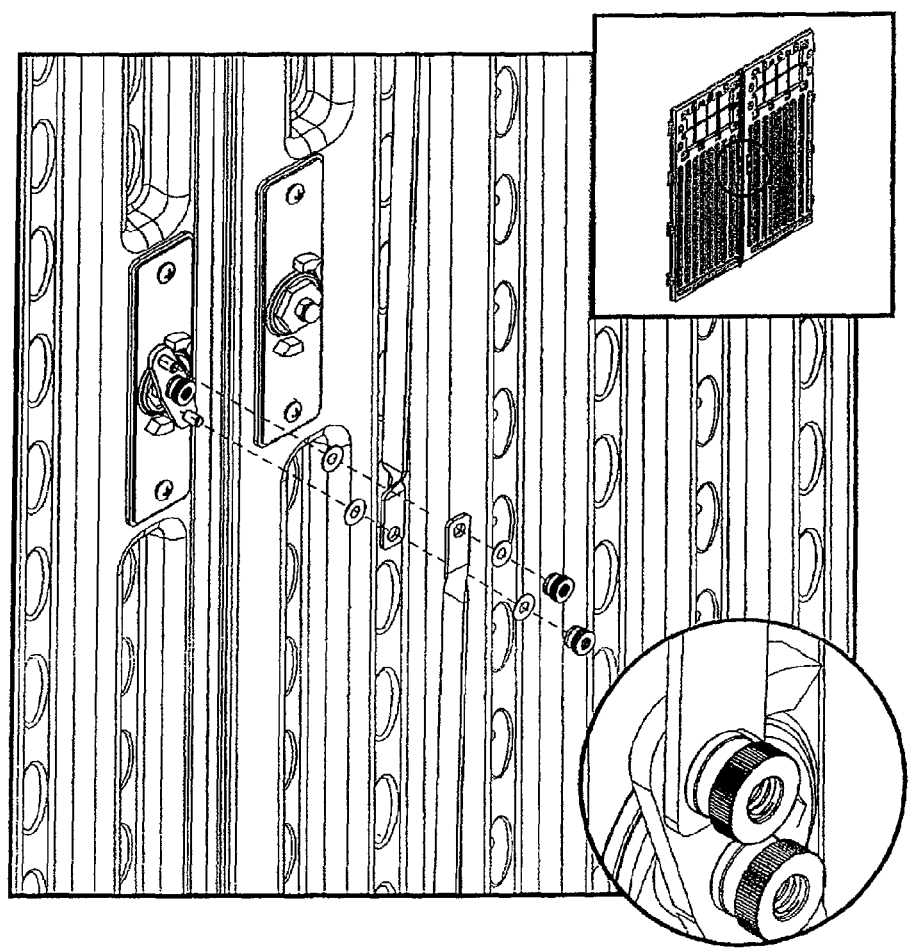

Referring now to FIGS. 30-87, the assembly of the heavy duty utility enclosure is described, using the same reference numbers as used above to describe like features of the instant invention plus additional reference numbers to describe additional structures and features not yet illustrated. To aid in orientation, the Figures may contain a top panel illustrating the part and/or place of the enclosure which is being assembled. Referring to FIG. 30, the floor panel 102 of the heavy duty utility enclosure 10 is preferably placed on a stable platform 160, such as a 4 inch thick concrete slab or wood platform, and anchored using masonry fasteners or long lag screws with washers through securing openings 162 placed near the perimeter of the floor panel 102. To increase the length of the shed, the user simply adds additional floor panels 102. As illustrated in FIG. 31, the first panel 102A mateably engages the second panel 102B by juxtaposing the edges of each of the respective floor panels and sliding the first member of the floor panel to floor panel securing assembly, illustrated herein as finger-like extensions 158 of panel 102B into the second member of the floor panel to floor panel securing assembly, illustrated herein as sockets 160 of the adjacent panel, 102A, such that the respective interior surfaces 104 are in a coplanar arrangement. The result is a positive mechanical connection between each of the individual floor panels, thus creating floor assembly 100. The engagement between the finger-like extensions 158 and the sockets 160 can be further secured through insertion of securing hardware such as screws, not illustrated, through opening 162 located at the tip of the finger-like extension 158. Optionally, the floor panels 102 may include a tire tread pattern 164. The material thickness within and/or around the tire tread area is preferably greater than the rest of the floor panel in order to provide additional support for heavy objects, such as tractors that may be stored within.

Figure 13A:
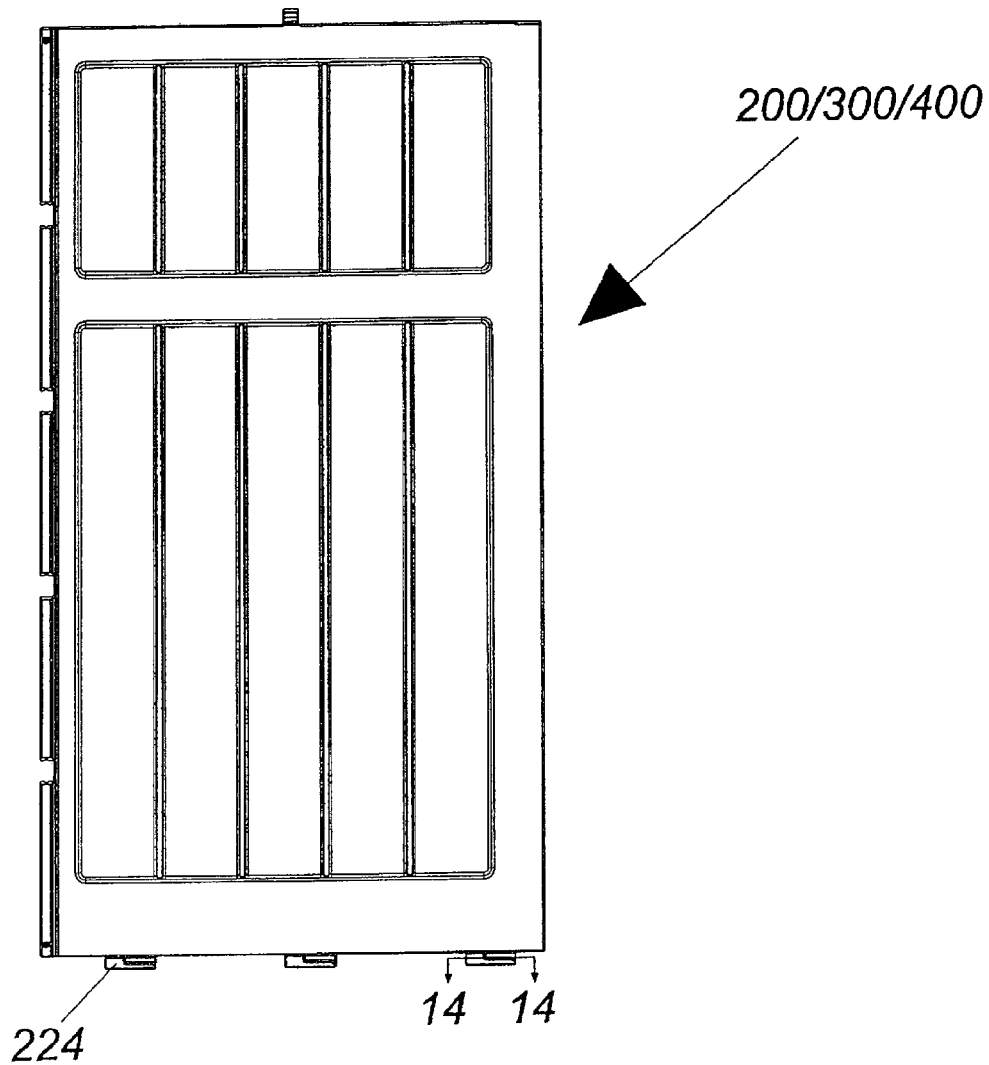
FIG. 13A is an illustrative embodiment of the slide and lock locking post integrally formed at the bottom side of a panel.
Figure 13B:
FIG. 13B is a bottom view of one embodiment of a wall panel of the instant invention.
Figure 14:
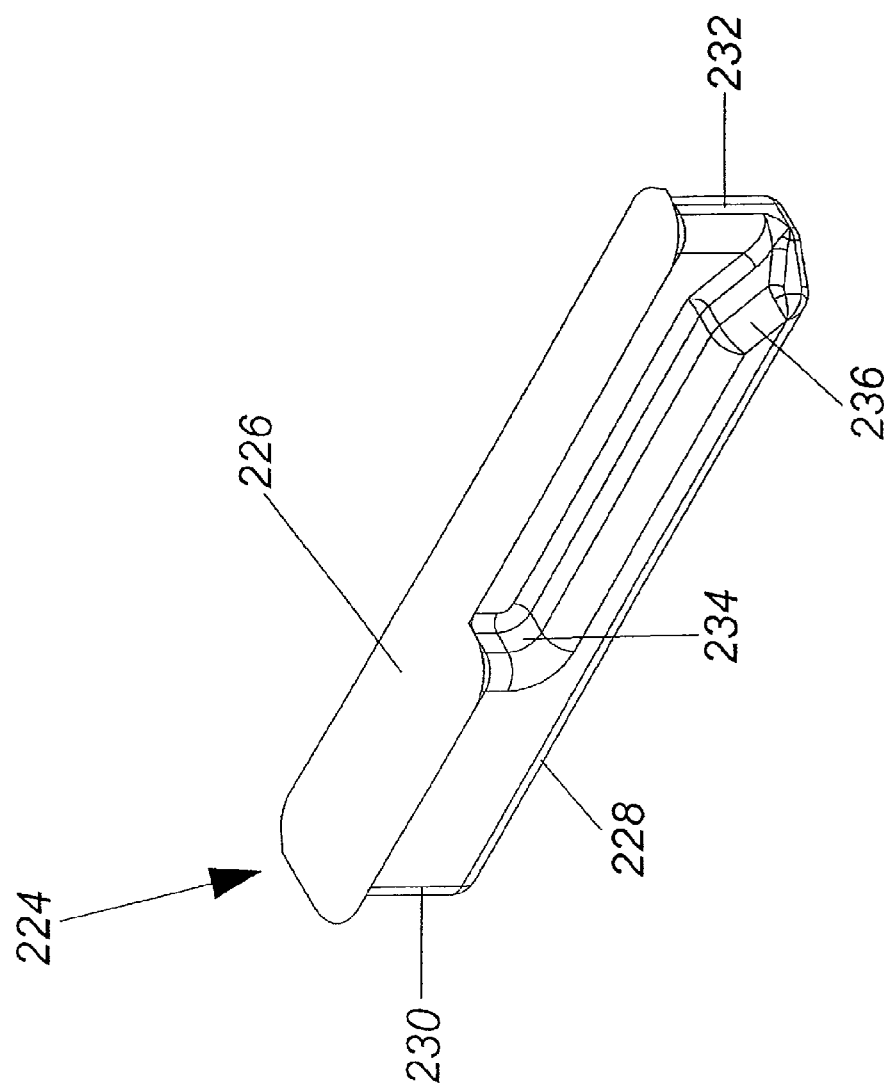
FIG. 14 is a perspective view of one embodiment of the slide and lock locking post.
Figure 15A:
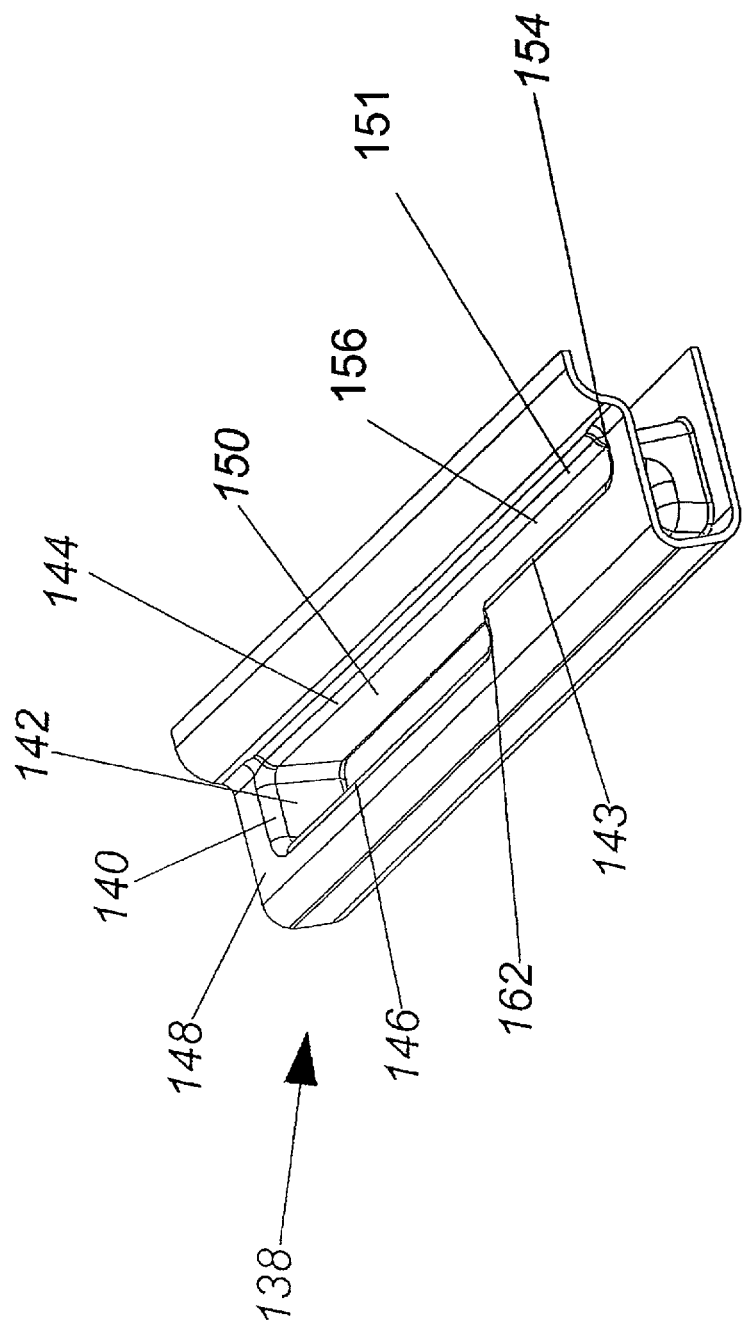
FIG. 15A is a perspective view of one embodiment of the slide and lock locking post socket.
Figure 15B:
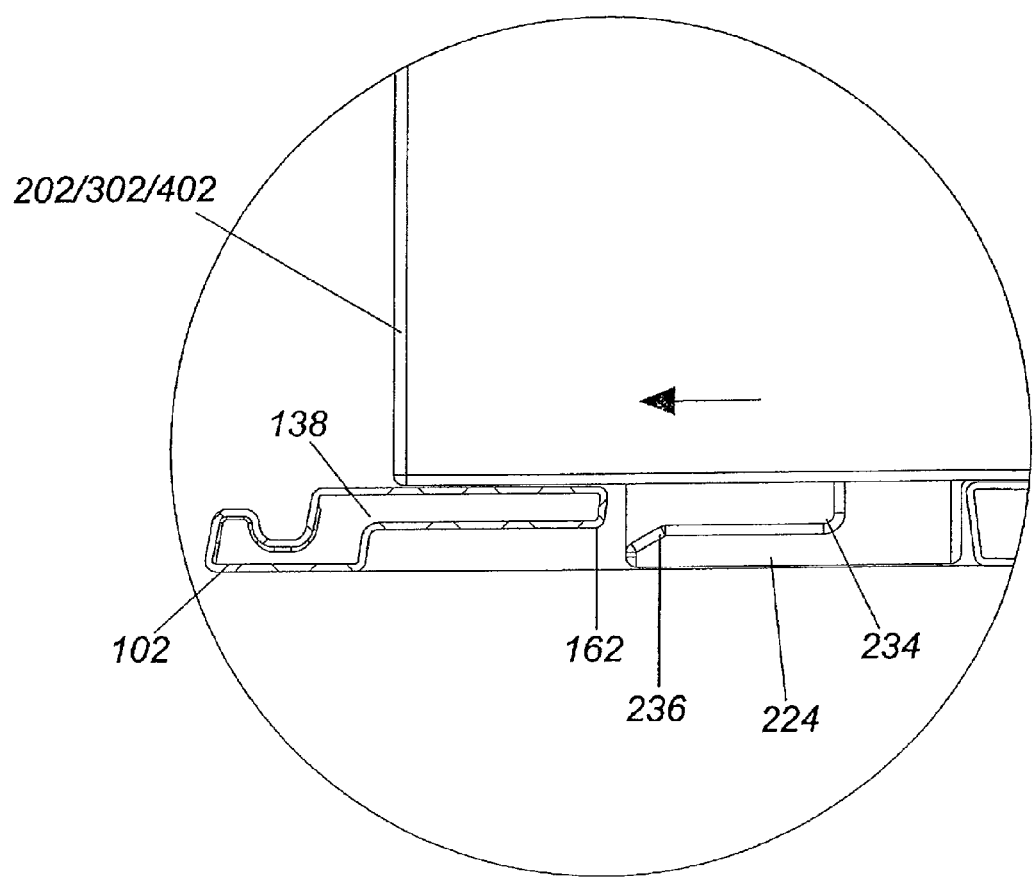
FIG. 15B is a cross sectional view of the locking engagement of the slide and lock locking post and slide and lock locking post sockets.
Figure 15C:
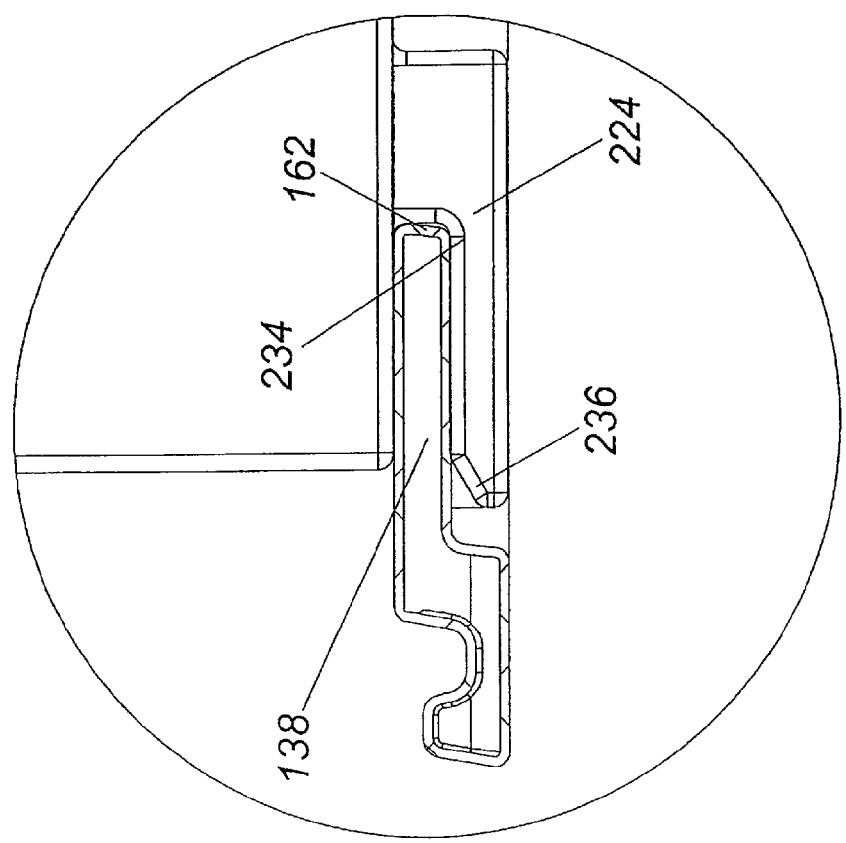
FIG. 15C is a cross sectional view of the locking engagement of the slide and lock locking post and slide and lock locking post sockets in the locked position.

Referring to FIGS. 32-38, the left front wall panel 302 of wall assembly 300 is attached to the floor panel 102. The slide and lock locking post 322 integrally formed in the bottom side 314 of the left front panel 302 is aligned with and inserted within the slide and lock locking sockets 138 of floor panel 102, as illustrated in FIGS. 13-15. While FIG. 13A illustrates the slide and lock locking post 224 associated with a side panel, it shares the same features as the slide and lock locking post 322, as well as other slide and lock locking posts on other panel assemblies. Accordingly, the left front panel is lowered in place such that the bottom end 228 of the slide and lock locking post is inserted into the slotted cavities 150 and 156 of the main body 140 of the slide and locking post sockets 138 of the floor panel 102. Once inserted, the ramping surface 236 of the slide and lock locking post is slid toward the finger-like extension 143, securing in place once the partially curved edge 234 contacts edge 162, see for example FIGS. 15B, 15C, and 34.

Once the left front panel 302 is secured to the floor panel 102, the front wall corner post member 334 is traversed between a first linear position and a second hinged position. The first position is defined by the position in which the plane of the exterior surface 336 of the front wall corner post member 334 is aligned in a coplanar manner with the plane of the exterior surface 306 of the front wall panel 302. The second hinged position is defined by the position in which the plane of the exterior surface 336 of the front wall corner post member 334 forms a right angle or "L" shape with respect to the plane of the exterior surface 306 of the front wall panel 302, see FIGS. 35 and 36. In this configuration, the left front wall panel 302 encloses the right angled portion of the floor 102 formed by the intersection of the front side edge 108 and the right side edge 120. To secure the front wall corner post member 334 to the floor member 102, locking plug 362 is aligned with and inserted into the mating receptacle 124, see FIG. 38.

Figure 40:
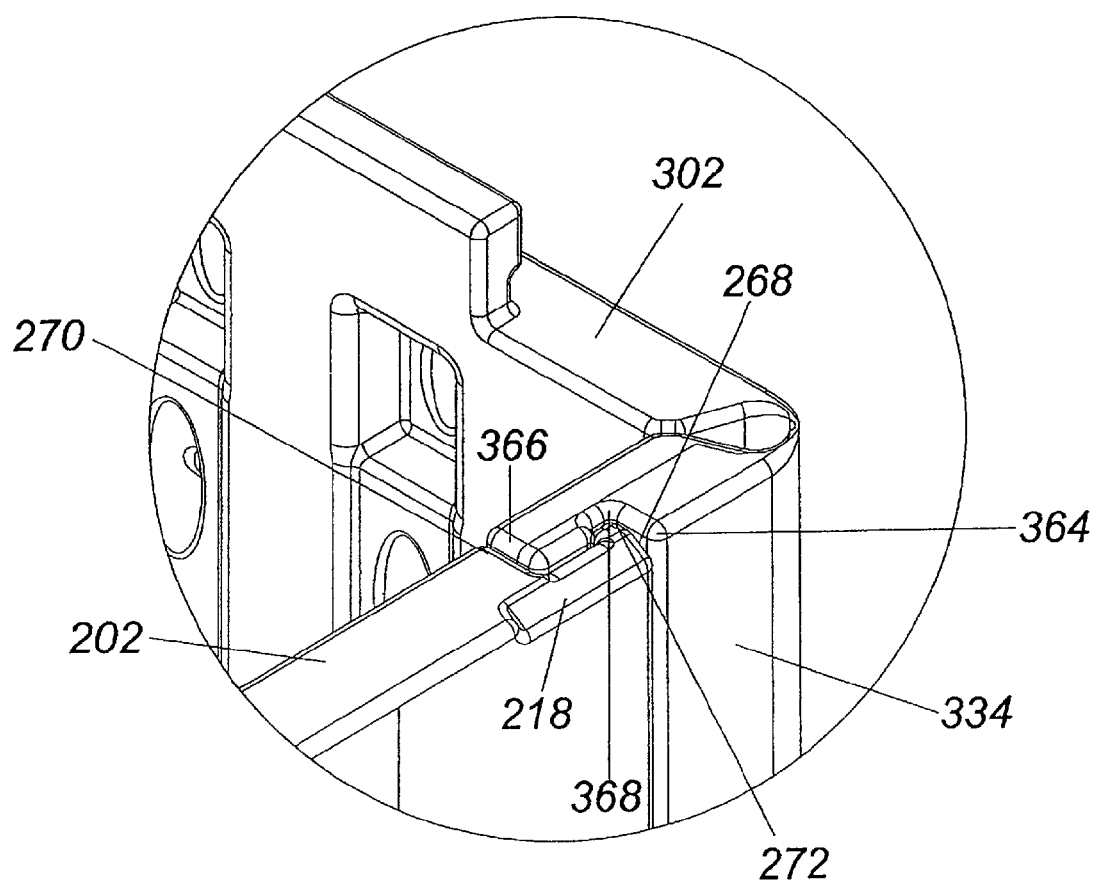
FIG. 40 is a partial view illustrating the interconnection of a side panel with side panel corner post member.
Figures 41A, 41B:
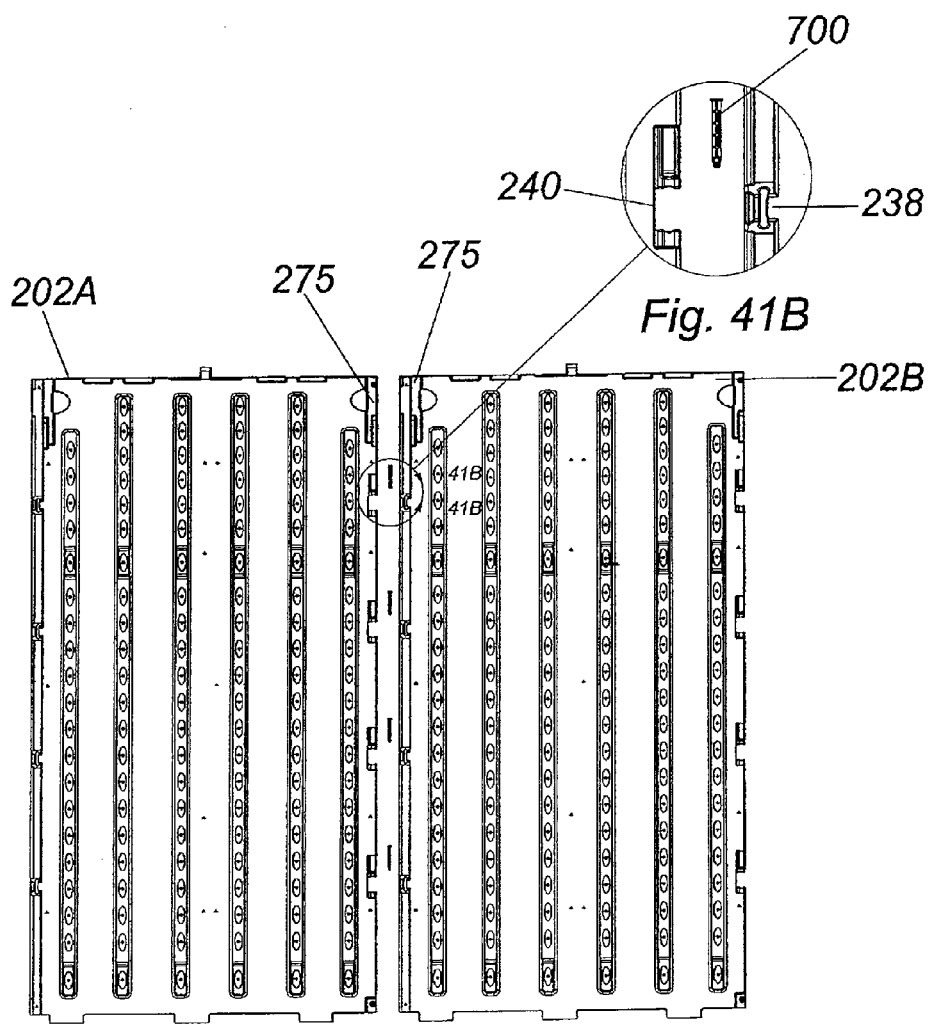
FIG. 41A illustrates connection of two side panels through the key boss/key boss receptacle.
FIG. 41B is a blow-up view of the key boss/key boss receptacle.
Figure 41C:
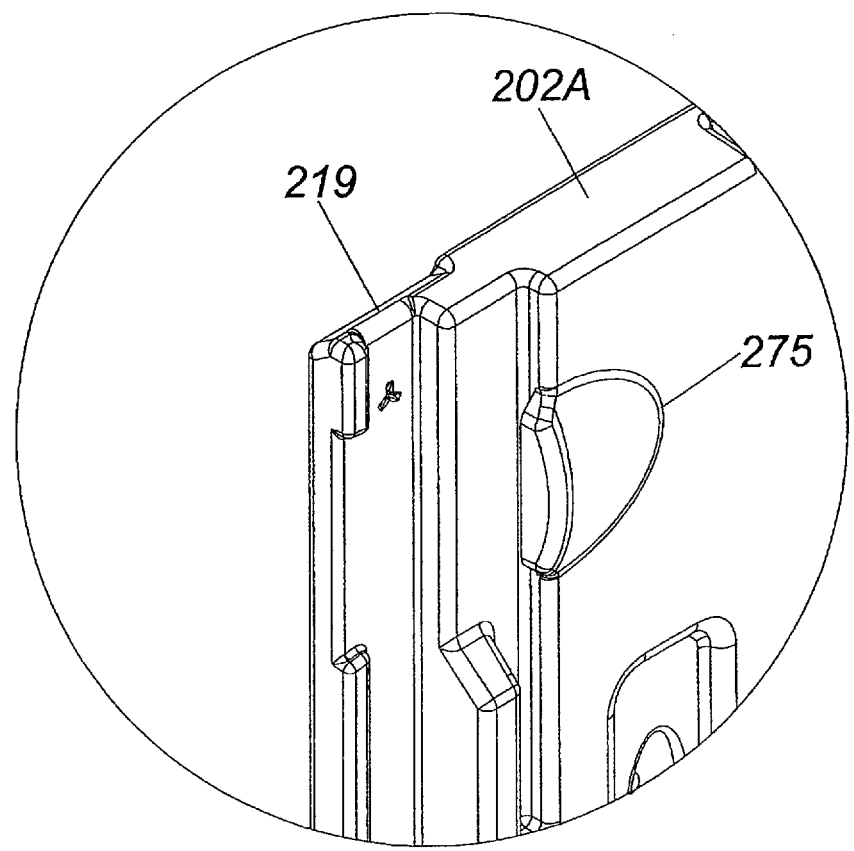
FIG. 41C is a partial view of a side edge of a side panel.
Figure 41D:
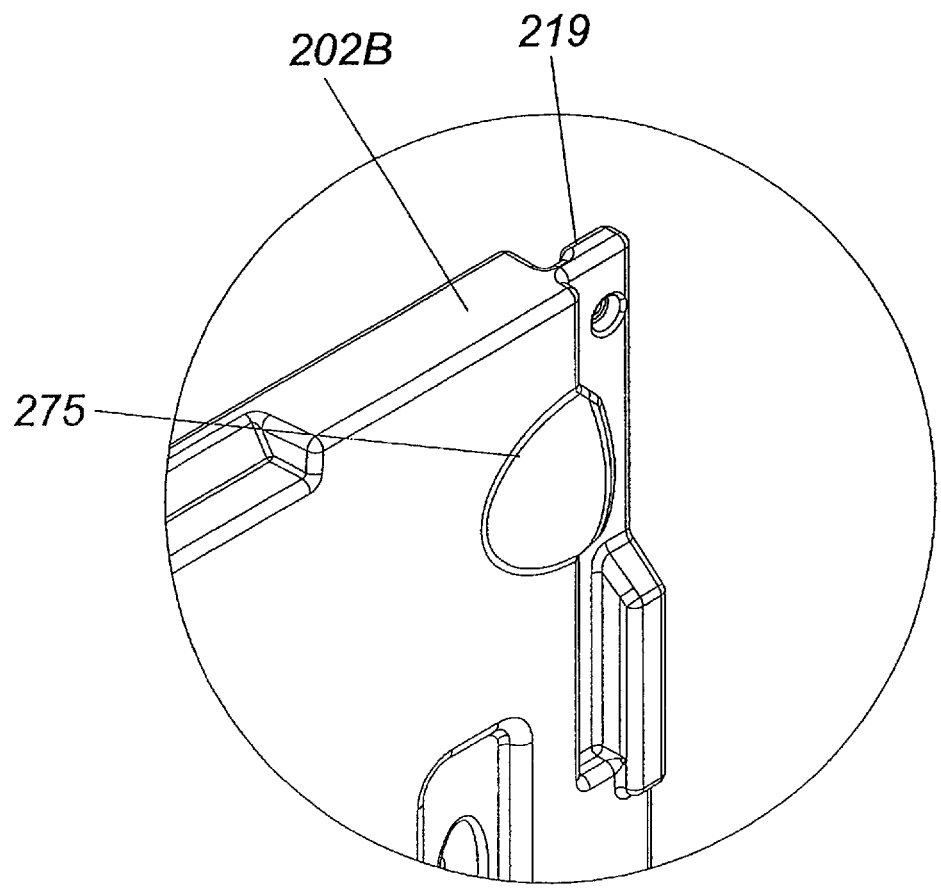
FIG. 41D is a partial view an opposite side edge of a side panel.

FIGS. 39-45 illustrate attachment of the side wall panel 202 to the floor panel 102 and to the front wall corner post member 334. To secure the side wall panel 202 to the floor panel 102, the slide and lock locking post 224 positioned along the bottom side end 208 is aligned with and inserted within the slide and lock locking sockets 138 of floor panel 102. The slide and lock locking post 224 is secured to the slide and lock locking sockets 138 as described above. The side wall panel 202 is then secured to the front wall corner post member 334 by securing the front wall corner post member flange 356 to the front wall corner post member 334 with the side wall flange 218 of side panel 202. As illustrated in FIG. 40, edge 364 of the front wall corner post member 334 contacts edge 268 of the side panel flange 218 of the side panel 202. The edge 366 of the front wall corner post member 334 is in contact with edge 270 of the flange 218 of side panel 202, thereby aligning the curved edge 368 with the curved edge 272. The corner panels may be held at a 90 degree angle with the mechanical fasters, such as screws, in conjunction with the molded in mechanical overlapping/locking features. The resulting overlap alignment, which can form for example, an L-shape or S-shape when viewed in cross section, acts to impede rain driven water and other foreign debris from entering the enclosed shed assembly 10 and helps secure the panels in their correct assembled positions. FIGS. 41A-41D illustrate attachment of like-constructed side walls 202A and 202B through flange 219 overlap and securing by use of keyboss 238, keyboss receptacle 240, and connector pin 700.

Figure 42:
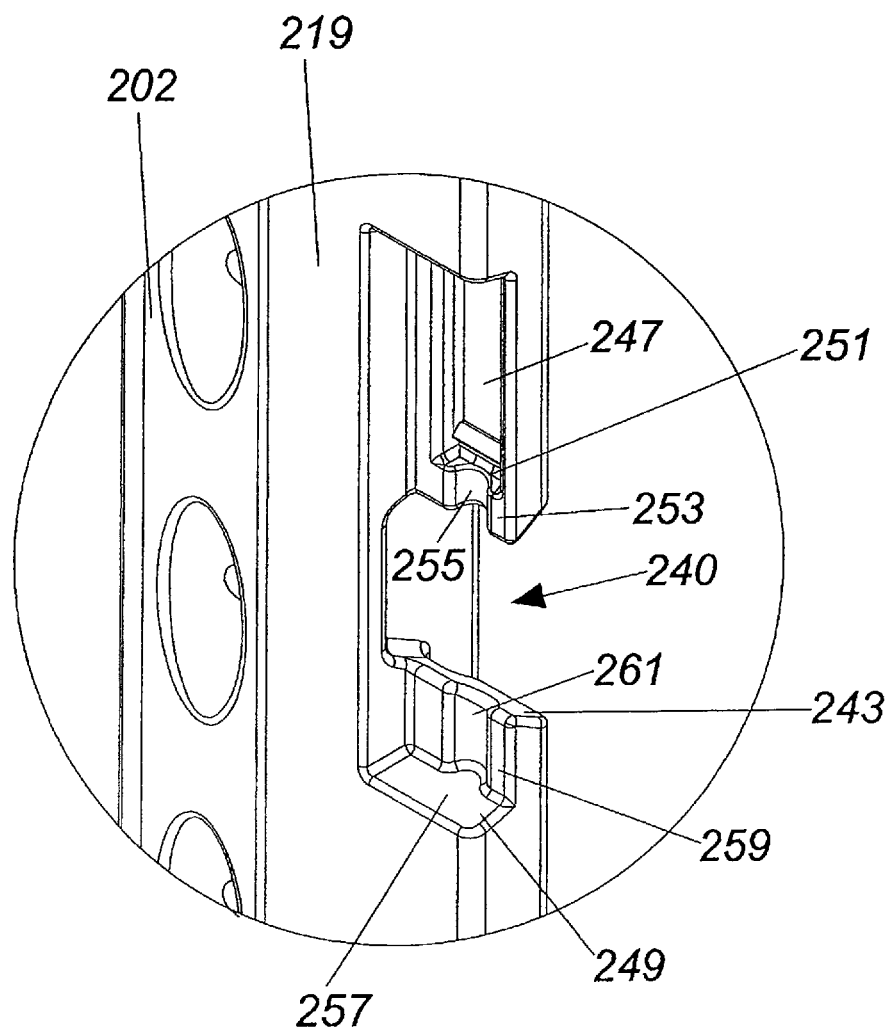
FIG. 42 is a partial perspective view of an inner surface of the key boss receptacle of a side wall connector of the instant invention.
Figure 43:
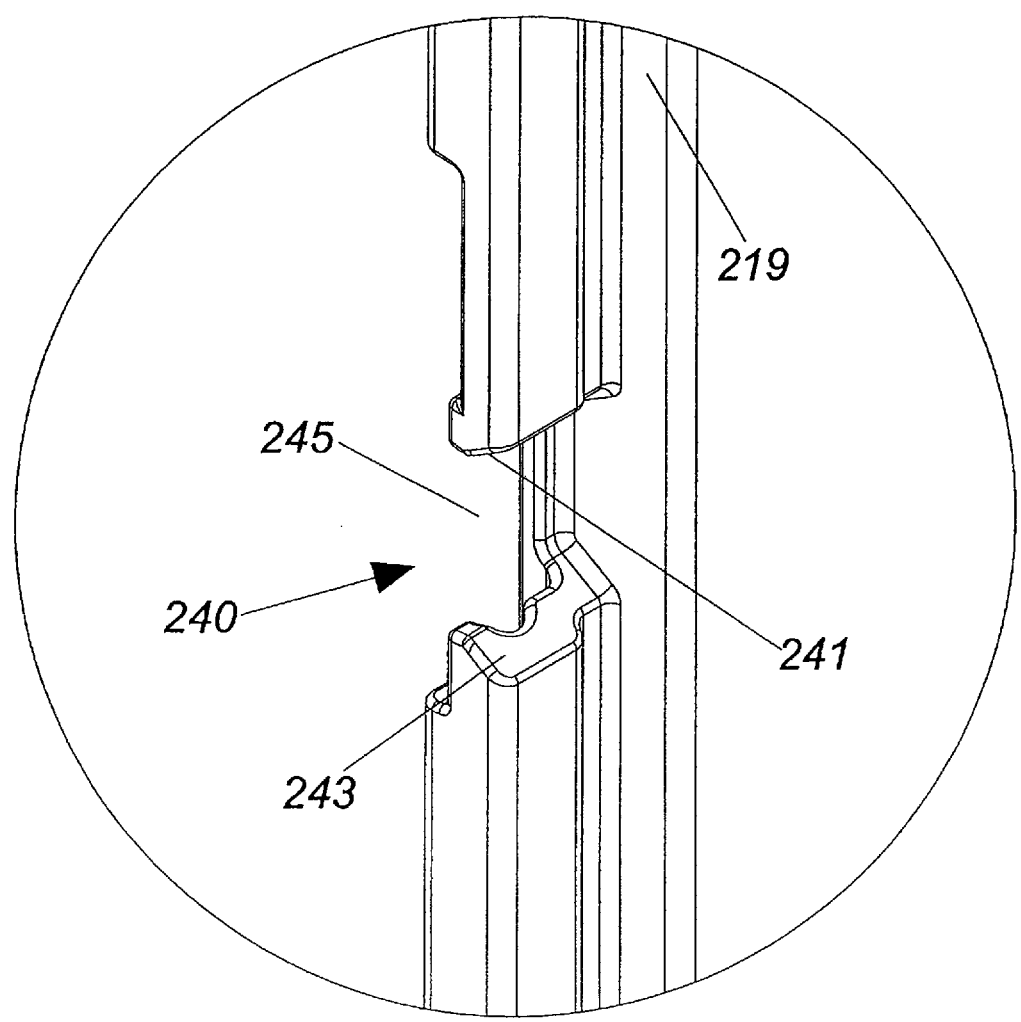
FIG. 43 is a partial perspective view of an outer surface of the key boss receptacle of the side wall connector illustrated in FIG. 42.

The sides of the front wall corner post member 334 and the side wall 202 are further secured by alignment of the plurality of key bosses 238 with the key boss slotted receptacle 360. Referring to FIG. 42, a partial perspective view of an inner surface of the key boss receptacle 240 of the side wall 202 is illustrated. FIG. 43 is a partial perspective view of an outer surface of the key boss receptacle 240 of a side wall connector 202. The outer surface of the key boss receptacle 240 contains opposing surfaces 241 and 243 separated by opening 245. While the preferred illustrative embodiment includes angled surfaces, opposing surfaces 241 and 243 may take on other configurations, such as generally flat, without departing from the spirit of the invention. The inner surface of the key boss receptacle contains recessed portions 247 and 249. Recessed portion 247 contains surface 251 which is constructed and arranged to house a portion of the upper end of the connector pin 700 when inserted therein. A surface portion 253 which contains a rounded portion 255 is constructed and arranged to cooperate with a portion of the body of the securing member 700. The second recessed portion 249 contains surface 257 which is constructed to cooperate with and/or support the bottom portion of the connector pin 700. A surface portion 259 which contains a rounded portion 261 is constructed and arranged to cooperate with a portion of the body of the securing member 700.

Figure 44:
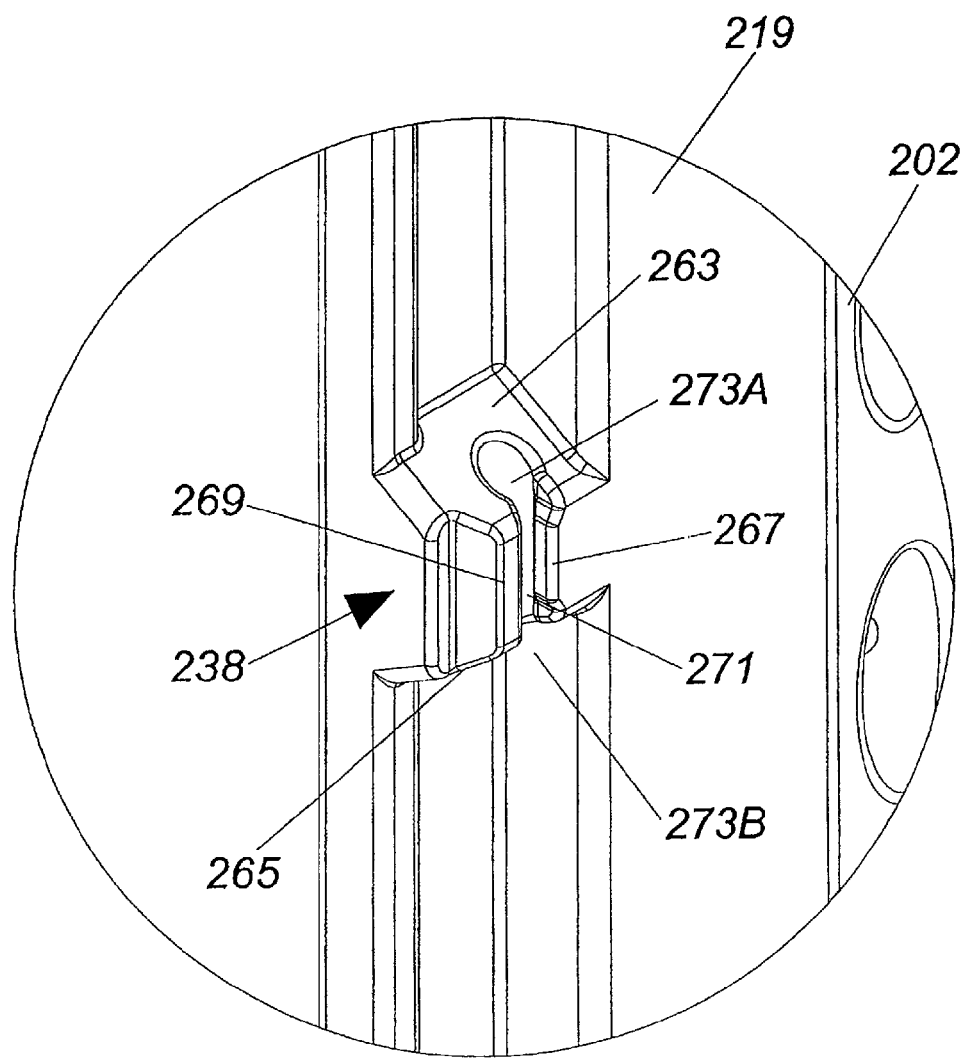
FIG. 44 is a partial perspective view of an inner surface of the key boss of a side wall connector of the instant invention.
Figure 45:
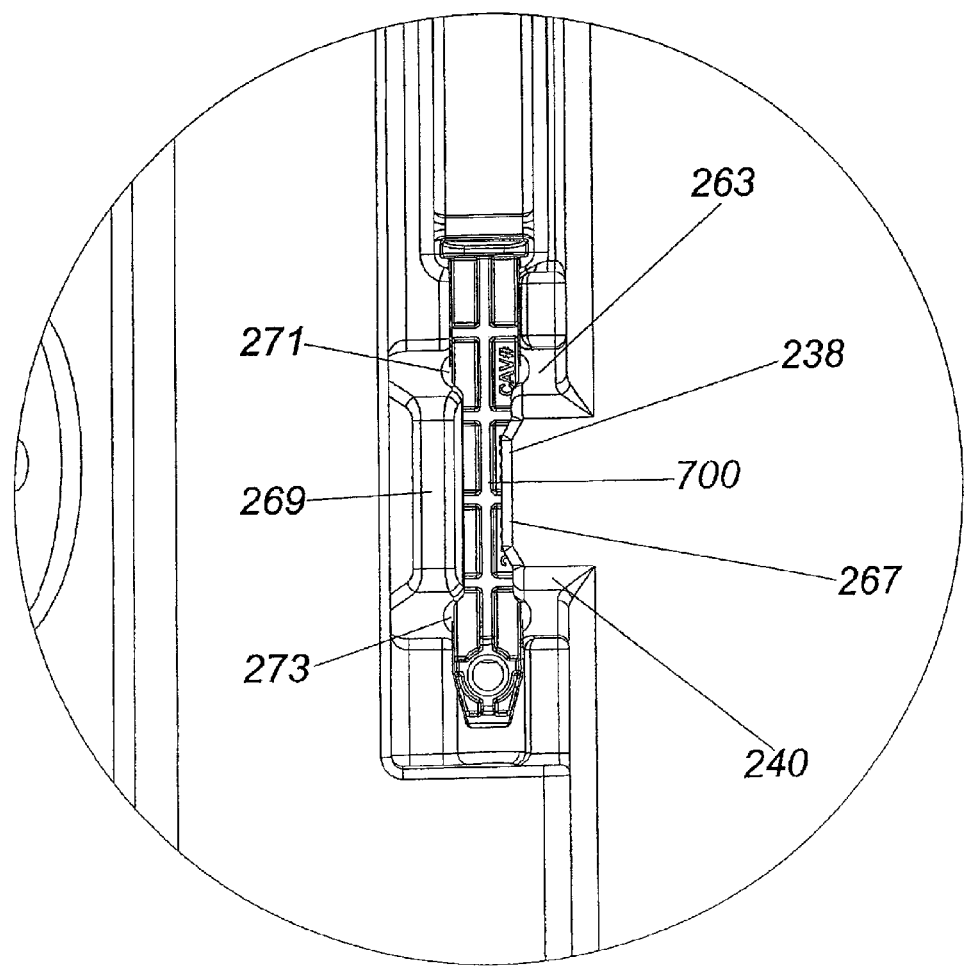
FIG. 45 is a cross sectional view of the pin connector inserted into the mated key boss and key boss receptacle.
Figures 46A, 46B, 46C:
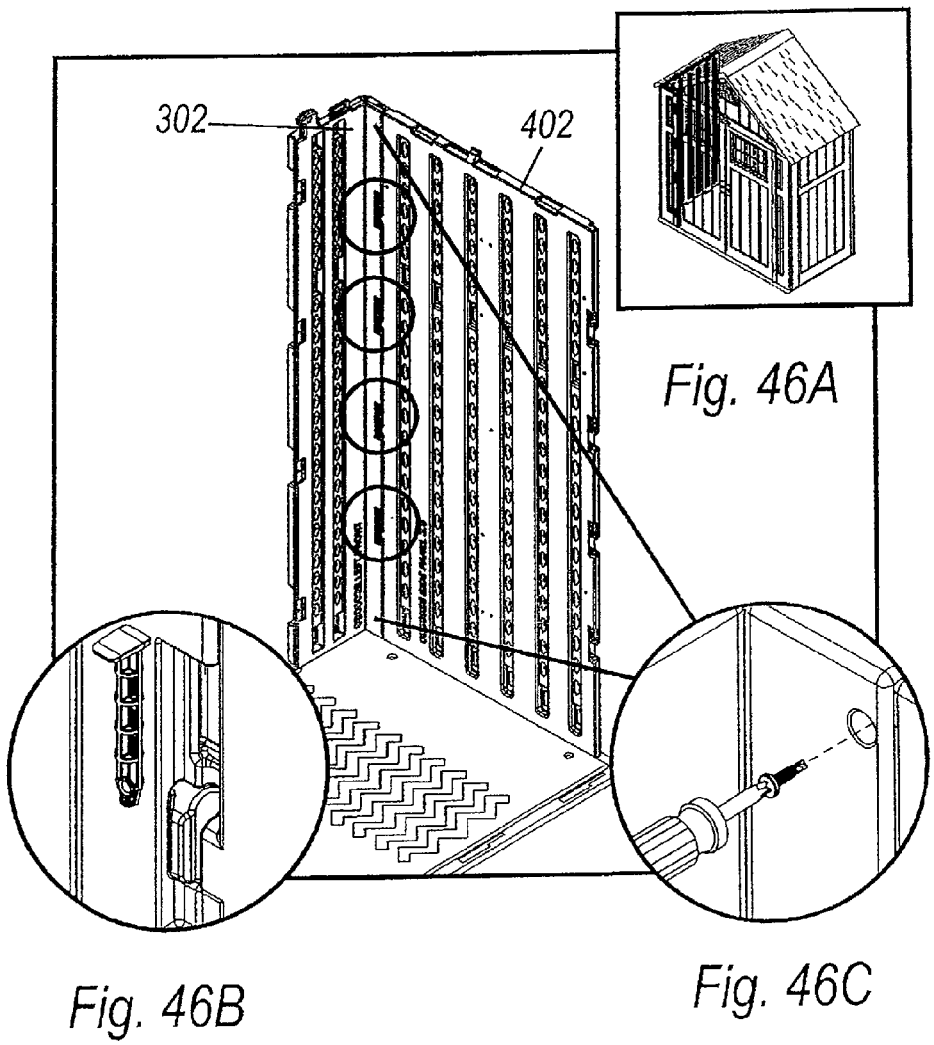
FIGS. 46A, 46B, and 46C illustrate the securing of the right front wall with the right side wall through pin connector and screws.
Figures 47A, 47B:
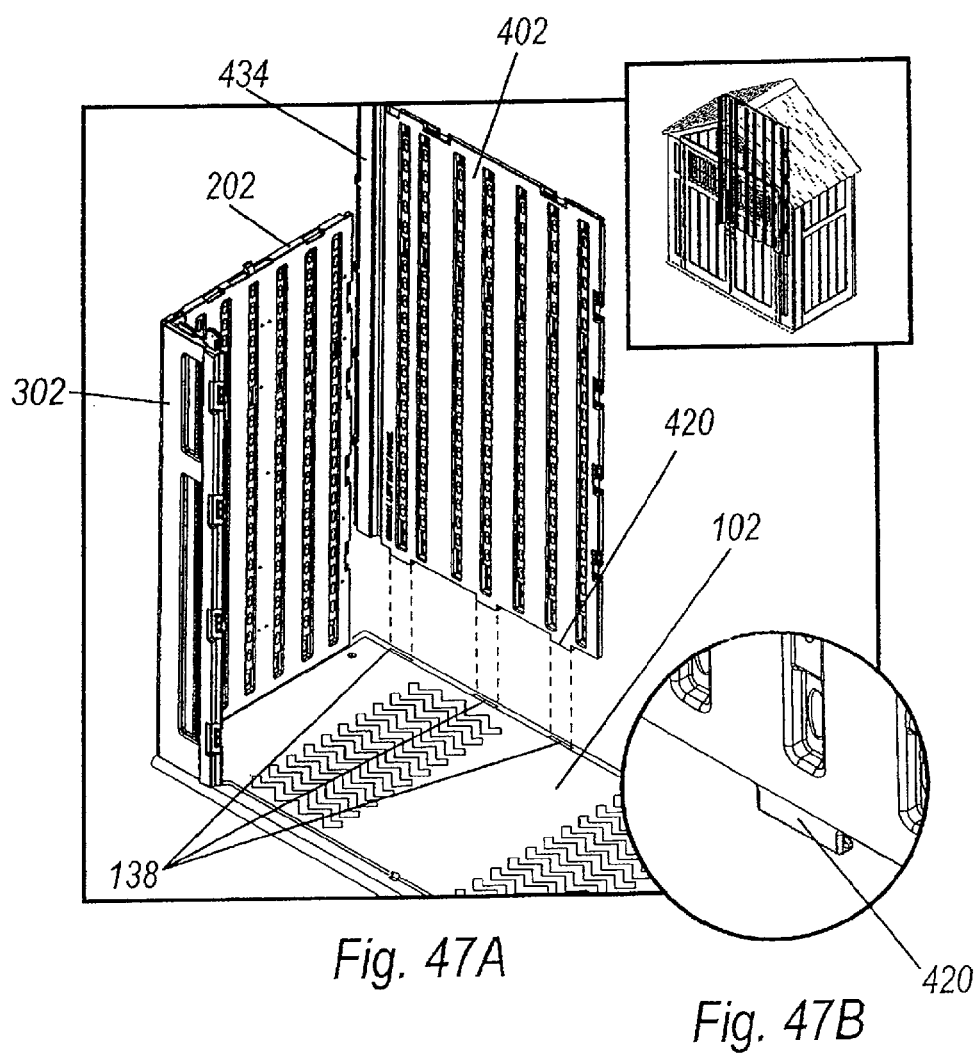
FIG. 47A illustrates the first step in the sequence of connection of the wall panels via insertion of the locking post into the locking socket.
FIG. 47B illustrates translation of the wall panel with respect to the floor panel to interlock the locking posts and locking sockets.

While FIG. 44 is a partial perspective view of the inner surface of the key boss 238 of a side wall 202, the features of the key boss as currently described is applicable for other key bosses positioned on other assembly panels. The outwardly extending key boss is sized and shaped to fit within the corresponding key boss receptacle 240 on an adjacent panel member. The key boss 238 contains opposing surfaces 263 and 265, preferably angled, and separated by two generally parallel outwardly extending members 267 and 269. The two outwardly extending members 267 and 269 form a channel 271 which terminates in open areas 273A positioned on surface 263 and opening 273B positioned on surface 265. Insertion of the key boss within the key boss receptacle aligns the connectors together at the angled surfaces, secures the adjacent panels, and provides an opening for insertion of the securing member, illustrated as a connector pin 700, see FIG. 45. The injection molded connector is preferably designed with a widened top to allow the user to have a greater surface to insert the parts and to ensure that the parts are inserted in the correct orientation. In the assembled position, therefore, connector pin 700 can be inserted through the open areas 273A and 273B, resting within channel 271, thereby securing the wall panel to wall panel securing assembly in place, see FIGS. 46A and 46B. Screws can be used as additional means of fastening as well, see FIG. 46C.

Referring to FIGS. 47-51, assemblage of the rear wall assembly is illustrated. The left rear wall panel 402 attaches to the floor panel 102 through alignment and the securing of the slide and lock locking post 420 with the slide and lock locking sockets 138 of floor panel 102 as described previously. Once secured to the floor panel, the rear left wall corner post member 434 is prepared for connection to the previously secured left side panel 202. In the initial step, the rear left wall corner post member 434 is inserted while aligned in the first position, such that it is substantially co-planer with the left rear wall panel 402, see FIG. 48. The left rear panel corner post member 434 is then traversed to the second hinged position, thus forming a right angle with the left rear wall panel 402, see FIG. 49. The left rear wall panel corner post member 434 secures to the floor panel through insertion of locking plug 460 into mating receptacle 122 of floor panel 102, see FIG. 51.

Figures 52B, 52C:
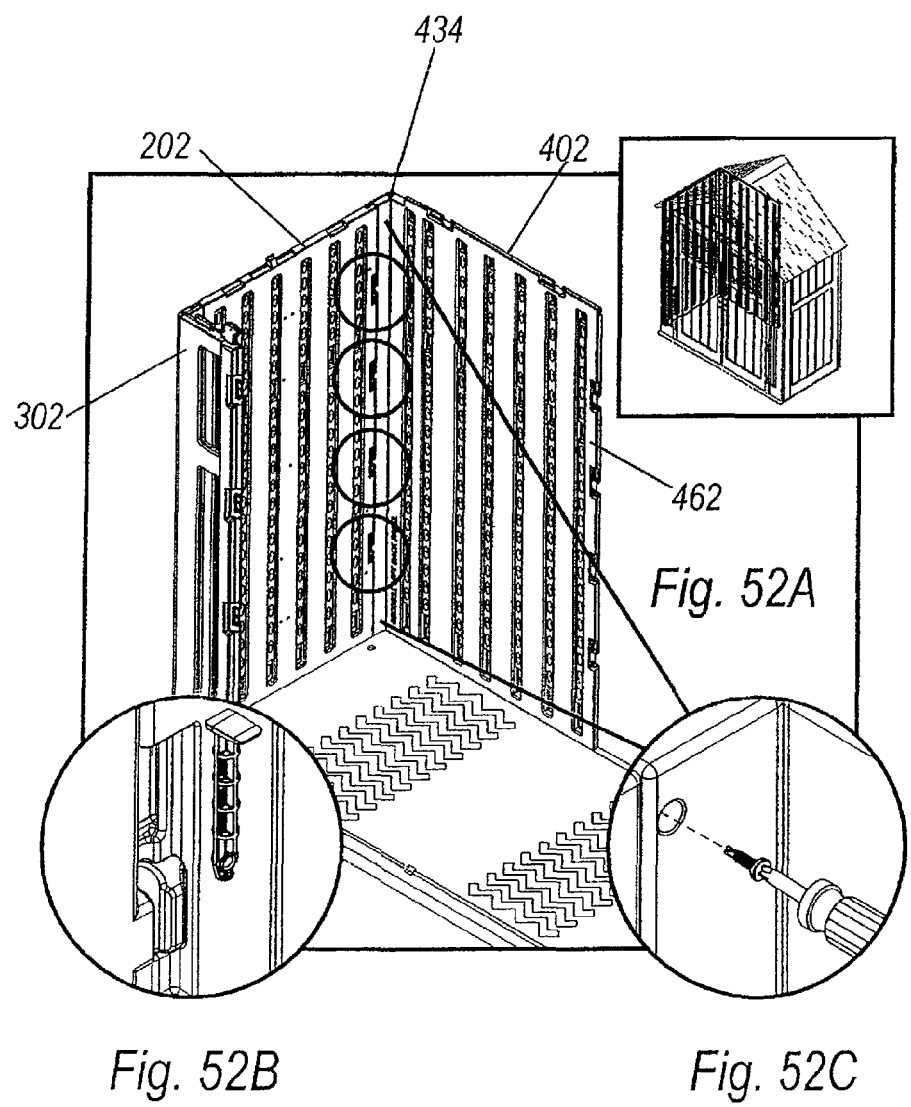
Figure 53:
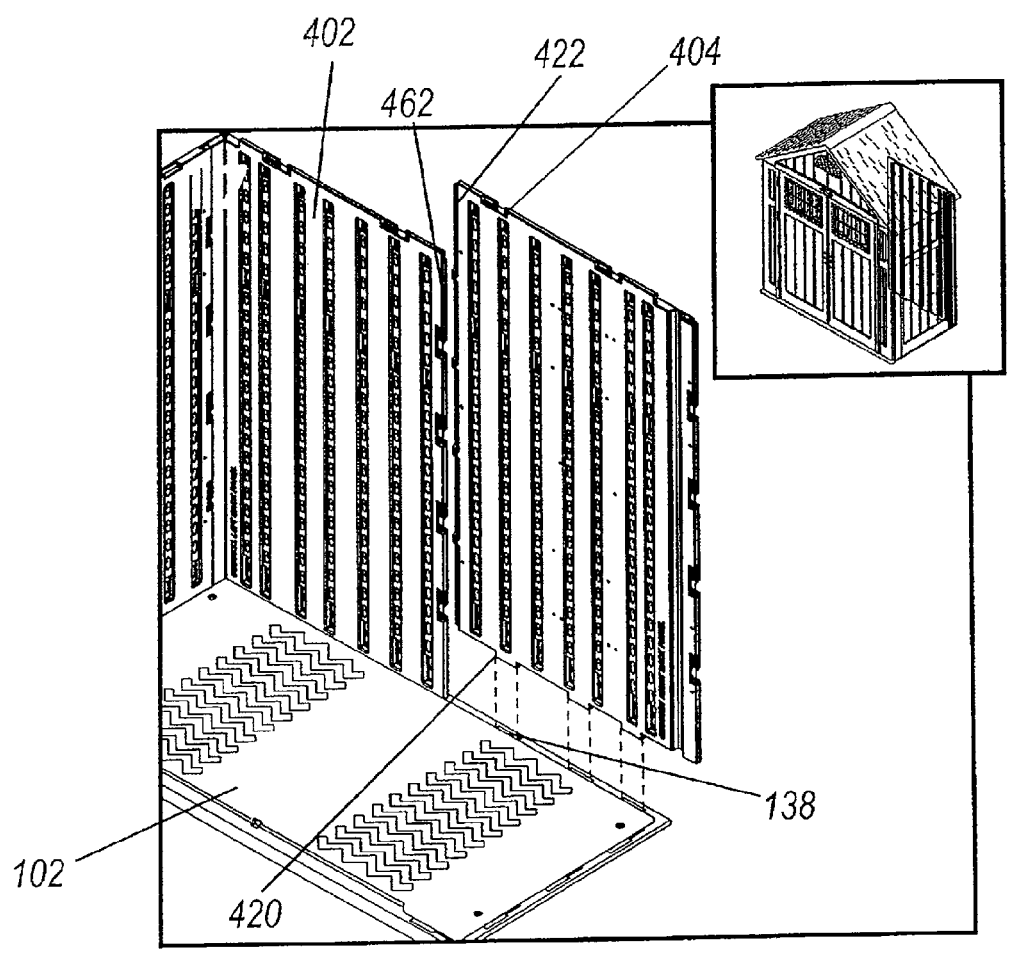
FIG. 53 illustrates insertion of a rear wall panel into the floor panel.
Figures 54A, 54B:
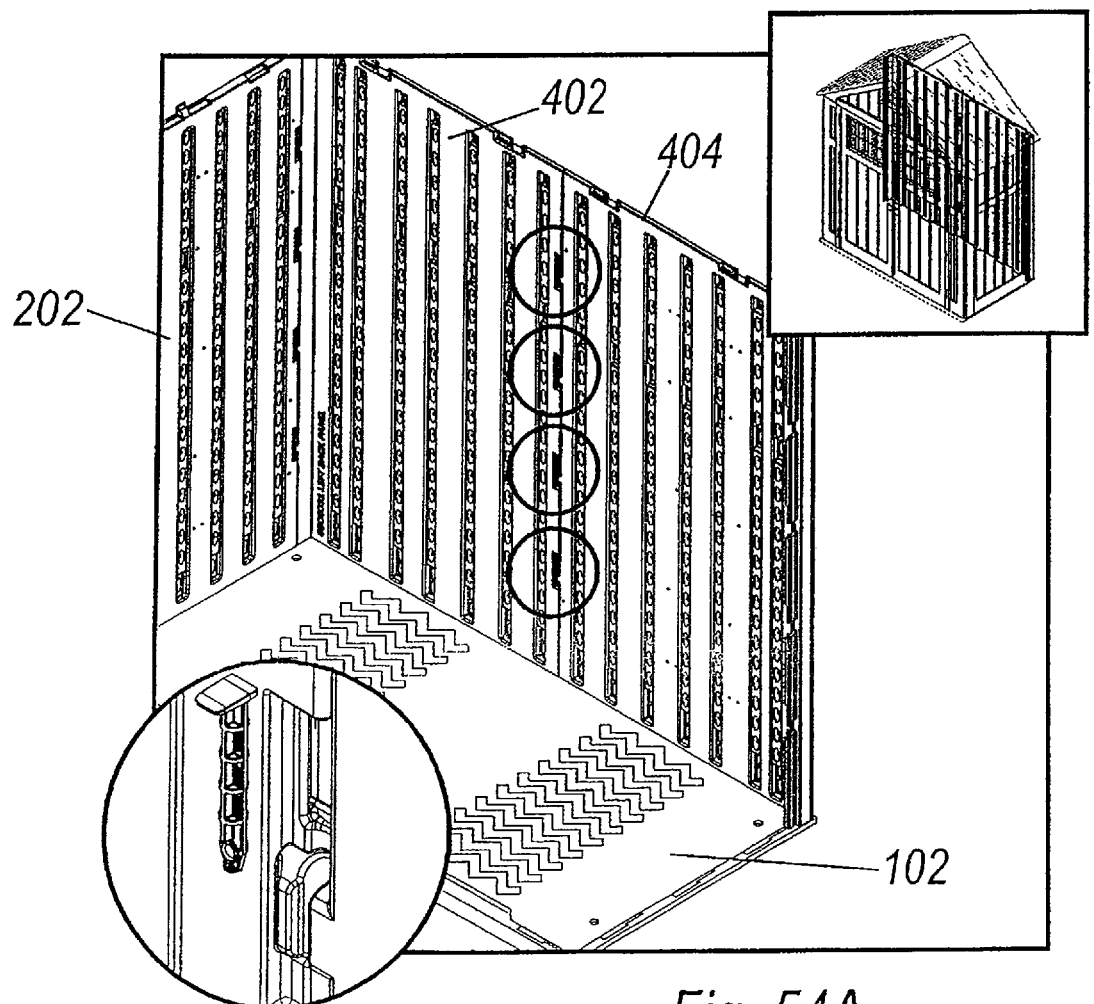
FIGS. 54A and 54B illustrate the left rear panel secured to the right rear panel with connector pins.

The left rear panel corner post member 434 of the left rear wall panel 402 is then secured to the side wall 202 through the alignment of the side wall flange 219 with the flange 454 of the left rear panel corner post member 434 and through interaction of the key boss/key boss receptacle, as described previously. Connector pin 700 is secured within (see FIG. 52B). Screws can be used as additional means of fastening as well, see FIG. 52C. To form the rear wall assembly, the non-engaged end of the left side wall panel 402, reference number 462 in FIG. 52A, is then coupled to the right rear wall panel 404 at left side end 422, FIG. 53. FIG. 53 also illustrates the attachment of the right rear wall panel 404 to the floor panel 102. The right rear panel 404 is first secured to the floor panel through insertion of the slide and lock locking post 420 integrally formed on the bottom end of the panel into the slide and lock locking sockets 138 of floor panel 102. The right rear panel 404 is aligned with and secured to the left rear panel 402 through the interconnections of the flange 428 of the left rear panel 402 and the flange 428 of right rear panel 404 and through key boss/key boss receptacle connection as described previously. Insertion of pin 700 secures the key boss/key boss receptacle connection, see FIGS. 54A and 54B. The right rear panel corner post member 434 of the right rear panel 404 is then traversed from the first non-hinged position to the second hinged position and secured to the floor member 102 through insertion of locking plug 460 into the mating receptacle 124, not illustrated.

Figure 55:
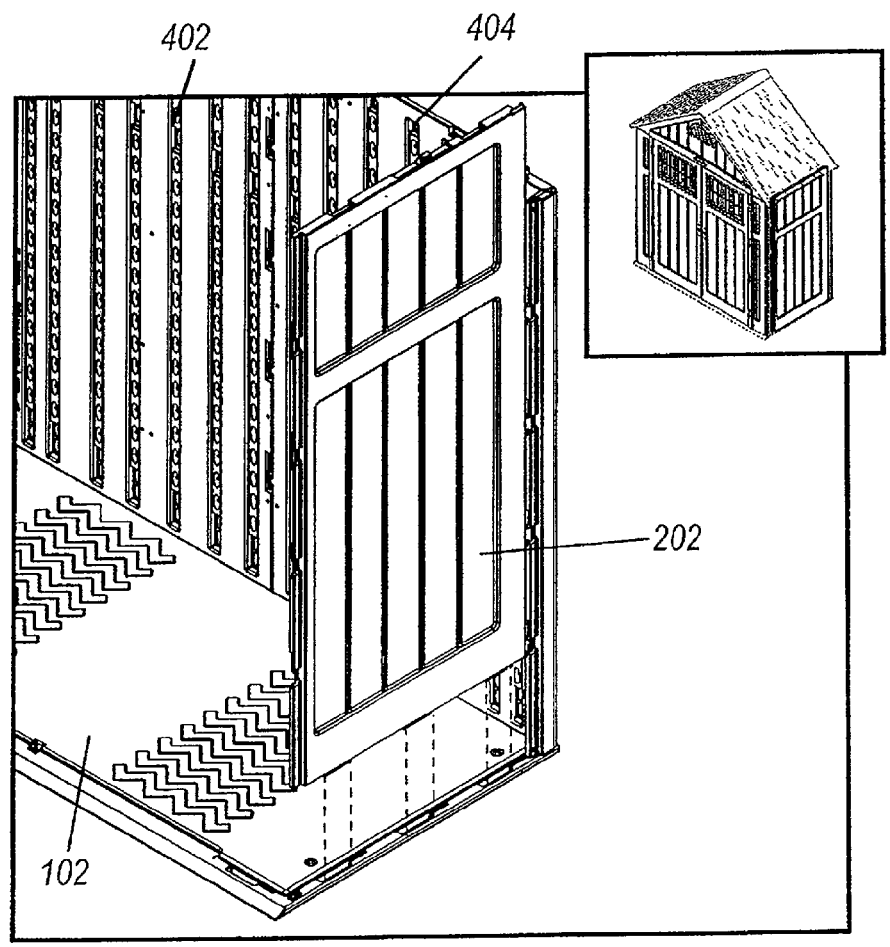
FIG. 55 illustrates insertion of the right side panel into the floor panel.
Figures 56A, 56B, 56C:
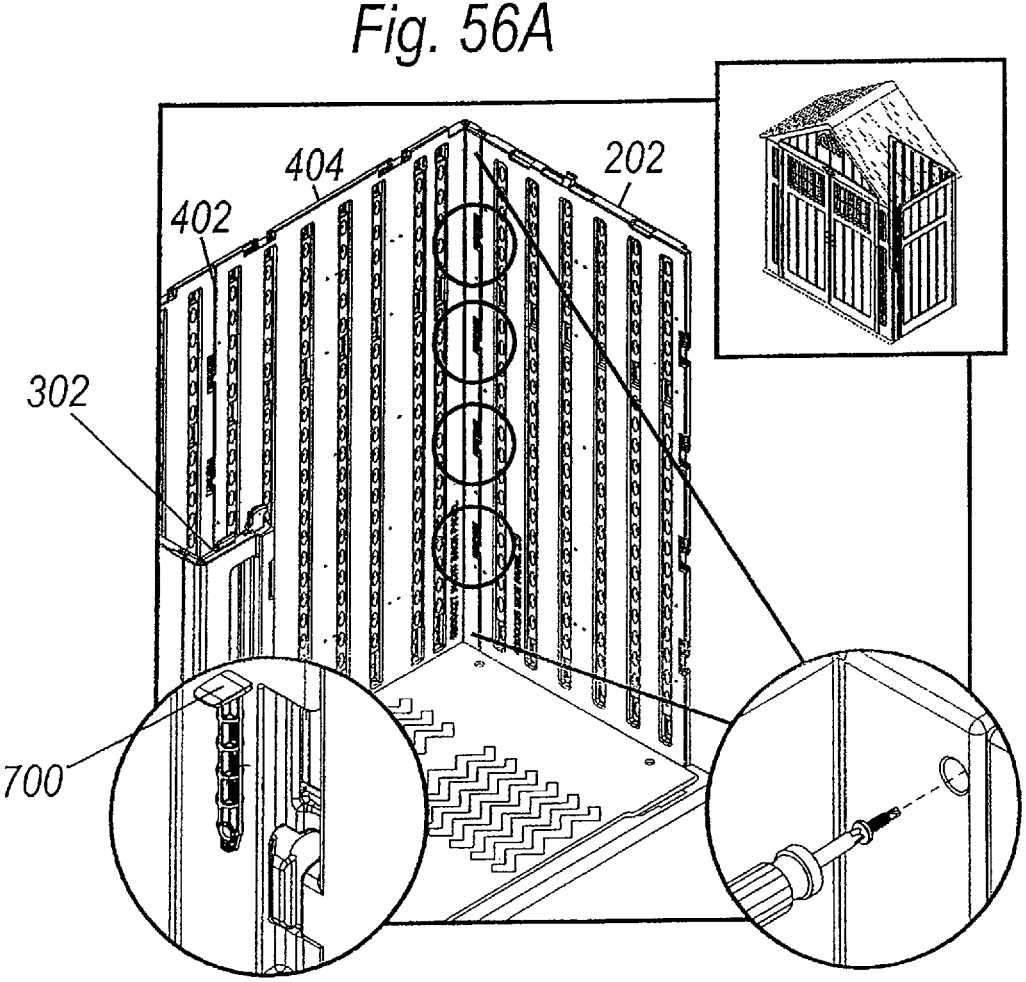
FIGS. 56A, 56B, and 56C illustrate the right rear panel secured to the right side panel with connector pins and screws.
Figure 57:
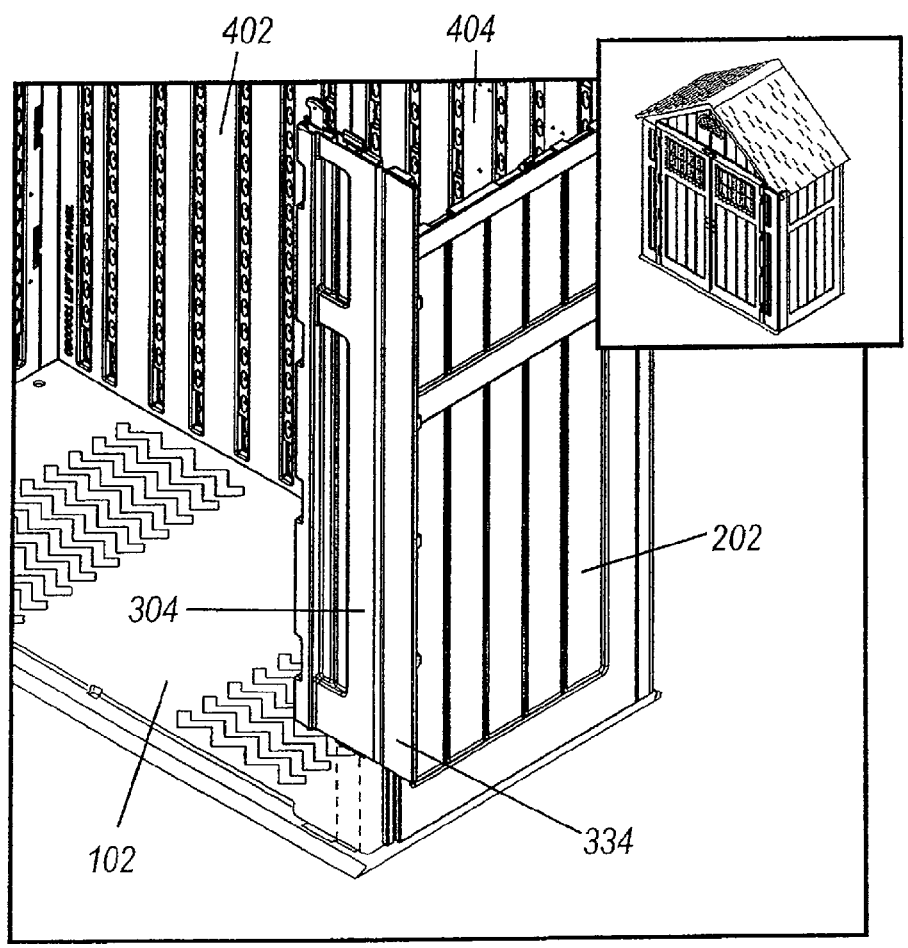
FIG. 57 illustrates the insertion of the right front wall into the floor panel.
Figures 61A, 61B, 61C:
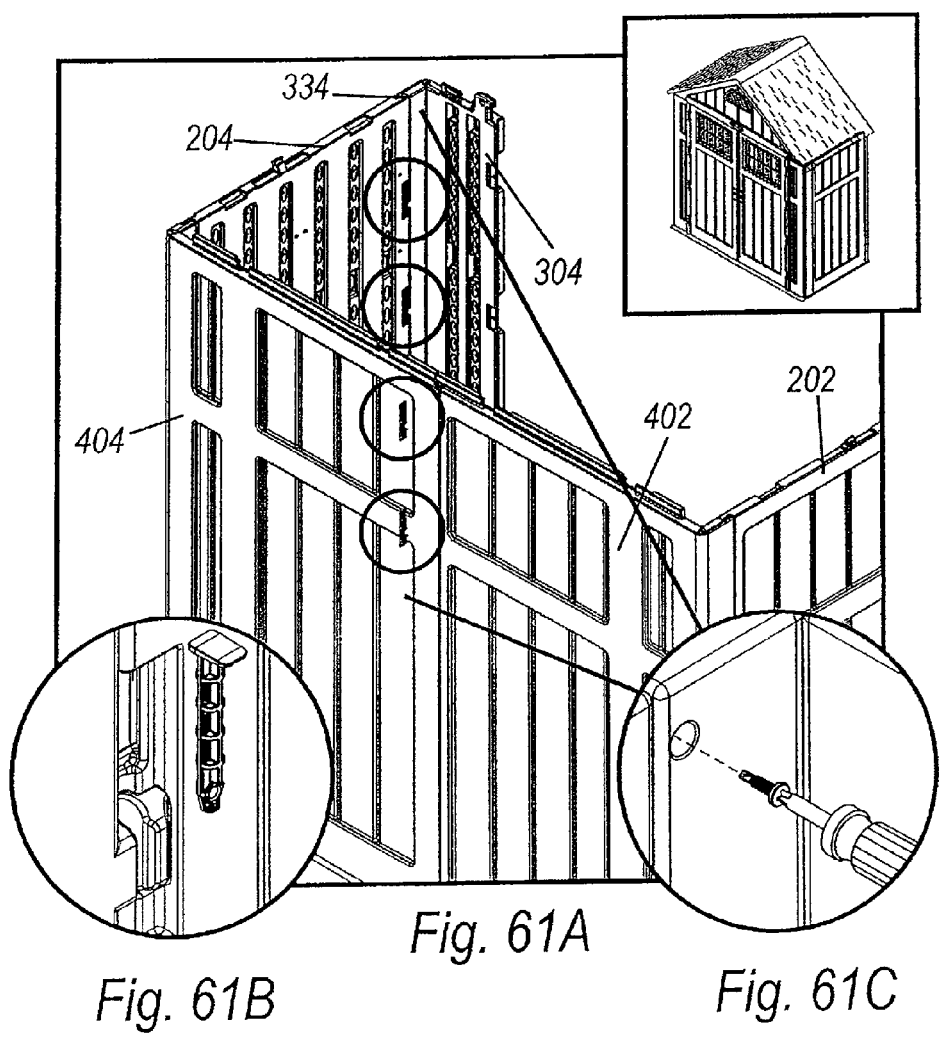
FIGS. 61A, 61B, and 61C illustrate the right front wall corner post member secured to the right side panel with connector pins and screws.

FIGS. 55-61 illustrate the additional steps in the assemblage of the enclosure 10, including the following steps: connecting and securing the side panel 202 to the corner post member 434 of the right side rear wall panel 402, see FIG. 55; connecting the right front wall 304 to the floor panel, see FIGS. 56A, 56B and 56C, and connecting and securing the side panel 202 to the right front wall panel corner post 334 of the right front wall panel 304, see FIGS. 57-61. Each of these connections follows the general steps of securing the panels to the floor through insertion of the slide and lock locking posts within the slide and lock locking sockets 138 of floor panel 102, traversing the corner post members from the first non-hinged position to the second hinged position, securing the corner post members to the floor through insertion of the locking plug within the mating receptacle of floor 102, aligning the panel flanges, interconnecting one panel to another panel or to the corner post member through the key boss/key boss receptacle connection mechanisms, and securing the key boss/key boss receptacle connection with insertion of connector pin 700.

Referring to FIGS. 62-650, the overlapping attachment of the door assembly 629 to the front wall panel 304 is illustrated. Attached to the right side end 622 of the right door panel 604 is a plurality of hinge assemblies 626 including a hinge pin 628 and end caps, or hinge knuckles, 630 and 632. The plurality of hinge assemblies 626 may be integrally formed within the right door panel 604. One or more hinge mounts 634 attaches to the hinge pin 628 through engaging the interior surface 636 of the partially rounded end 640 of hinge mount 634 with the hinge pin surface 642. Opposite the rounded end 640 of the hinge mount 634 is an engaging end 644, including a first wall 646, having a hooked end 648, substantially parallel to a second wall 650. The first wall 648 and the second wall 650 are connected by a wall 652, which may be partially curved, and forms a "J" shape in cross section. The attached one or more hinge mounts 634 are rotated towards the door, see FIG. 63B, to form an open position. The one or more hinge mounts 634 attach to the door hinge receiving slots 332 located on the left side of the right front panel 304, as illustrated in FIGS. 63-65G. The hinge mount 634 attaches to door hinge receiving slots 332 by securing the first wall 648 to connecting member 370 at surface 372 and the second wall 650 to surface 374 of connecting member 370. Securing hardware, such as a screw and nut, is inserted into aperture 376. The installation for the left door follows the same steps.

Figure 65A:
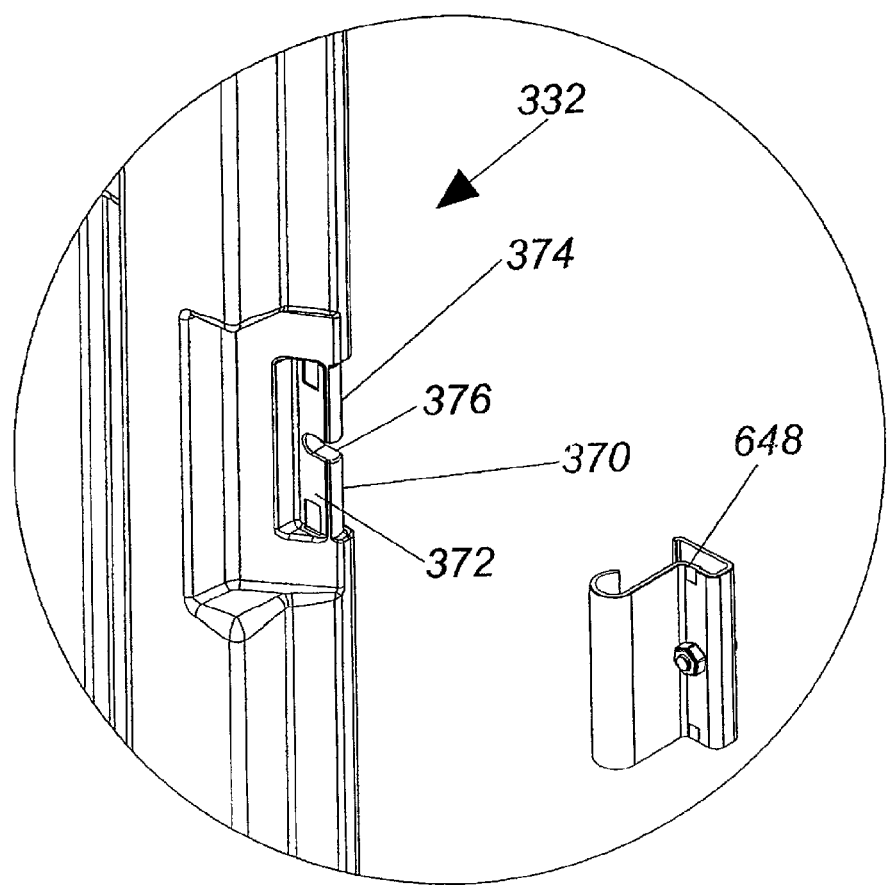
FIG. 65A is a close up view of the door hinge slots.
Figure 65B:
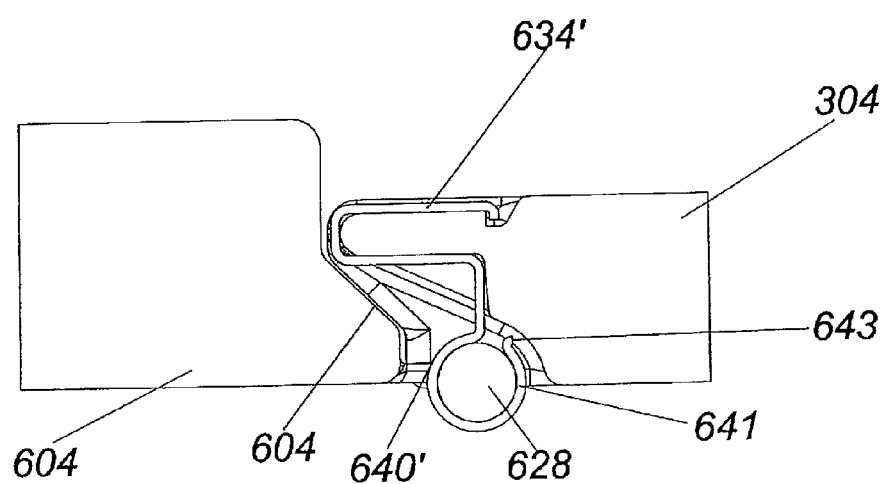
FIG. 65B is a top view assembly illustrating the use of an alternative embodiment of the hinge mount to provide hinged attachment of the door to the front wall panel.

Alternative methods of hinged connections may be used as well. Referring to FIG. 65B, a top assembly view is shown using an alternative embodiment of the hinge mount 634' to provide hinged attachment of the door 604 to the front wall panel 304. The hinge mount 634' is similar in construction as that of hinge 634, differing primarily in that hinge mount 634' contains an end portion 640' which is substantially cylindrically shaped having a rounded portion 641 which is sized and shaped to substantially, but not fully, enclose hinge pin 628. The end portion 640' may contain a terminal portion 643 which is designed to contain an outwardly facing curvature to secure the hinge mount 634' within the front wall panel 304.

Figure 65C:
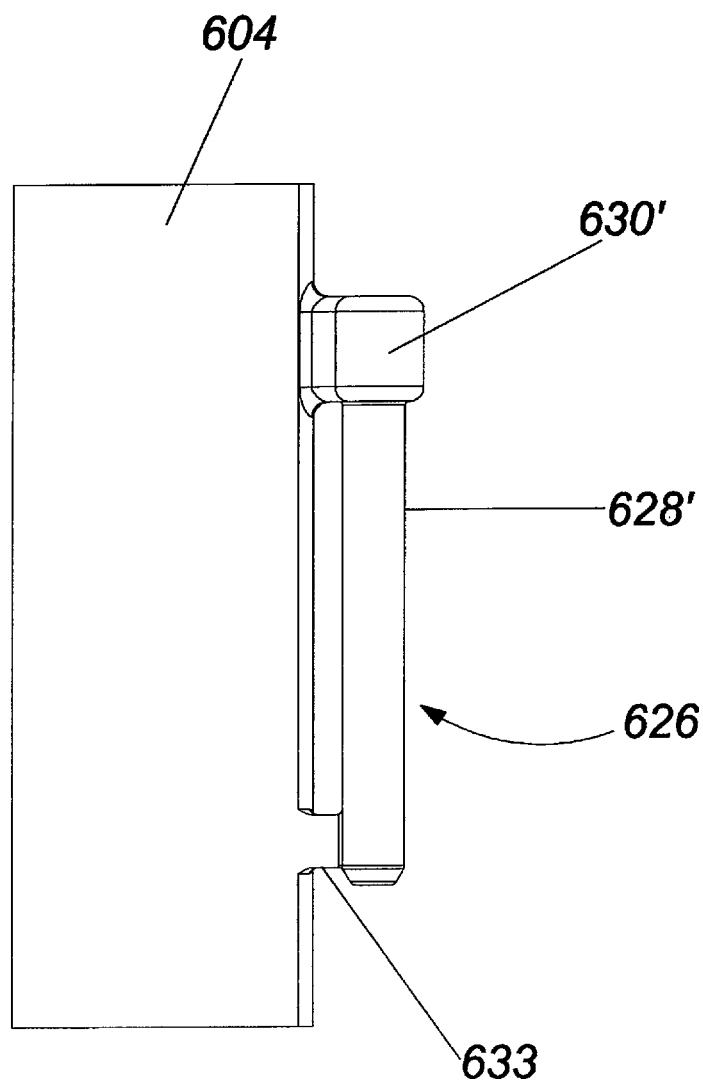
FIG. 65C illustrates an alternative embodiment of door hinge pin.
Figure 65F:
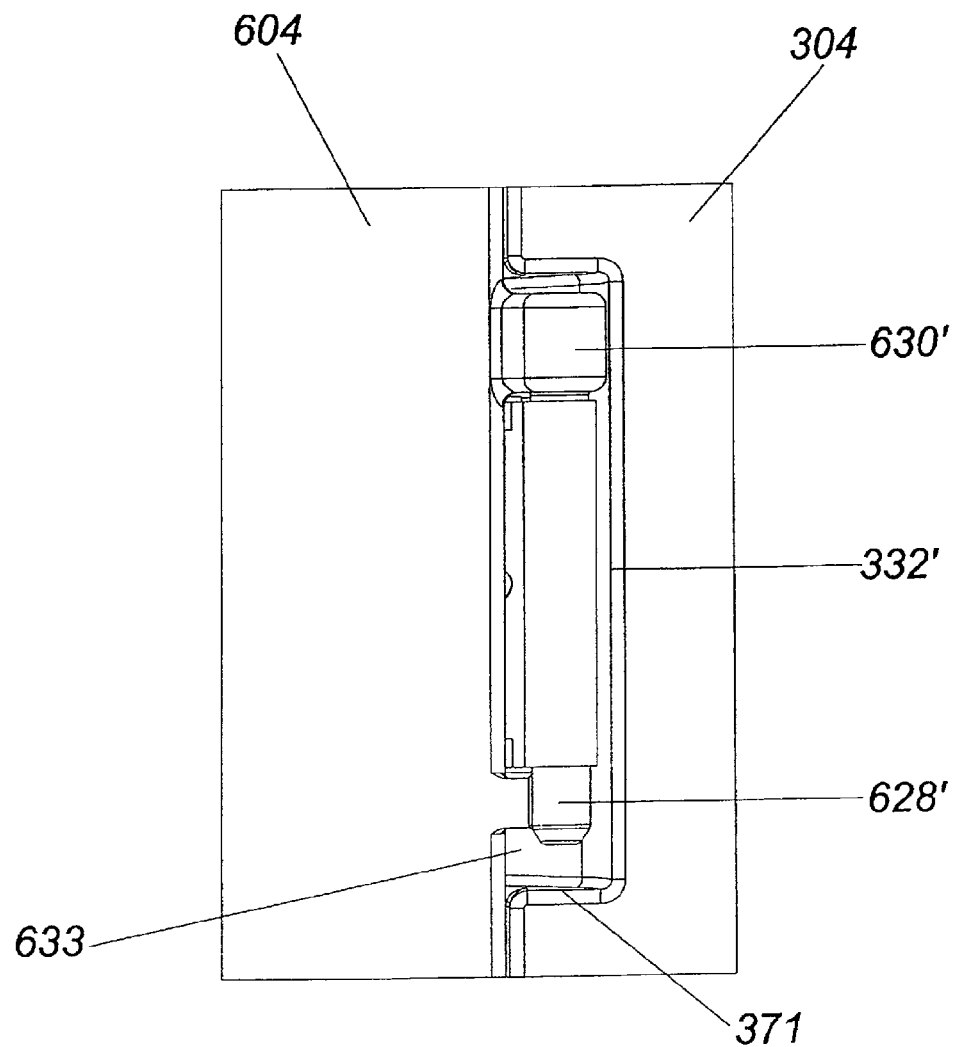
FIG. 65F illustrates the overlapping connection of the door panel member and the front wall panel using the door hinge pin illustrated in FIG. 65D.
Figure 65G:
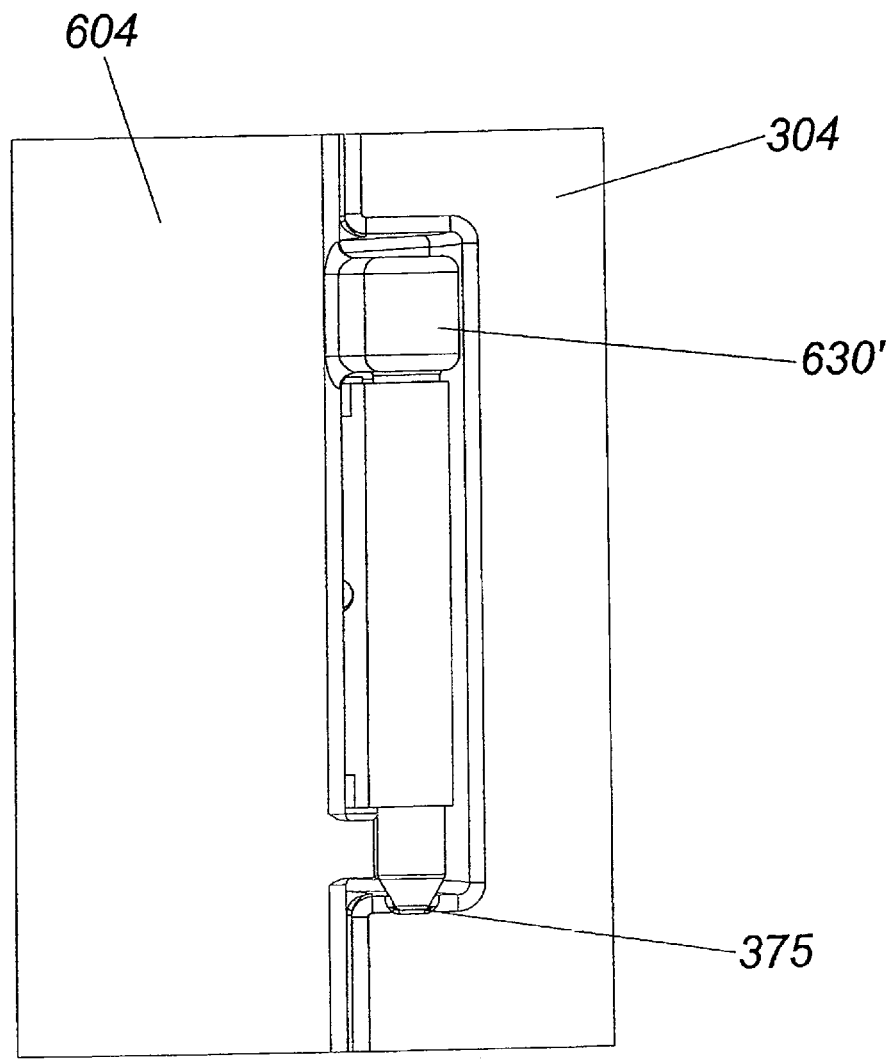
FIG. 65G shows the door hinge illustrated in FIG. 65D resting on the lower face of the door hinge slot of a front panel member.
Figure 66:
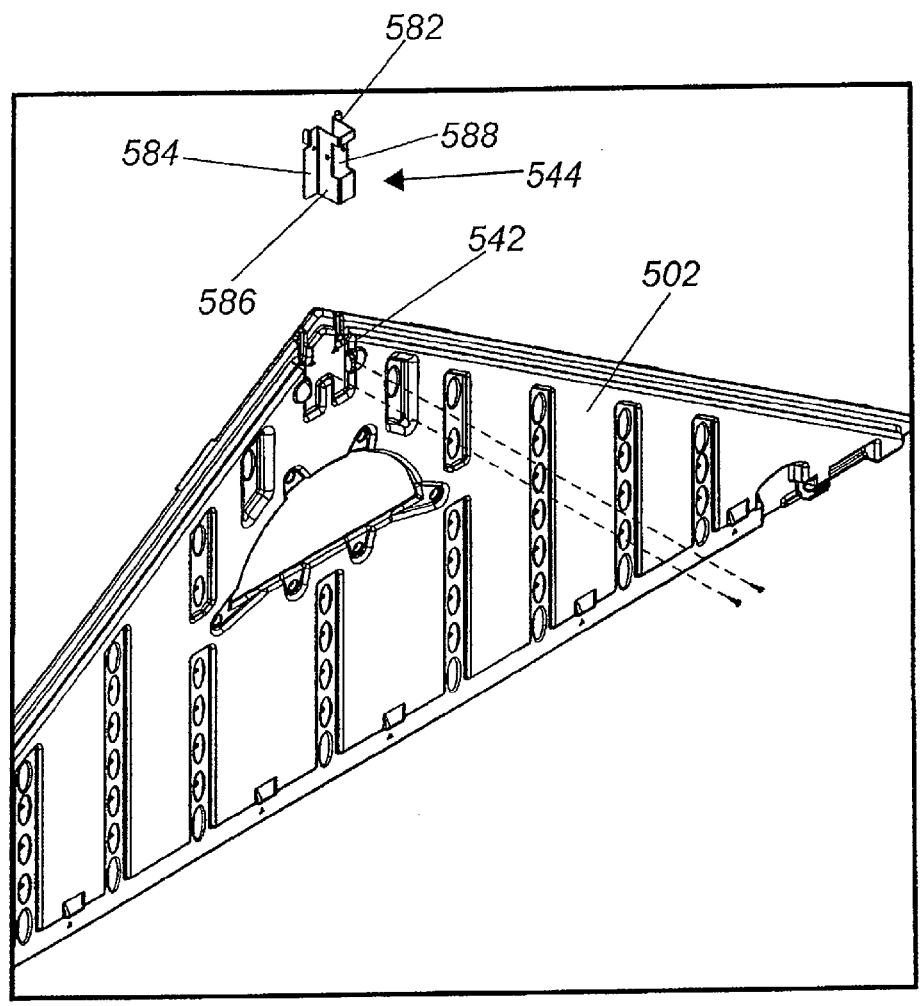
FIG. 66 illustrates a particular embodiment of the front roof header.

FIG. 65B also illustrates the overlapping connection between door 604 and the front panel 304 which can be accomplished through use of flanged sections as described previously. The hinge mount 634' may contain a curved tip, placed opposite the terminal portion 643 to secure the hinge mount 634' when inserted into a portion of the wall panel 304. FIG. 65C illustrates an alternative embodiment of the hinge assembly 626 attached to the front door panel 604. This embodiment includes a hinge pin 628' and end cap, or hinge knuckle, 630'. The second end cap, or hinge knuckle 632, illustrated previously is replaced with tab 633. The hinge assembly 626 attached to the front door panel 604 illustrated in FIG. 65C can interconnect to an overlapping, opposing front wall panel 304 through the door hinge receiving slot area 332', see FIG. 65D. As illustrated, the opposing wall panel 304 contains opposing surfaces 369 and 371 separated by a wall 373. One of the opposing surfaces 371 contains a conical face 375, see FIG. 65E, which is sized and shaped to engage with the tip of the hinge pin 628, allowing it to rest and/or pivot along this surface, see FIGS. 65F and 66G, and remain centered.

Figure 67A:
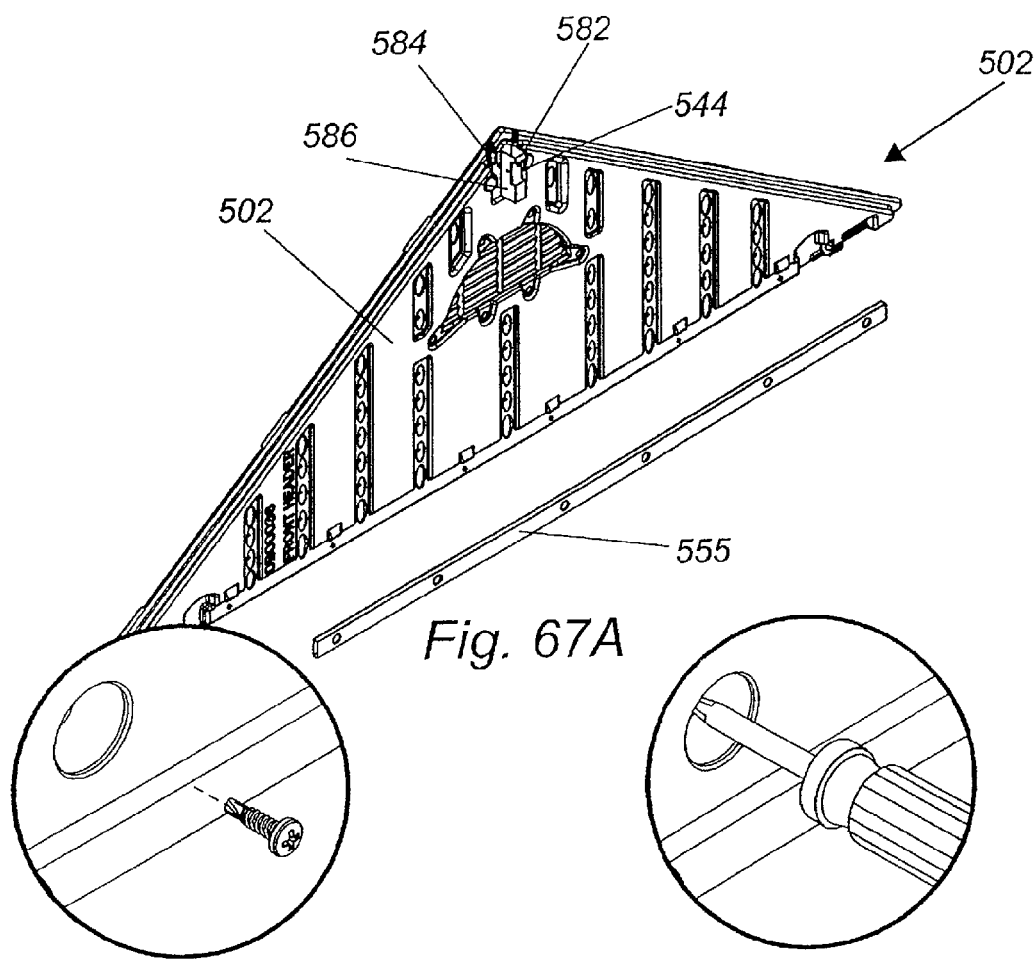
FIG. 67A illustrates the front roof header with a steel support member.
Figure 67B:
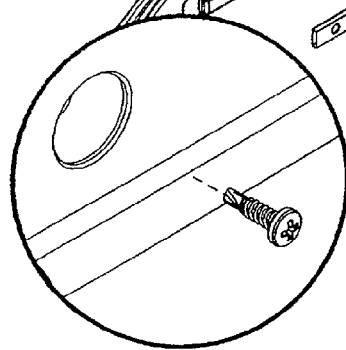
FIGS. 67B and 67C illustrate further construction of the roof header.
Figure 67C:
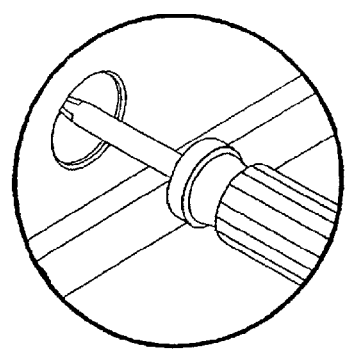
Figure 69:
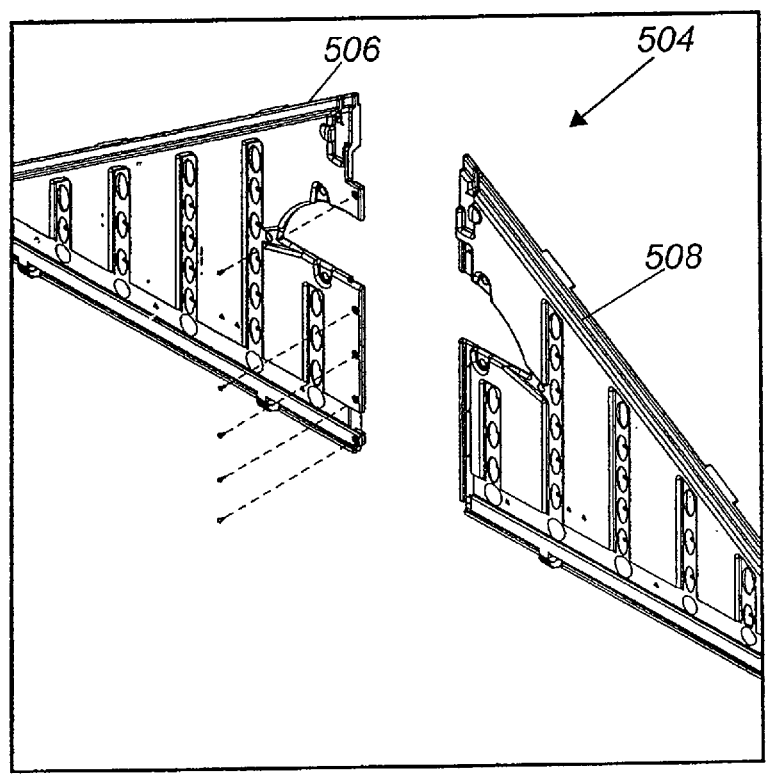
FIG. 69 is a perspective view of the rear roof header.
Figures 70A, 70B:
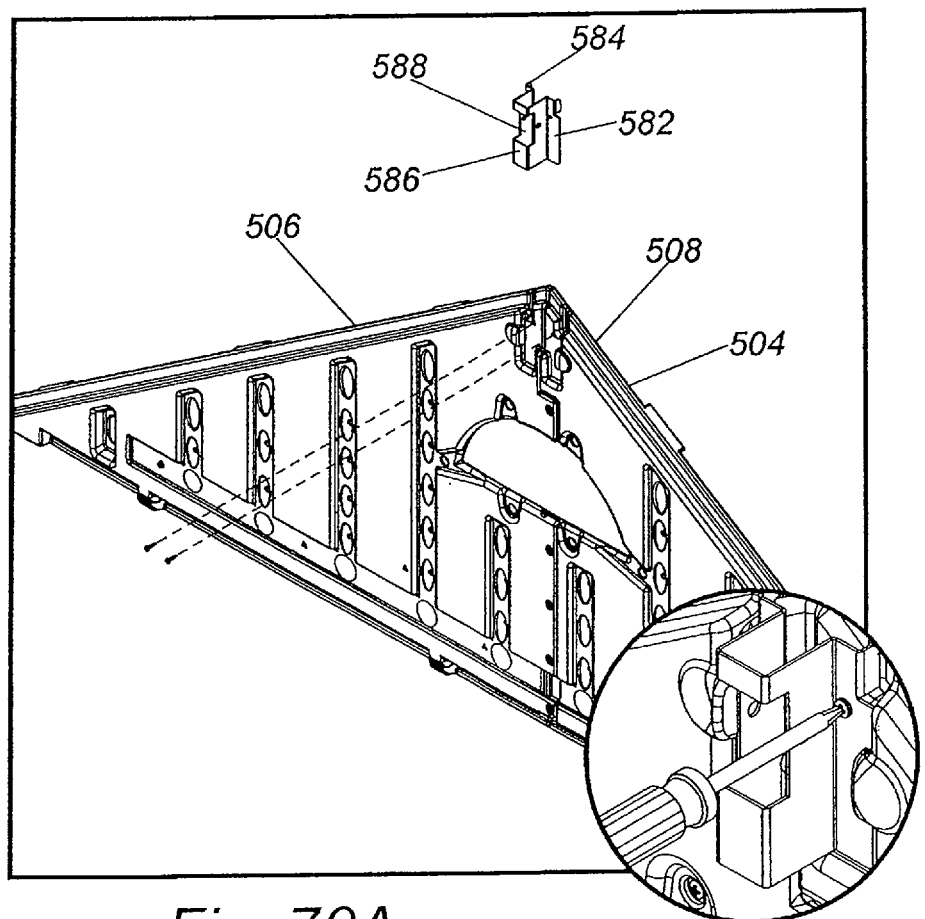
FIGS. 70A and 70B illustrate attachment of the ridge beam bracket to the roof header.
Figures 71A, 71B:
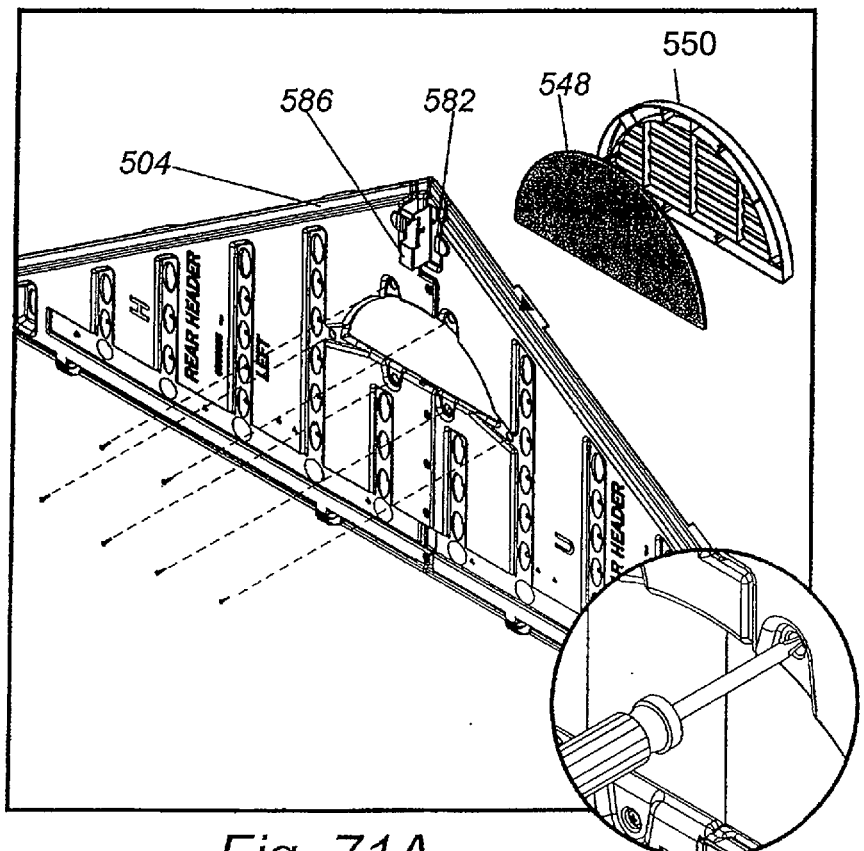
FIGS. 71A and 71B illustrate attachment of the screen and vents to the roof header.
Figures 72A, 72B, 72C:
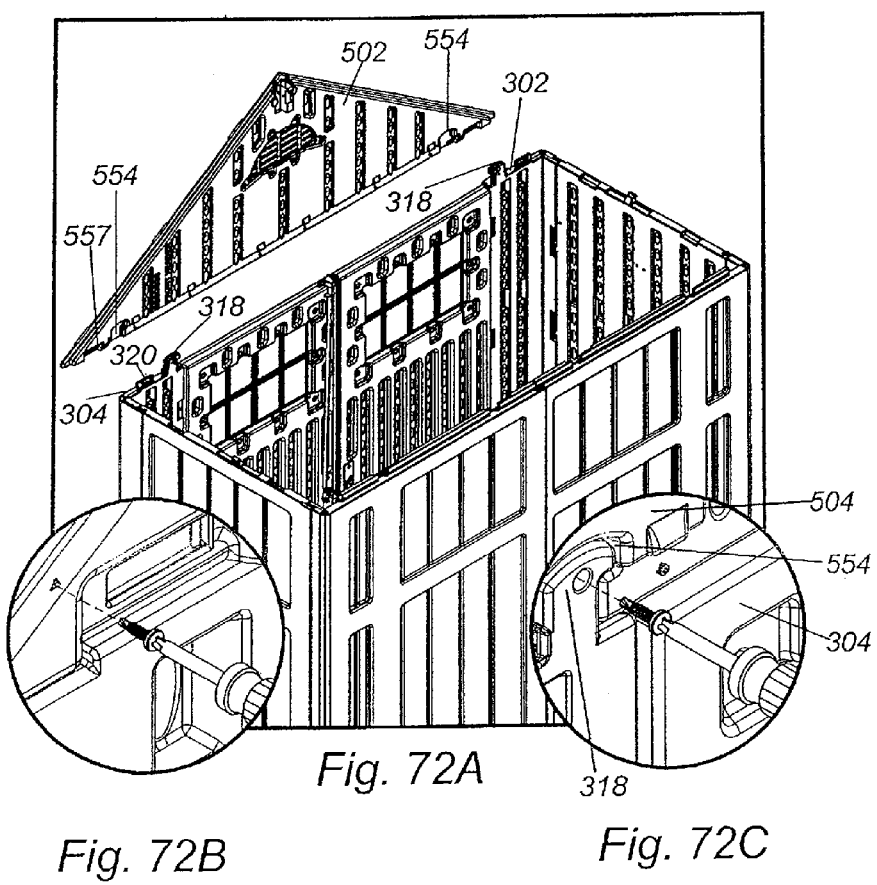
FIGS. 72A, 72B, and 72C illustrate the attachment of the roof header to the front wall panel and door panel.
Figures 73A, 73B:
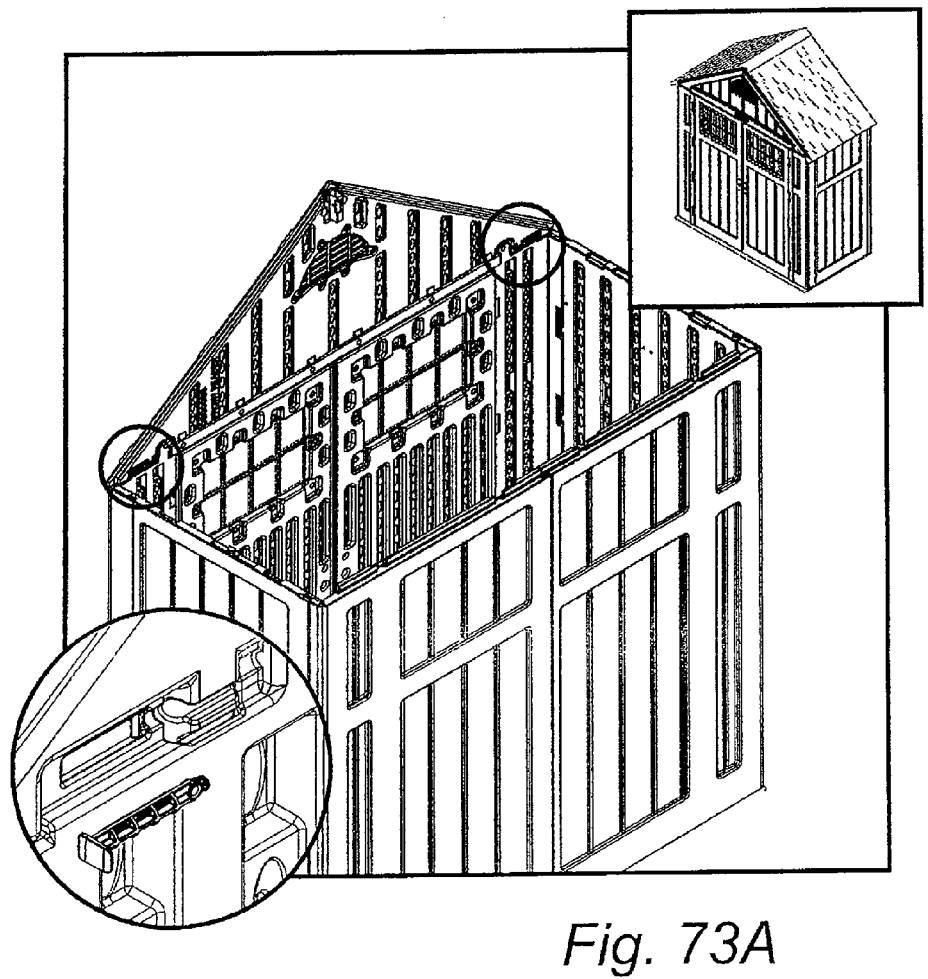
FIGS. 73A and 73B illustrate the securing of the front header to the corner post member with connector pin.
Figure 74:
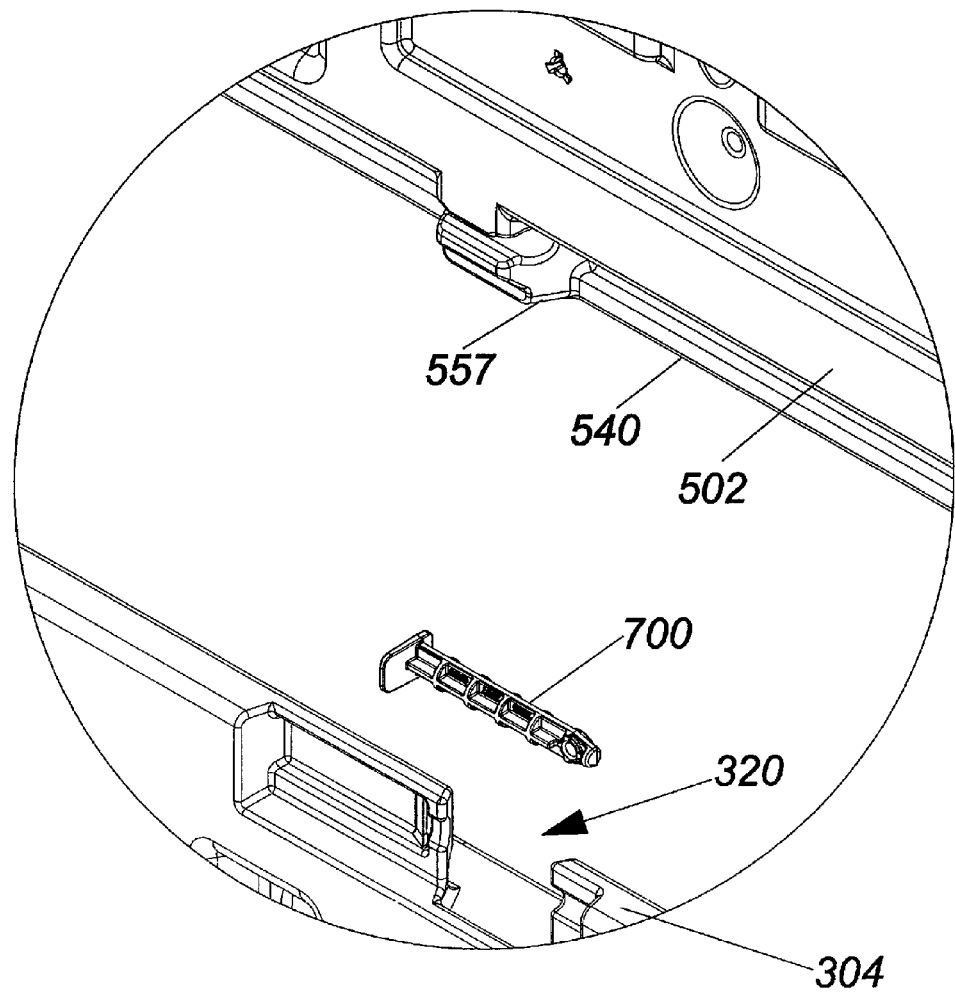
FIG. 74 is a close up view of the mated key boss and key boss receptacle.

FIGS. 66-80 illustrate the attachment of the roof assembly 500 to the enclosure 10. Prior to attaching the front header 502 to the door assembly 600 and the front wall assembly 300, a slide roof beam bracket 544, preferably made of metal, is placed within the slide roof beam bracket receiving area 542. The slide roof beam bracket 544, as illustrated herein, contains a plurality of securing plates 582 and 584 connected to a main body 586. The main body 586 contains an opening 588 which is constructed and arranged to receive a ridge beam 554 (see FIG. 75A). The slide roof beam bracket 544 may be secured to the front header by securing hardware, such as screws. One end of the ridge beam 554 is inserted into the slide roof beam bracket 544. If desired, a vent screen 548 and a header vent 550 is secured to header vent opening 546 through securing hardware, such as screws. FIGS. 67A-67C illustrate the attachment of the header beam 555 to header 502.

The other end of the ridge beam 554 is inserted into the slide roof beam bracket 544 and connects to the rear header 504. Prior to insertion of the ridge beam 554, the rear header halves 506 and 508 are secured together using securing hardware, such as screws, thus forming a completed rear header 504, see FIG. 69. The rear slide roof beam bracket 544 is secured to the rear header 502 in a similar manner as described previously. The securing plates 582 and 584 of the slide roof beam bracket 544 are attached to a portion of the rear header half 506 and to a portion of the rear header half 508, see FIG. 70A. The ridge beam 554 is inserted into opening 588. A rear header vent screen 548 and the rear header vent 550 is secured to the rear header vent opening through securing hardware, such as screws, see FIG. 71A. Screws may be used as additional mechanism of securing, see also FIG. 71B.

FIGS. 72A-74 illustrates attachment of the front header 502 to the front wall assembly 300 and/or the door assembly 600. The front header 502 is secured to the front panels 302 and 304 by inserting the protruding support legs 318 into the conjugately shaped protruding support legs sockets 554 integrally formed into the interior surface 512 of header 502. Securing the protruding support legs 318 with the protruding support legs socket 554 may be accomplished simply by slipping the support legs 318 into the support legs socket 554 or through an interference fit. Optionally, protruding support legs socket 554 may contain a catch member (not shown) for providing tactile, click engagement. The protruding support legs 318 may be secured to the protruding support legs socket 554 using securing hardware such as screws, see FIG. 72C.

Additional connection may be accomplished by securing key boss receptacle 320, which is configured in the same manner as other keyboss receptacles described previously, but arranged in a different orientation, i.e. in a vertical position instead of a horizontal position, with key boss 557. The key boss receptacle 320 is integrally formed on the top end 310 of the left and right front panel 302, 304 and engages with the key boss 557, which is integrally formed at the bottom end 540 of header 502, see FIGS. 73-74, in a similar manner as described for other keyboss/keyboss receptacle connection. A connector pin 700 is inserted within, locking the interconnected key boss receptacle 320 and key boss 557 in place. The rear header 506 is secured to the rear wall assembly utilizing the same steps as used for attachment of the front header 502.

Figures 75A, 75B, 75C:
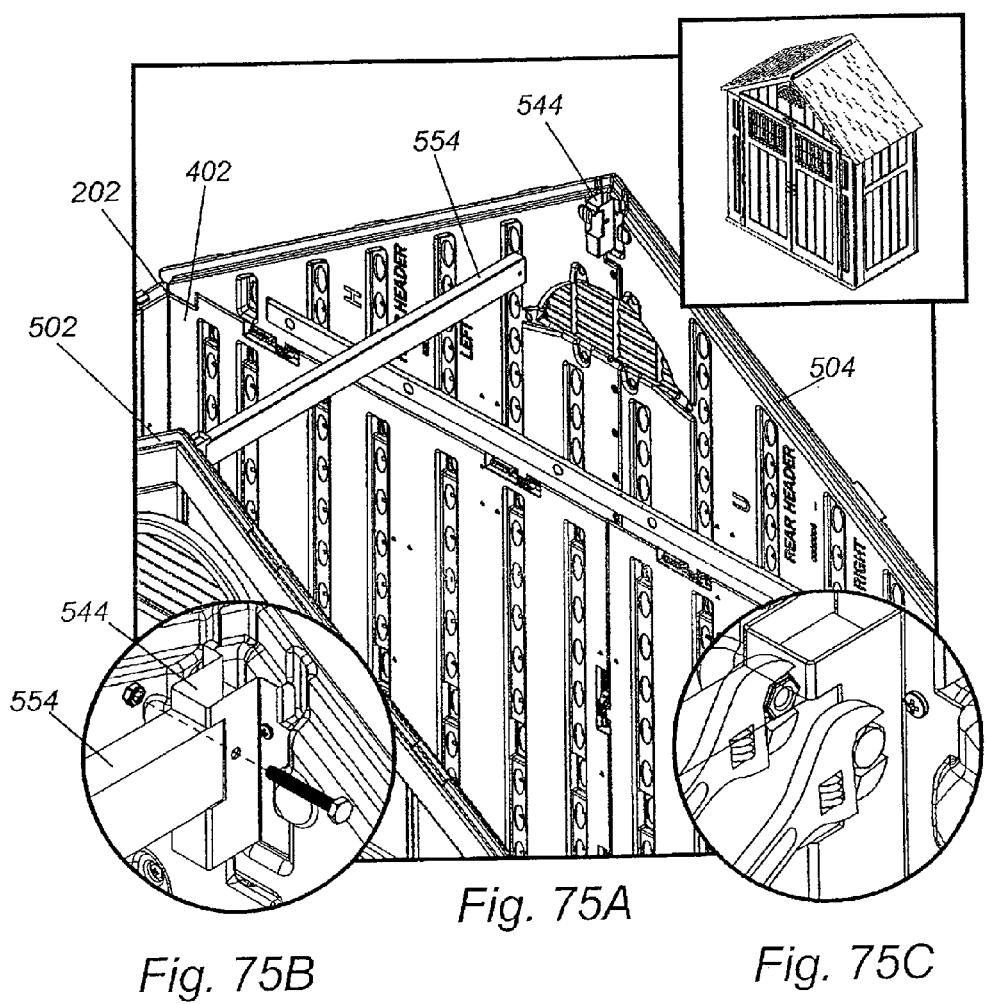
FIGS. 75A-75C illustrate attachment of the ridge beam to ridge beam brackets.
Figure 76:
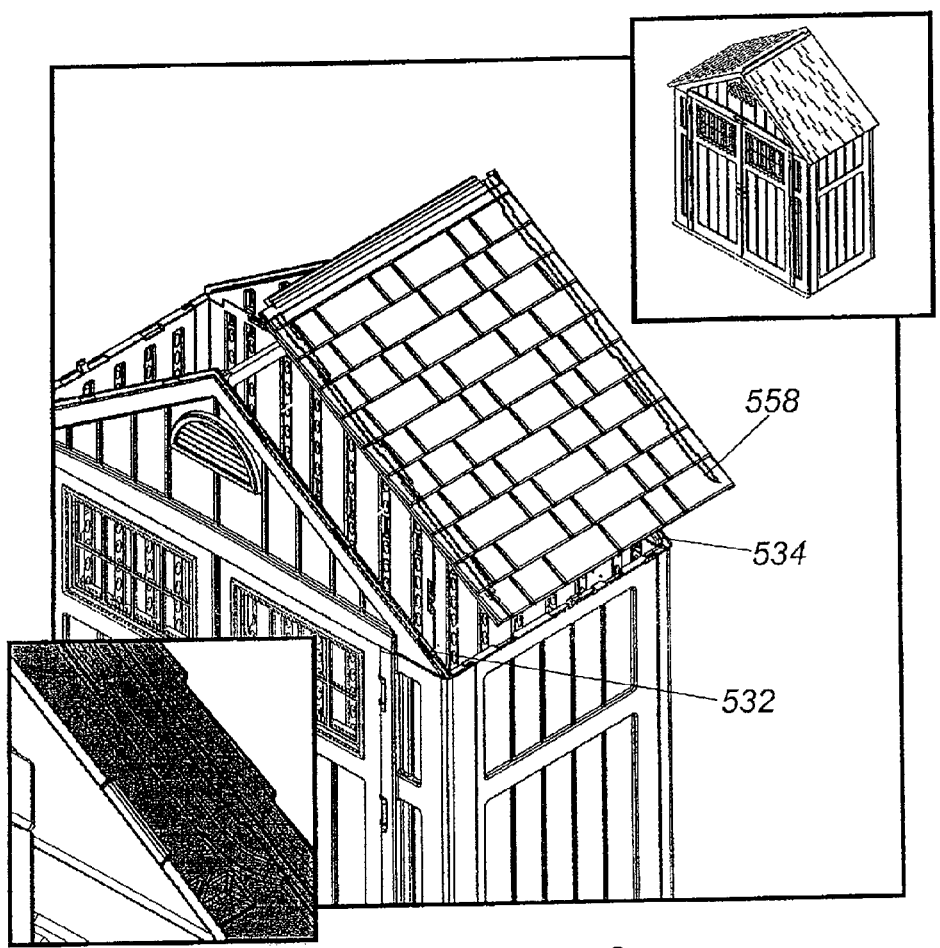
FIG. 76 illustrates attachment of the ridge beam to ridge beam brackets.

FIG. 75A illustrates the insertion of the ridge beam 554 to the slide roof ridge beam bracket 544. The ridge beam 554 is secured to the front header 502 using securing hardware, such as cap screws and nuts. Once secured in place, the opposite end of the ridge beam 554 is then inserted into the slide roof ridge beam bracket 544 associated with the rear header 504 and secured using securing hardware, such as cap screws and nuts, see FIGS. 75B and 75C. FIG. 76 illustrates the insertion of the right roof panel 558. The right roof panel 558 attaches to the diverging sides 532 and 534 of the front and rear headers by aligning the roof engagement member, illustrated herein as a protruding appendage 587, see FIGS. 68A and 68B, having a finger-like extension 590, with a hooked portion 592, and extending in a direction opposite of a base support 594. A plurality of protruding appendage receiving areas 595 are located within the interior channels 596 or 598 positioned within the interior of the roof panels, see FIGS. 77A and 77B, and are sized and shaped to receive the protruding appendage 587, see FIG. 77C.

Once properly aligned, the right roof panel 558 is slid down the slope to its final resting place, locking the finger-like extension 590 of the protruding appendage 587 located within interior channels 596 or 598. From the interior of the enclosure 10, the right roof panel is secured by inserting connector pin 700 within the engaged side wall key boss and roof panel key boss receptacle, see FIGS. 80A and 80B. The procedure is repeated for installation of the left roof panel 556, with the left panel connecting to the right roof panel through engagement flange 574 of the left roof panel and flange 576 of the right roof panel.

Figures 81A, 81B:
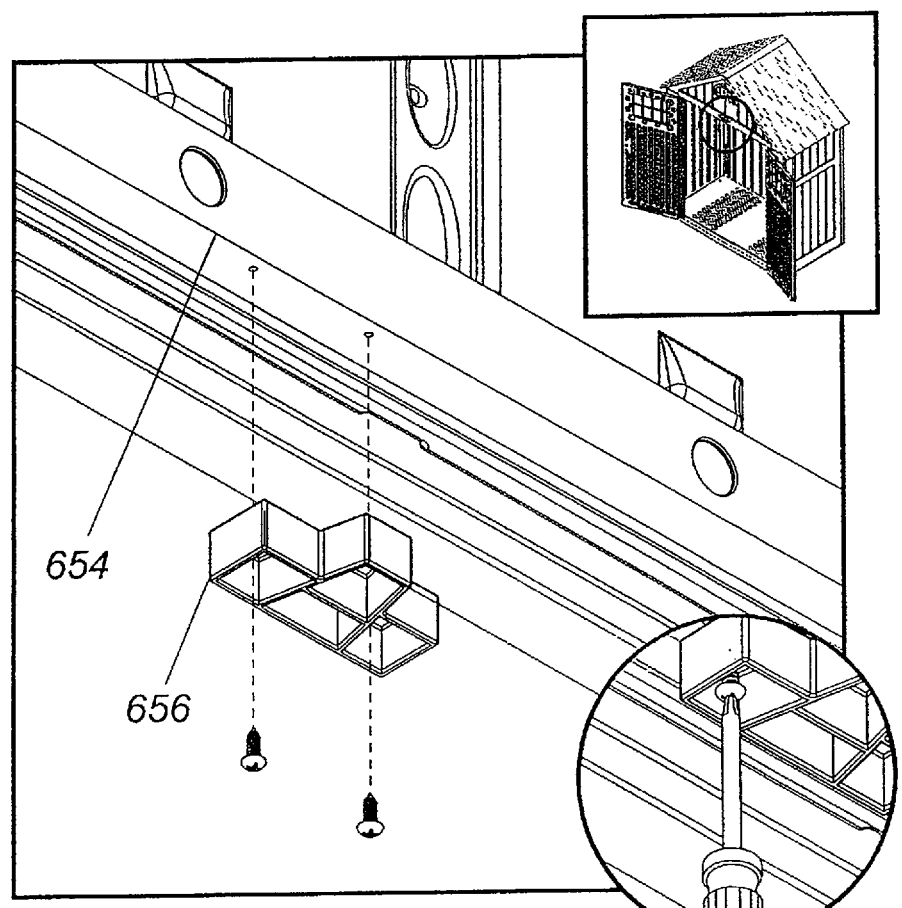
FIGS. 81A, 81B, 82A, 82B, 83A, 83B, 84A, 84B, 85A, 85B, 86, 87A and 87B illustrate the attachment of the door handle assembly.
Figures 82A, 82B:
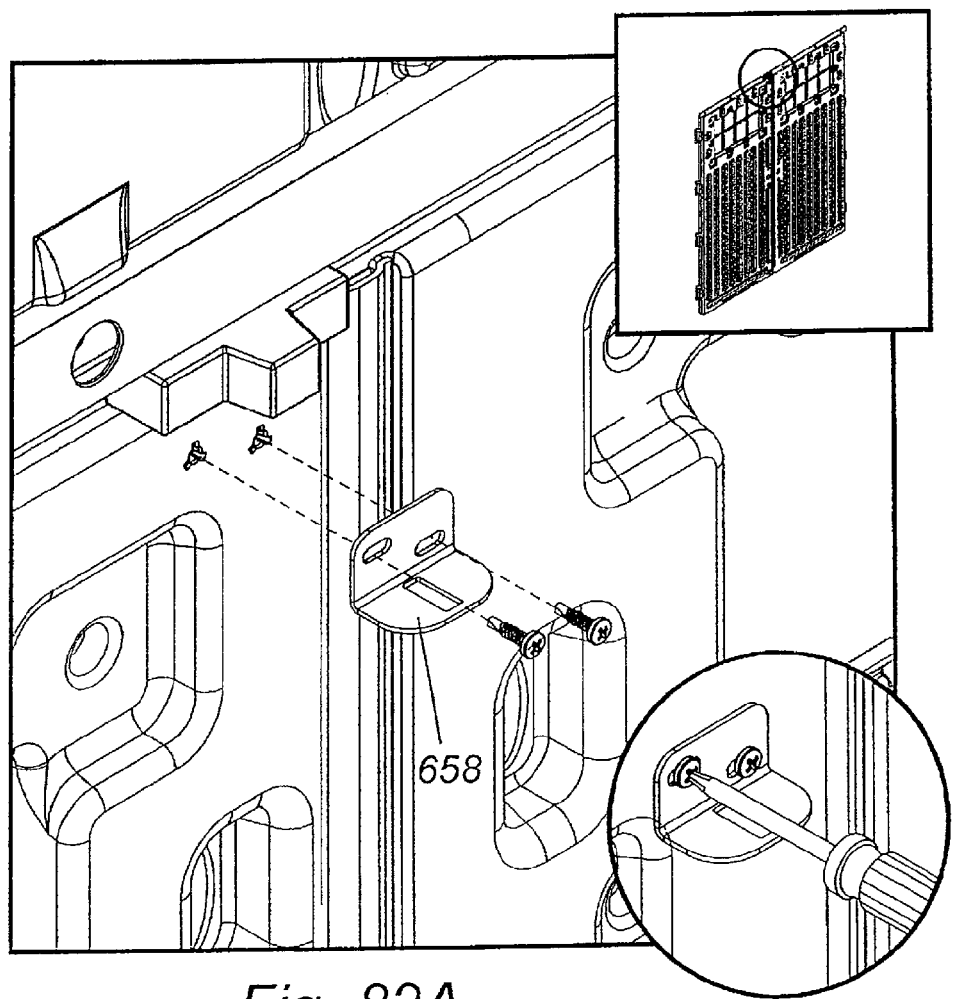
Figures 83A, 83B:
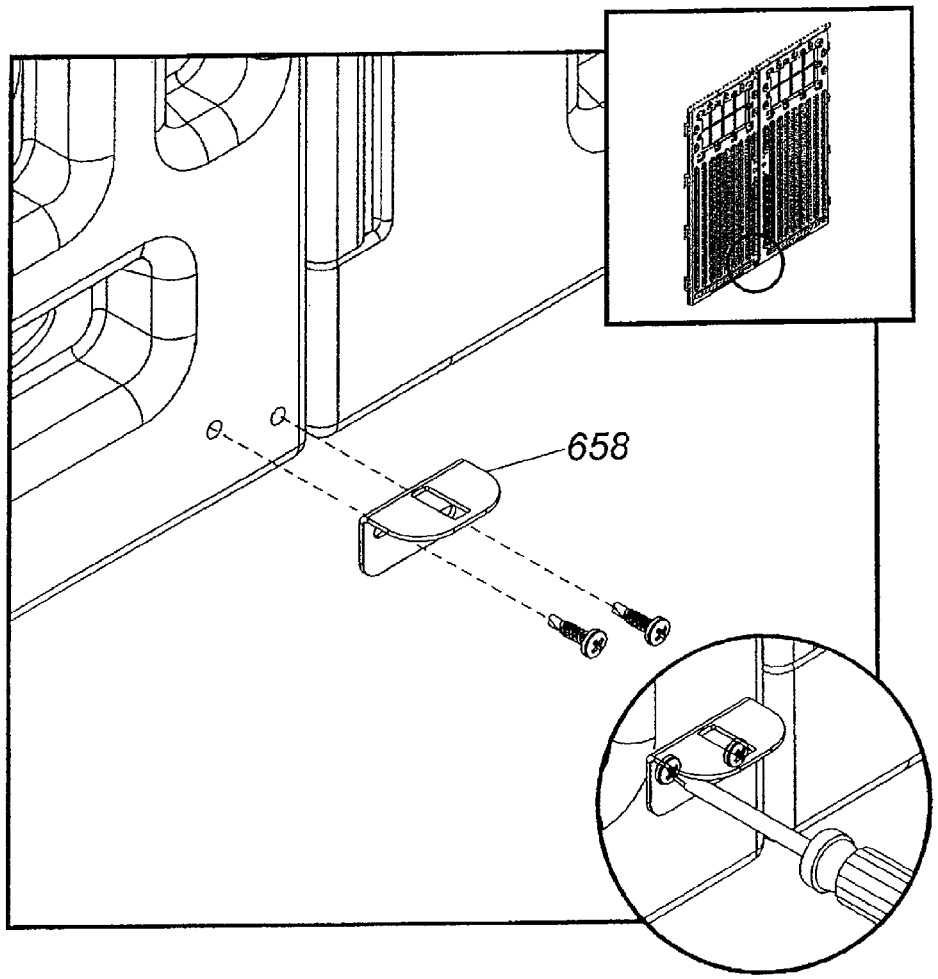
Figures 84A, 84B:
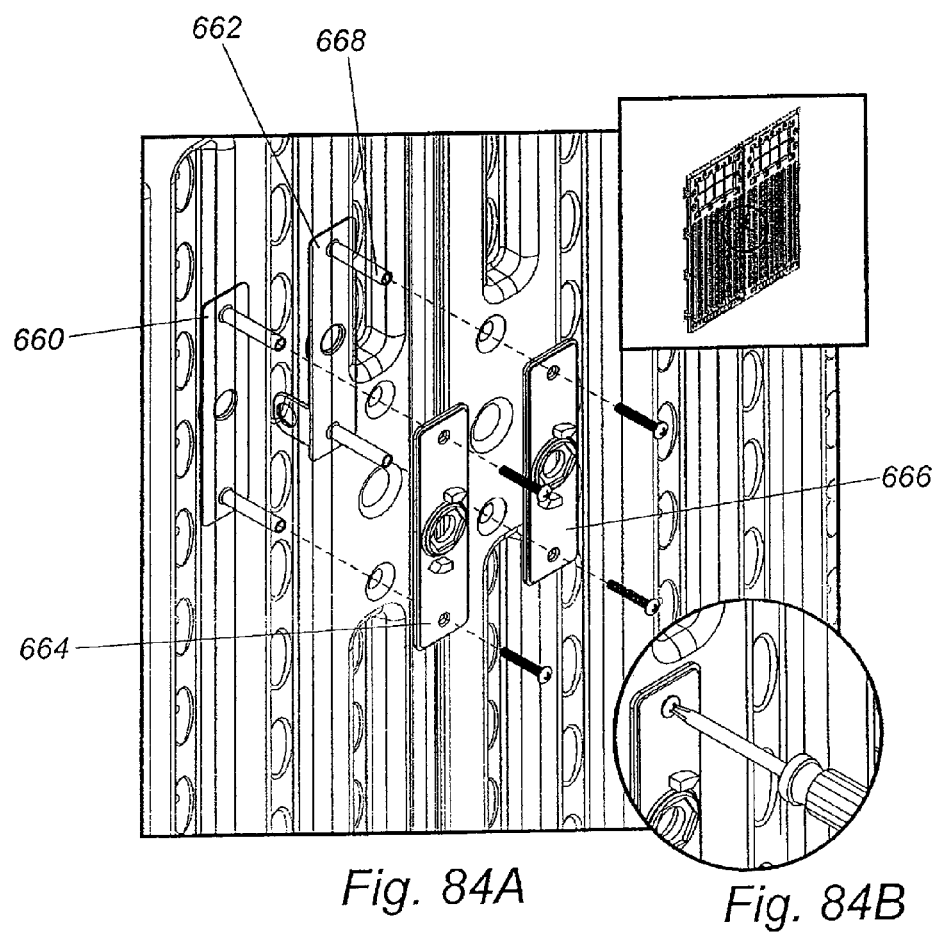
Figures 85A, 85B:
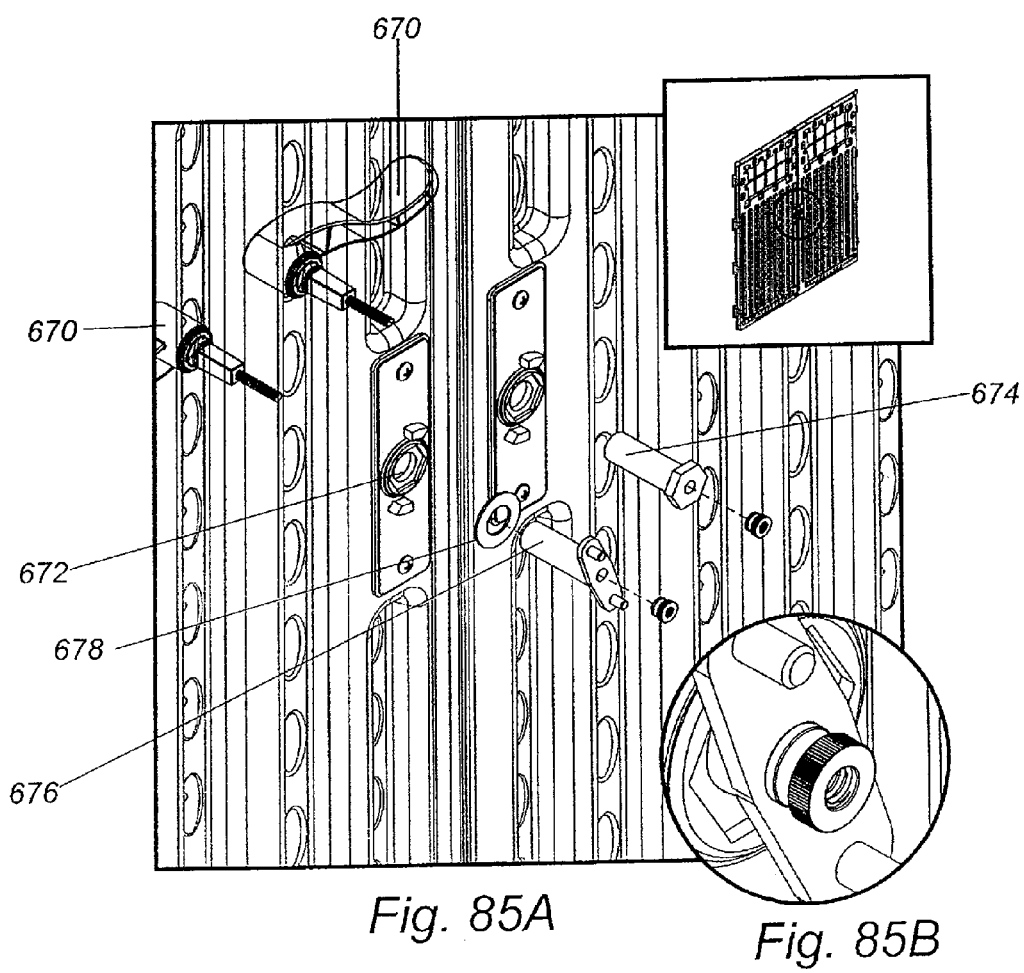
Figure 86:
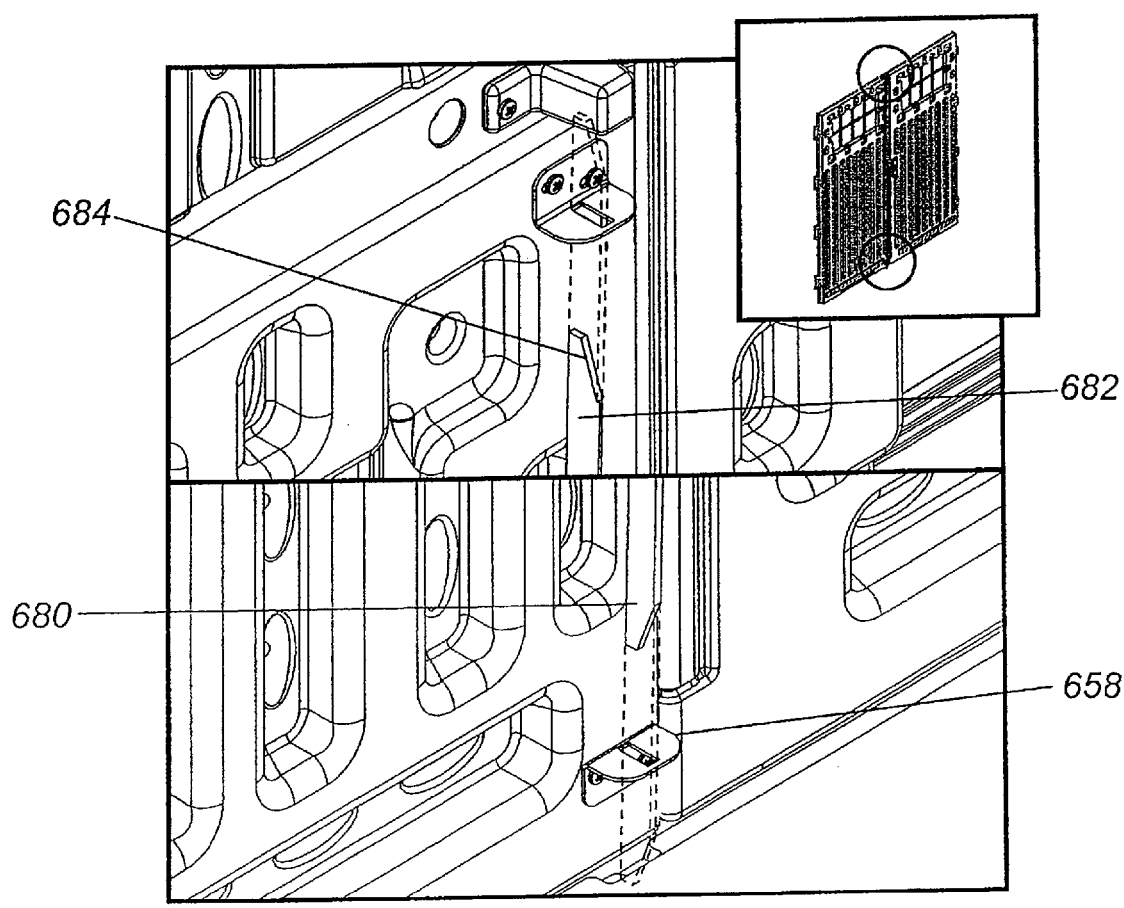

FIGS. 81A-87B illustrate attachment of the door handle assembly 600. A header latch plate 656, as illustrated in FIG. 81, is secured to a portion of the header beam 555. Once in place, clip 658 is attached to the top interior side of the right door and the bottom interior side of the right door and secured using screws, see FIGS. 82A-83B. Left and right handle plates 660 and 662, and screw stems 662 are inserted into the door panels 602 and 604, see FIGS. 84A and 84B. While holding the plates 660, 662 in place on the exterior surface 606, the inside handle plates 664 and 666 are positioned over the stems 668, and secured with screws. Door handles 670 are inserted through handle plate hole 672, see FIGS. 85A and 85B. The handle stop 674 is placed on the left door handle, and secured with securing hardware, such as a nylon thumb nut. The door handle is inserted through the handle plate hole. The actuator 676 and actuator washer 678 are placed on the right door handle and secured using a nylon thumb nut. Rods 680 and 682, see FIG. 86, having angled ends 684 are inserted such that the angled ends are inserted into clips 658 on the top and bottom of the right door. The rods are then placed on the handle actuator pins and secured using washers and nylon thumb nuts to the interior of the right door handle.

Alternative door handle assemblies, including but not limited to a slide latch handle design as shown in FIG. 29B-29E, may be used as well. Referring to FIG. 29B, the slide latch handle contains a first door handle 686 with door plate 688 and a second door handle 690 with door plate 691. Each of the door handles with door plates attaches to the front door panels 602 and 604, see FIG. 29C. A double staple 691 and hasp 692 is used to provide a locking mechanism. The hasp 692 is hingedly connected to pin 693. The pin 693 is engaged with a series of additional staples 694A, 694B, and 694C aligned in parallel fashion. As shown in FIG. 29B, the hasp is in a door locking position engaged with the first staple 691A. Placing a lock, such as a padlock, over the hasp 692 will prevent the doors 602 and 604 from opening. Lifting the hasp 692 in an upward motion and sliding the pin 693 toward the right allows the hasp 692 to engage the second staple 691B of the double staple 692. This allows the door 602 and 604 to be opened. Moreover, the hasp 692 can be secured in this position to a padlock. This arrangement allows the user the ability to enter inside the enclosure without the fear of being locked in from the outside. Door handle 690 is secured to door panel 604 by placing it at the desired position; see for example FIG. 29C. Inserted through the back surface of door 604, see FIGS. 29D and 29E, is a cylindrical member 695. A screw 696 is inserted into the cylindrical member 696, extending through the interior portion 697 of the door 604. The screw 696 secures to a portion of the door handle 690. Additional screws 696 can be used to secure the door handle 690 and/or door handle plate 691 to the door panel 604.

Figure 88:
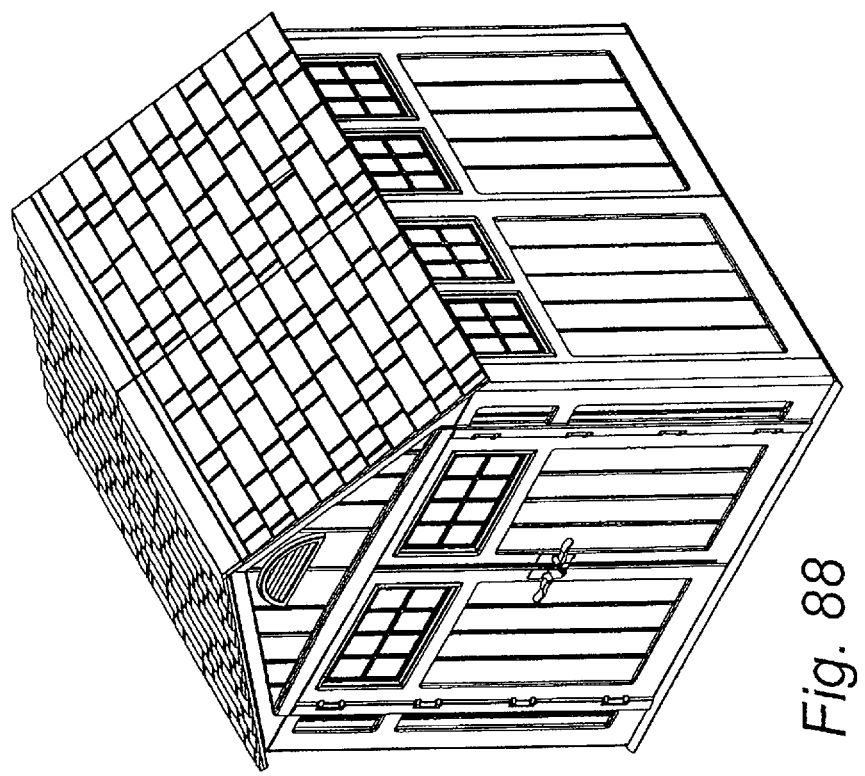
FIG. 88 is a front perspective view of an alternative embodiment of the utility enclosure of the instant invention.
Figure 89:
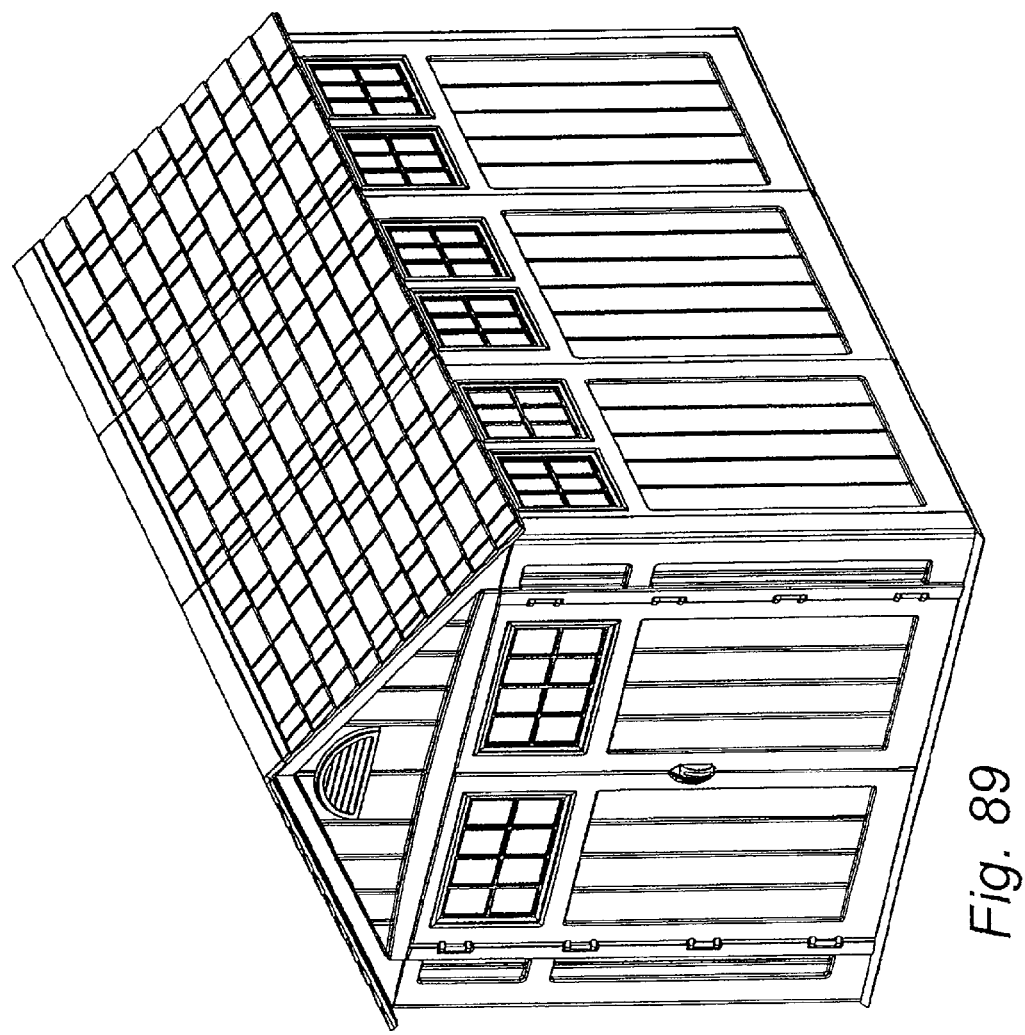
FIG. 89 is a front perspective view of an alternative embodiment of the utility enclosure of the instant invention.
Figure 90:
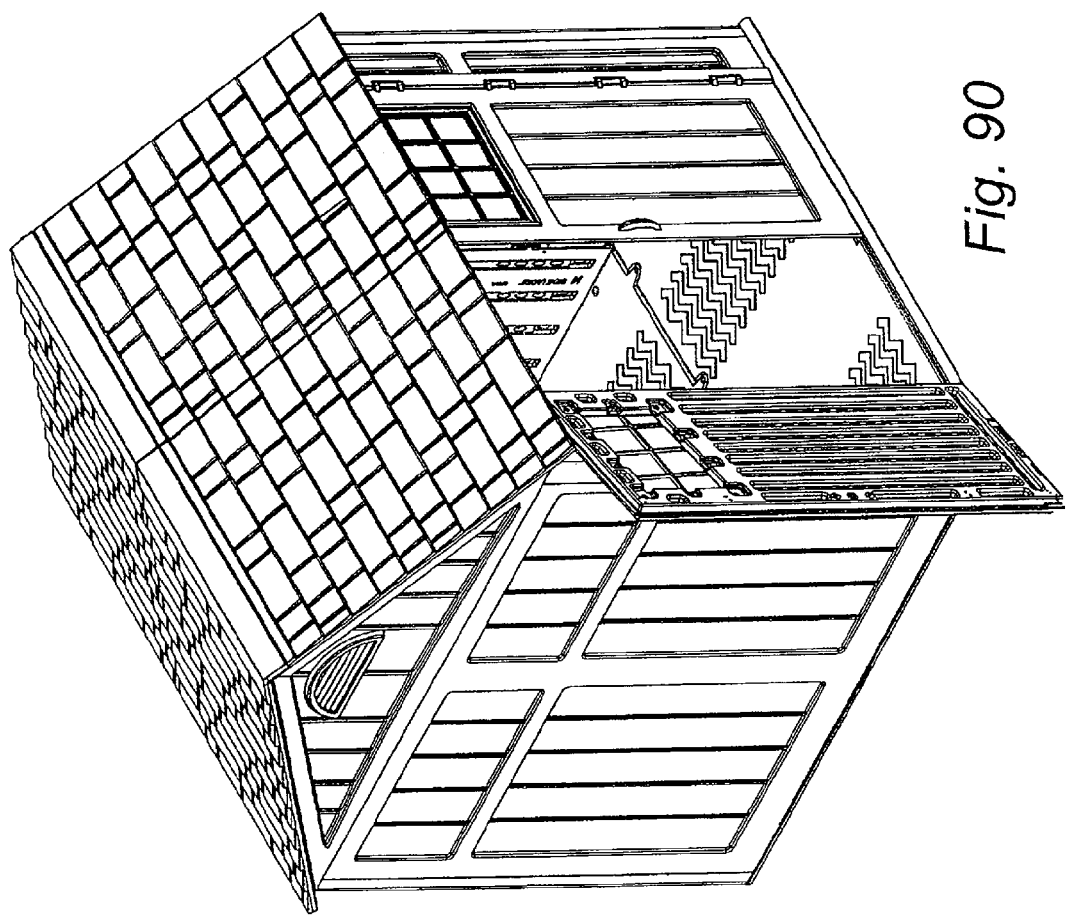
FIG. 90 is a front perspective view of an alternative embodiment of the utility enclosure of the instant invention, illustrating wall mounted shelving and work bench attachments.

Referring to FIGS. 88-90, alternative embodiments of the present invention are shown wherein the enclosures are made larger by adding floor panels, roof panels, and additional side wall panels. The enlarged enclosures may also include additional door panels to facilitate entering the shed at more than one position. The enlarged enclosures may also include shelving and work benches secured within the interior of the enclosure. In this manner, the same construction can be utilized to build structures of varying size utilizing substantially the same components.

Figure 91:
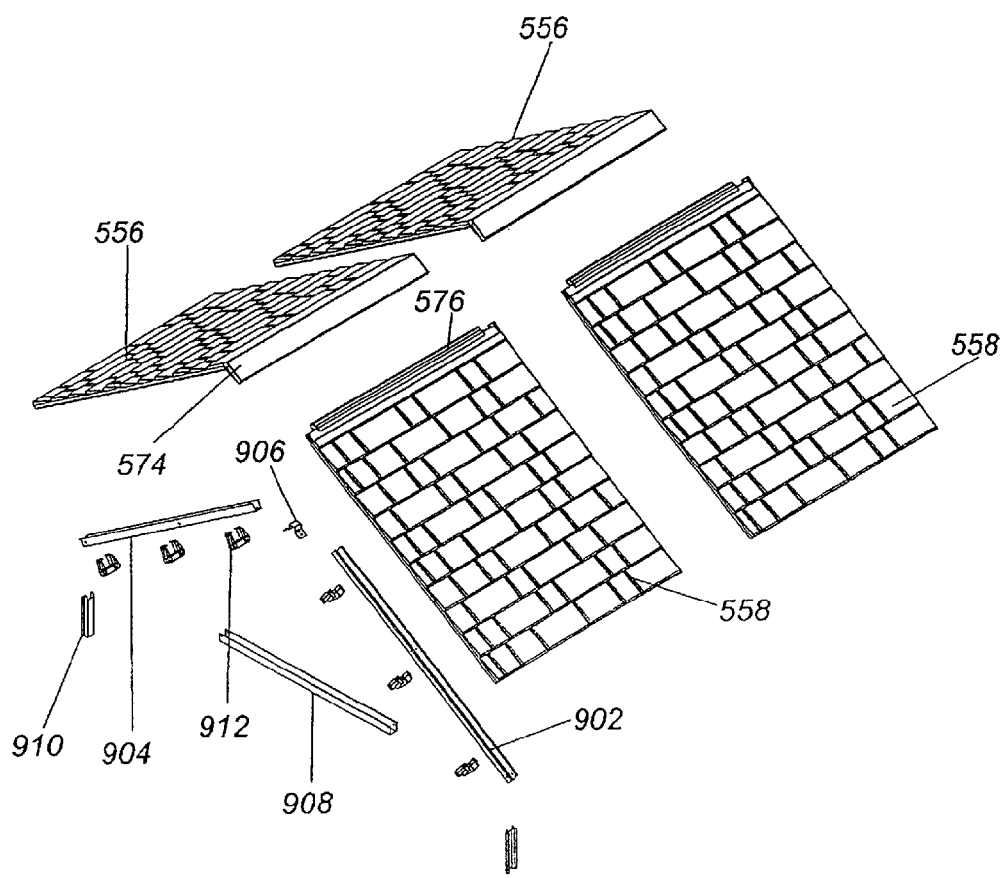
FIG. 91 is an exploded view of a steel tress assembly.
Figure 92:
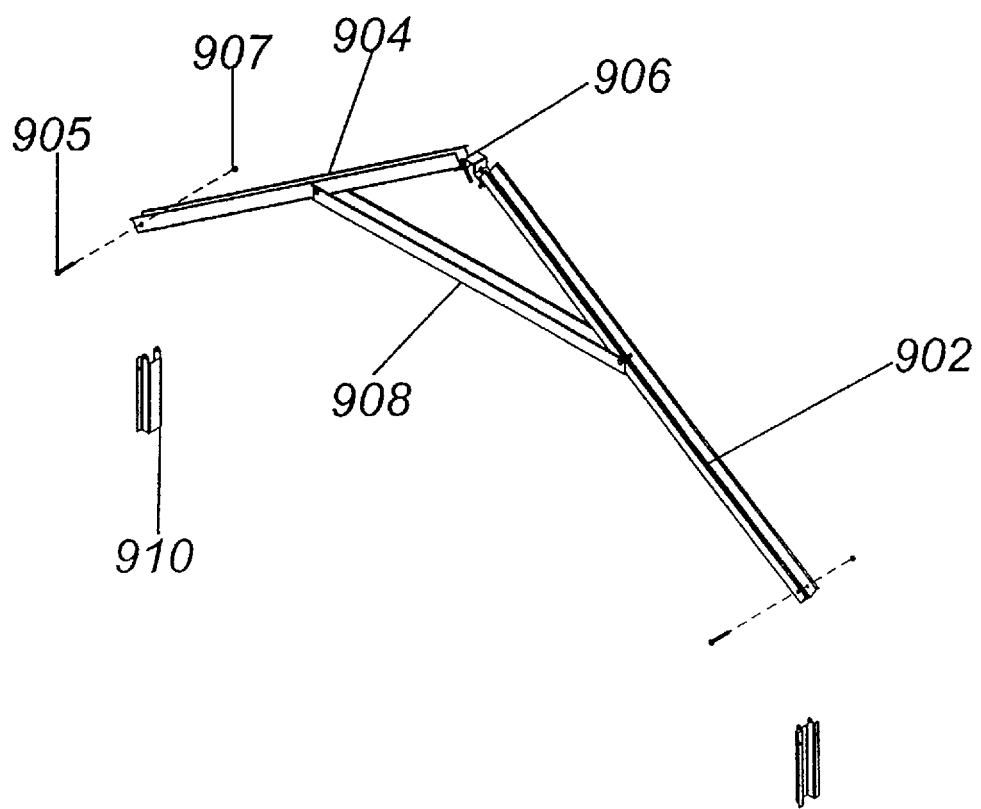
FIG. 92 is an illustration of the steel tress assembly.

Referring to FIG. 91, a steel truss assembly 900 for attaching a roof assembly, having a roof with more than one panel per side is illustrated. The front and rear headers are assembled as described previously. To assembly the truss assembly 900, a truss leg 902 or 904 is placed at each side of a truss bracket 906. The truss bracket is shaped such that it straddles the ridge beam 554 of the roof assembly and can disperse weight loads from the truss assembly to the beam. A truss cross beam 908 is placed under both truss legs 902 and 904. The truss legs 902 and 904 are then attached to the truss bracket 906 using a hex head cap screw and nut at each end of the bracket. The truss cross beam 908 attaches to the truss leg using a hex head screw cap and nut at each end of the cross beam, insuring that the cross beam is level. A truss tie down 910 is placed at each end of the truss legs 902 and 904 and secured with a hex head cap screw 905 and nut 907, see FIG. 92.

Figures 93A, 93B, 93C:
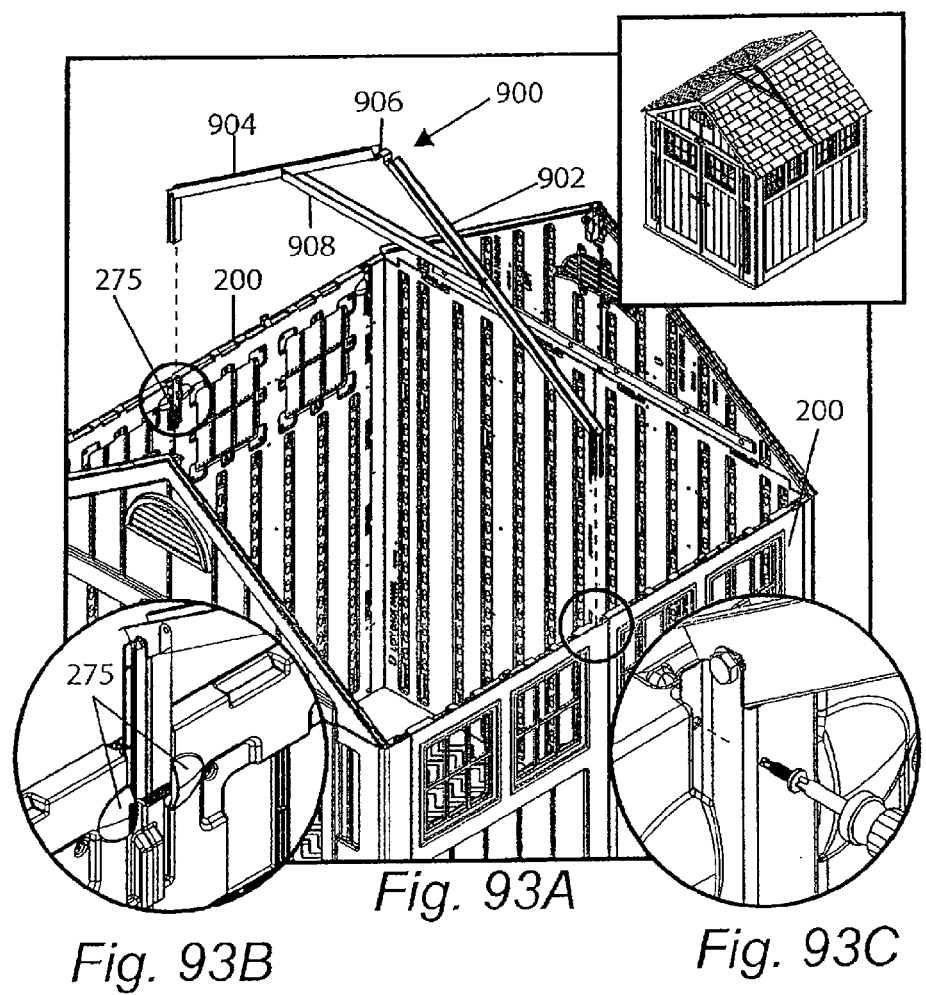
FIGS. 93A, 93B, and 93C illustrate the securing of the steel tress assembly to the side wall panels.
Figures 94A, 94B, 94C:
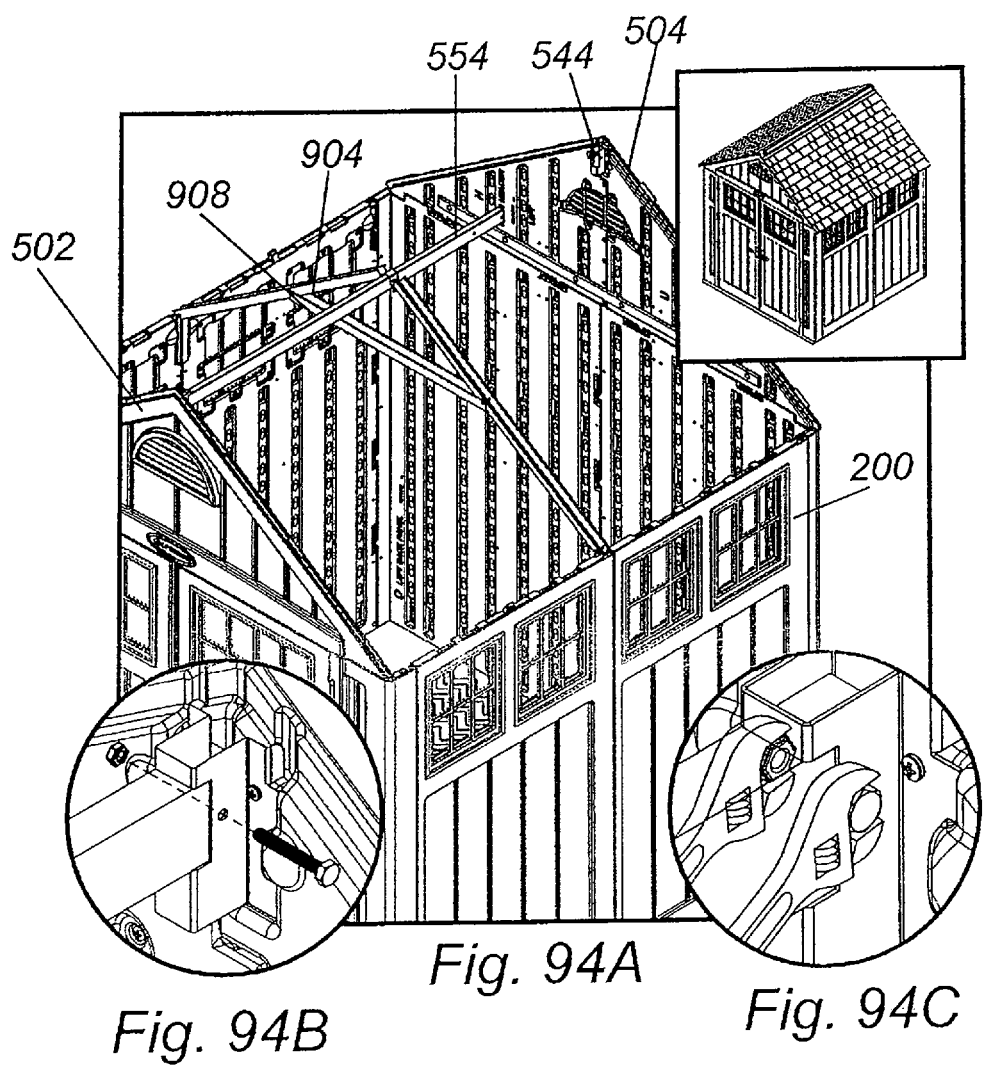
FIGS. 94A, 94B, and 94C illustrate the insertion and securing of the roof ridge beam within the roof ridge beam brackets.
Figure 95:
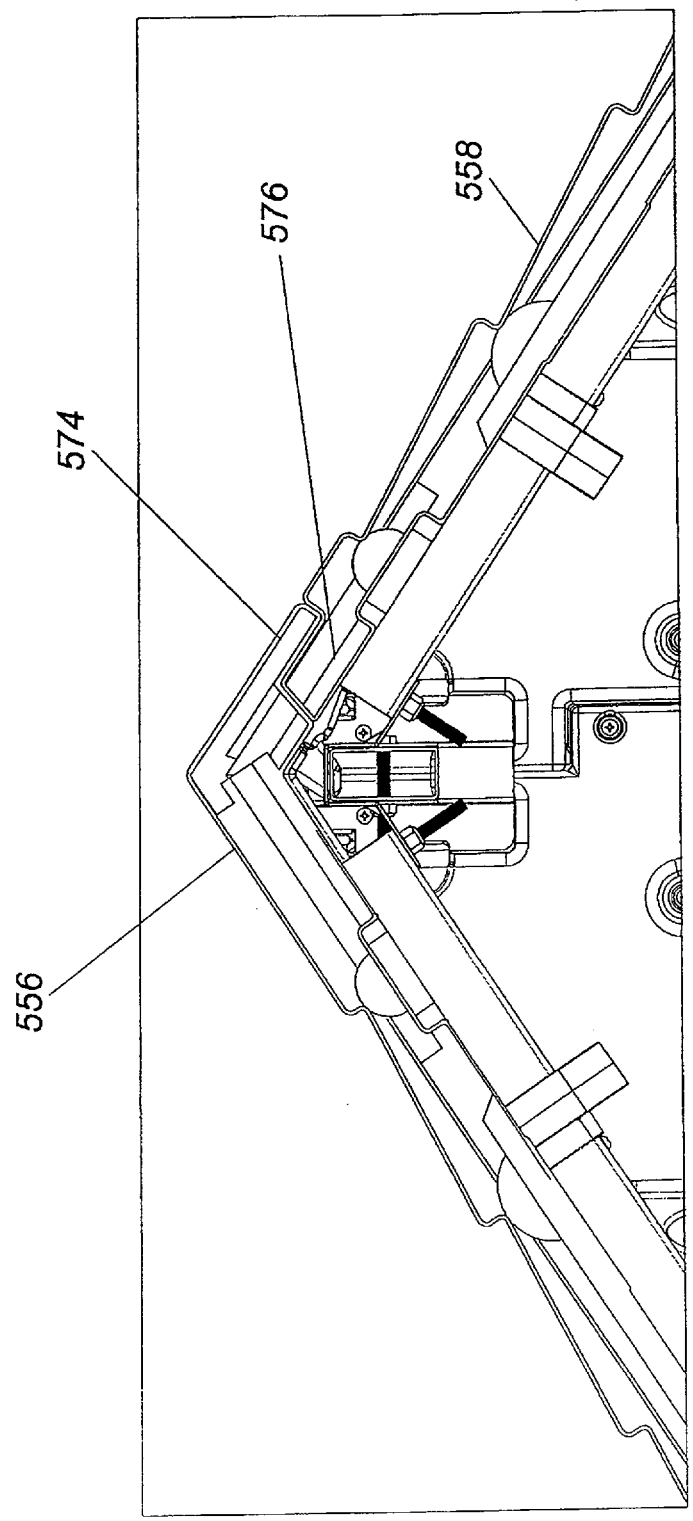
FIG. 95 illustrates the left roof panel overlapping the right roof panel to form a weather resistant feature.
Figures 96A, 96B, 96C:
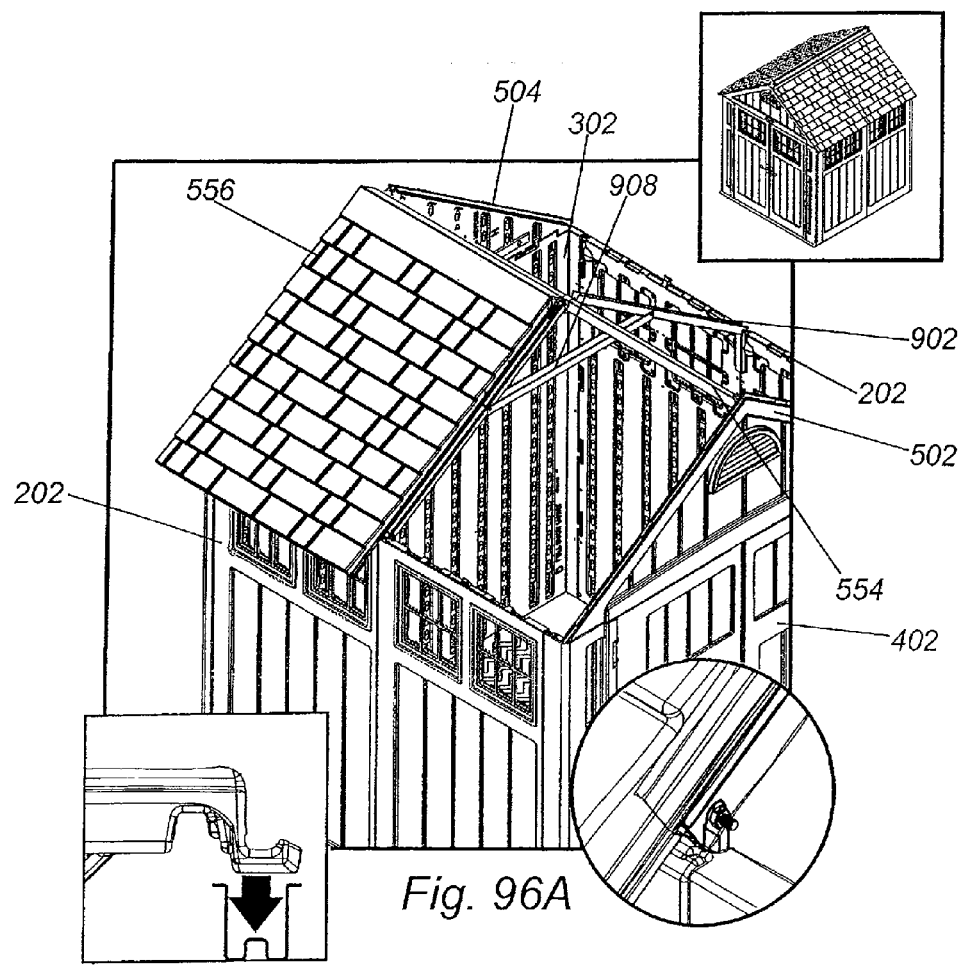
FIGS. 96A, 96B, and 96C illustrate the securing of the roof panels to the tress assembly.
Figures 97A, 97B:
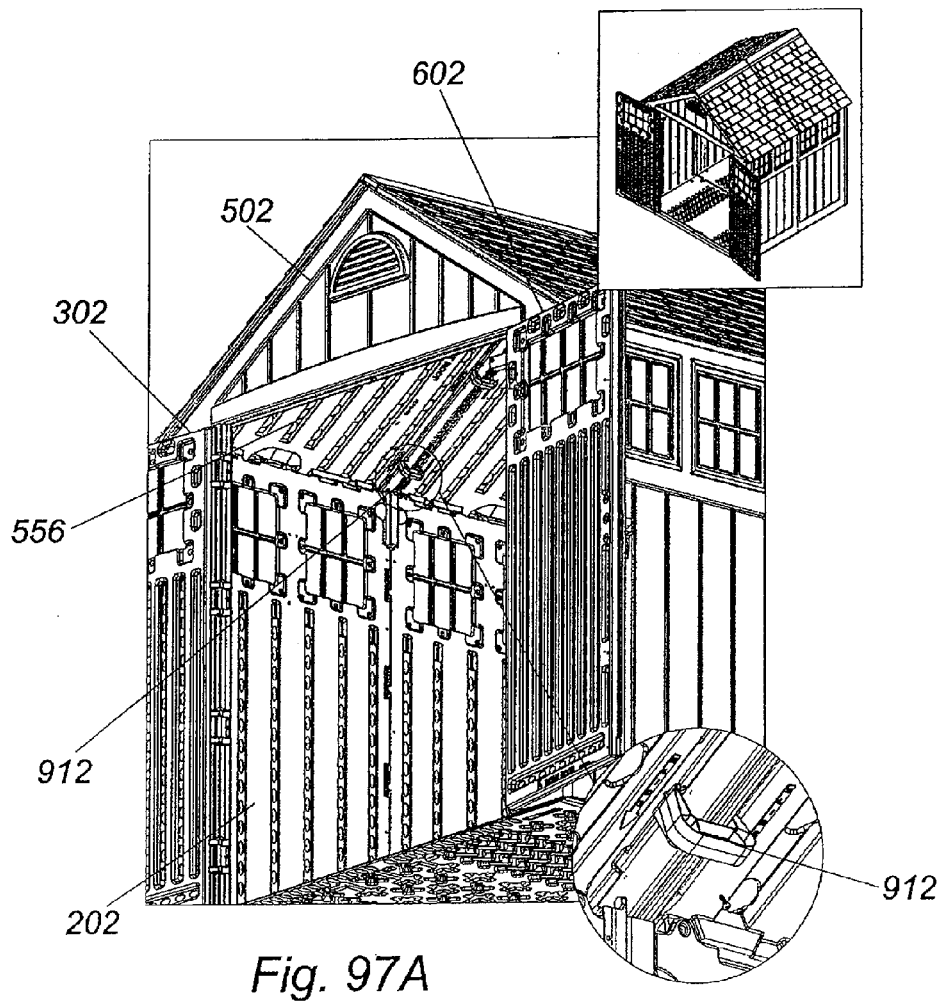
FIGS. 97A and 97B illustrate the securing of the injection molded roof connector to the tress assembly.
Figure 99:
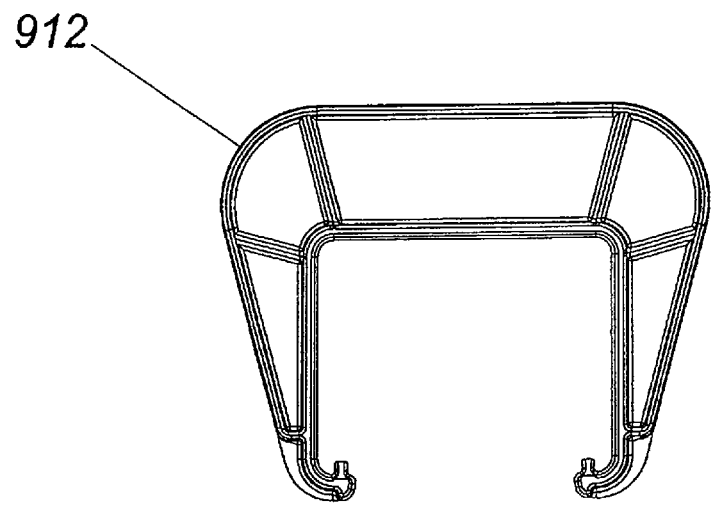
FIG. 99 is a front view of an injection molded roof connector illustrated in FIG. 98.
Figure 98:
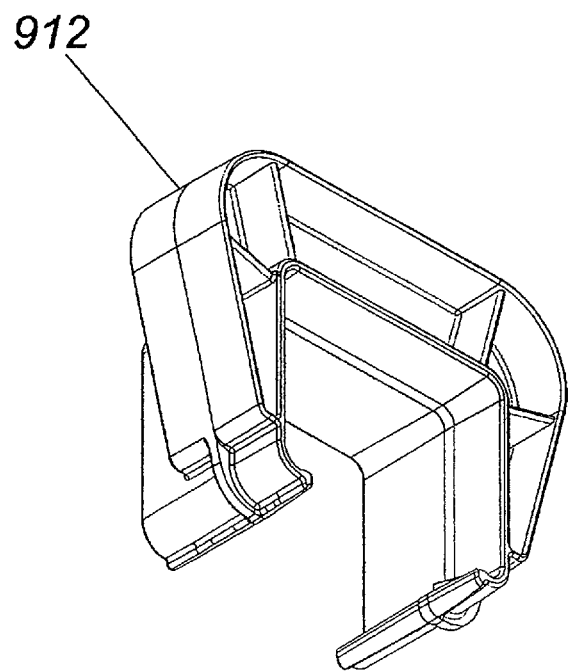
FIG. 98 is a perspective view of a particular embodiment of an injection molded roof connector.

The assembled truss assembly lies directly underneath the roof panels. Once the front and rear headers are secured to the front and rear panel in the same manner as described previously, the trust assembly is slid into place and secured to the left and right side panels by screwing screws into bracket 275, see FIGS. 93A, 93B and 93C. The ridge beam is then placed into the rear header roof beam bracket and secured using a hex head cap screw and nut; see FIGS. 94A, 94B and 94C. The opposite end of the ridge beam is then placed into the front header roof beam bracket and secured using a hex head cap screw and nut. The roof panels are installed and secured as described above. At the peak of the roof, the left roof panel 556 overlaps the right roof panel 558, via cooperation of 574 and 576, to form weather resistant features, see FIG. 95. Where the roof panels meet in the middle section, the truss assembly fits with the channels of the interior of the roof. To secure the roof panels to the truss assembly, the edge of the roof panel is pressed into a channel on the truss leg 902; see FIGS. 96A, 96B and 96C. Other roof panels are assembled in a similar manner. Once all roof panels are in place, the roof panels are further secured to the truss by hooking an injection molded roof connectors 912, see FIGS. 97A and 97B, illustrated herein as a shaped connector. The injection molded connector can be slid into place using molded undercuts or channels in the roof panel underside. The connector is also designed to straddle the truss leg and connects to the truss system. The "C" shaped connector has a chamfered lead on one half to allow for insertion, see FIGS. 98 and 99. The central part is left open to allow for the truss leg to pass through and straddle the bottom face of the open central area.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A modular utility shed construction system utilizing blow molded plastic structural panels having integrally formed blow molded connectors comprising:

a floor assembly for enclosing the bottom of said utility shed, said floor assembly including a floor panel member having a top surface and a bottom surface, said floor panel member having a first edge, a second edge opposite said first edge, a third edge substantially perpendicular to and extending between said first and said second edges, a fourth edge opposite to and substantially parallel to said third edge, wherein said distance between said first edge and said second edge defines a predetermined width and the distance between said third edge and said fourth edge defines a predetermined length, said floor panel member having one or more integrally formed floor panel to wall panel securing assembly members for providing horizontal alignment to form a substantially perpendicular relationship with a pair of side wall assemblies, a front wall assembly, and a rear wall assembly, and for preventing separation in a plurality of directions;

said pair of side wall assemblies including one or more side wall panel members wherein each said side wall panel member includes
  a top edge including one or more wall panel to roof assembly securing members constructed and arranged to secure said pair of side wall assemblies to a roofing assembly in such a manner as to prevent separation in a plurality of directions,
  a bottom edge opposite said top edge, said bottom edge including one or more integrally formed floor panel to wall panel securing assembly members for providing horizontal alignment with said floor panel thereby forming a substantially perpendicular relationship and preventing separation in a plurality of directions,
  a left side edge substantially perpendicular to and extending between said top and said bottom edges, said left side edge including one or more integrally formed wall panel to wall panel securing assembly members for providing vertical alignment with a front wall assembly or a side wall assembly and preventing separation in a plurality of directions, and
  a right side edge opposite to and substantially parallel to said left side edge, said right side edge including one or more integrally formed wall panel to wall panel securing assembly members for providing vertical alignment with a rear wall assembly or a side wall assembly and preventing separation in a plurality of directions,
  each said wall panel having a flange, said flange constructed and arranged to cooperate with an adjacently positioned wall panel having a flange, said flanges cooperating to form a generally S-shaped configuration when viewed in cross section wherein said cooperation results in the formation of a water resistant overlapping connection acting to impede water and other foreign debris from entering the interior of said shed;

said front wall assembly including one or more front wall panels, each of said front wall panels containing
  a top side edge including one or more wall panel to roof assembly securing members constructed and arranged to secure said front wall assembly to a roofing assembly in such a manner as to prevent separation in a plurality of directions,
  a bottom edge opposite said top edge, said bottom edge including one or more integrally formed floor panel to wall panel securing assembly members for providing horizontal alignment with said floor assembly thereby forming a substantially perpendicular relationship with said floor assembly and preventing separation in a plurality of directions, and
  a pair of opposing side edges substantially perpendicular to and extending between said top side and said bottom side, wherein at least one of said opposing side edges includes a front wall to door assembly connector assembly member constructed and arranged to receive a door hinge of a door assembly for enclosing and providing ingress into and egress from said utility shed, said opposing side edge containing one or more integrally formed wall panel to wall panel securing assembly members for providing vertical alignment with a said pair of side wall assemblies and preventing separation in a plurality of directions;

said rear wall assembly including one or more rear wall panels, each of said rear wall panels containing
  a top side edge including one or more wall panel to roof assembly securing members constructed and arranged to secure said rear wall assembly to a roofing assembly in such a manner as to prevent separation in a plurality of directions,
  a bottom edge opposite said top edge, said bottom edge including one or more integrally formed floor panel to wall panel securing assembly members for providing horizontal alignment with said floor panel assembly thereby forming a substantially perpendicular relationship and preventing separation in a plurality of directions, and
  a pair of opposing side edges arranged substantially perpendicular to and extending between said top side and said bottom side, wherein at least one of said opposing side edges includes one or more side wall to side wall securing assembly members for connecting to said side wall assemblies in a substantially perpendicular relationship or to a rear wall panel member to form a substantially juxtaposed, coplanar relationship, said side wall to side wall assembly members preventing separation in a plurality of directions, and a roof assembly, wherein said roof assembly includes one or more wall panel to roof assembly securing members constructed and arranged to cooperate with said front wall assembly, said rear wall assembly, and said pair of side wall assemblies in an interlocking relationship for enclosing the top of said utility shed;

wherein cooperation of said wall panels using said securing assembly members results in a utility shed which when fully assembled is constructed in such a manner so as to prevent separation of said interconnected floor assembly, pair of side wall assemblies, front wall assembly rear wall assembly, and roof assembly in a plurality of directions.

2. The modular utility shed construction system utilizing blow molded plastic structural panels having integrally formed blow molded connectors according to claim 1 wherein said floor panel includes a tire tread pattern.

3. The modular utility shed construction system utilizing blow molded plastic structural panels having integrally formed blow molded connectors according to claim 1 wherein said floor assembly includes two or more floor panel members secured together in a substantially juxtaposed, coplanar relationship.

4. The modular utility shed construction system utilizing blow molded plastic structural panels having integrally formed blow molded connectors according to claim 1 wherein said pair of side wall panel assemblies includes at least two side wall panels secured together in a substantially juxtaposed, coplanar relationship.

5. The modular utility shed construction system utilizing blow molded plastic structural panels having integrally formed blow molded connectors according to claim 1 wherein said pair of side wall panel assemblies include at least three side wall panels secured together in a substantially juxtaposed, coplanar relationship.

6. The modular utility shed construction system utilizing blow molded plastic structural panels having integrally formed blow molded connector assemblies according to claim 1 wherein said one or more integrally formed floor panel to wall panel securing assembly member includes a first securing assembly member of a first securing assembly having a plurality of mating receptacles constructed and arranged to cooperate with a second member of said first floor panel to wall panel securing assembly, wherein cooperation of said second member with said first member prevents side to side separation of interconnected panels.

7. The modular utility shed construction system utilizing blow molded plastic structural panels having integrally formed blow molded connector assemblies according to claim 6 wherein said second member of said first floor panel to wall panel securing assembly is a locking plug.

8. The modular utility shed construction system utilizing blow molded plastic structural panels having integrally formed blow molded connectors according to claim 1 wherein said one or more integrally formed floor panel to wall panel securing assemblies includes a first member of a second floor panel to wall panel securing assembly, said second floor panel to wall panel securing assembly including one or more sockets constructed and arranged to slideably cooperate with a plurality of second members of said second floor panel to wall panel securing assembly, said second members located on said bottom edge of each of said opposing side wall assemblies, front wall assemblies, rear wall assemblies, or combinations thereof, wherein slidable cooperation of said first member with said second member prevents both vertical and side to side separation.

9. The modular utility shed construction system utilizing blow molded plastic structural panels having integrally formed blow molded connector assemblies according to claim 8 wherein said second members of said second floor panel to wall panel securing assembly members are one or more slide and lock locking posts.

10. The modular utility shed construction system utilizing blow molded plastic structural panels having integrally formed blow molded connector assemblies according to claim 1 wherein said one or more integrally formed wall panel to wall panel securing assembly includes an outwardly extending keyboss sized and shaped to fit within a corresponding keyboss receptacle on an adjacent panel member.

11. The modular utility shed construction system utilizing blow molded plastic structural panels having integrally formed blow molded connectors according to claim 10 wherein said keyboss is constructed and arranged to cooperate with a securing member to provide vertical alignment between adjacent positioned panels and to prevent larger separation between said adjacent panels in a plurality of directions.

12. The modular utility shed construction system utilizing blow molded plastic structural panels having integrally formed blow molded connectors according to claim 11 wherein said securing member is a pin member.

13. The modular utility shed construction system utilizing blow molded plastic structural panels having integrally formed blow molded connector assemblies according to claim 1 wherein said one or more integrally formed wall panel to wall panel securing assemblies includes a keyboss receptacle sized and shaped to receive said outwardly extending keyboss on an adjacent panel member.

14. The modular utility shed construction system utilizing blow molded plastic structural panels having integrally formed blow molded connectors according to claim 13 wherein said keyboss further contains a pair of opposing surfaces which align with a pair of opposing surfaces of said corresponding keyboss receptacle.

15. The modular utility shed construction system utilizing blow molded plastic structural panels having integrally formed blow molded connectors according to claim 14 wherein said opposing surfaces of said keyboss and said opposing surfaces of said corresponding keyboss receptacle are angled.

16. The modular utility shed construction system utilizing blow molded plastic structural panels having integrally formed blow molded connectors according to claim 1 wherein cooperation of said flanges forms a generally L-shaped configuration when viewed in cross section.

17. The modular utility shed construction system utilizing blow molded plastic structural panels having integrally formed blow molded connectors according to claim 1 wherein said front wall assembly includes at least one corner post member, said corner post member constructed and arranged to secure said front wall assembly to said pair of side wall assemblies.

18. The modular utility shed construction system utilizing blow molded plastic structural panels having integrally formed blow molded connectors according to claim 17 wherein said rear wall assembly includes at least one corner post member, said corner post member constructed and arranged to secure said rear wall assembly to said pair of side wall assemblies.

* * * * *